(12) United States Patent
Desmarets

(10) Patent No.: US 12,242,436 B2
(45) Date of Patent: *Mar. 4, 2025

(54) CONSTRUCTION OF DATABASE SCHEMA MODELS FOR DATABASE SYSTEMS AND REST API'S

(71) Applicant: IntegrIT S.A./N.V., Beersel (BE)

(72) Inventor: Pascal Desmarets, Beersel (BE)

(73) Assignee: IntegrIT S.A./N.V., Beersel (BE)

( * ) Notice: Subject to any disclaimer, the term of this patent is extended or adjusted under 35 U.S.C. 154(b) by 248 days.

This patent is subject to a terminal disclaimer.

(21) Appl. No.: 17/313,018

(22) Filed: May 6, 2021

(65) Prior Publication Data

US 2021/0334250 A1 Oct. 28, 2021

Related U.S. Application Data

(63) Continuation of application No. 16/081,173, filed as application No. PCT/EP2016/079953 on Dec. 6, 2016, now Pat. No. 11,100,059.

(30) Foreign Application Priority Data

Mar. 2, 2016 (EP) ..................................... 16158241
Sep. 30, 2016 (EP) ..................................... 16191695

(51) Int. Cl.
*G06F 16/21* (2019.01)
*G06F 16/16* (2019.01)
(Continued)

(52) U.S. Cl.
CPC .......... *G06F 16/213* (2019.01); *G06F 16/168* (2019.01); *G06F 16/212* (2019.01); *G06F 16/248* (2019.01); *G06F 16/252* (2019.01)

(58) Field of Classification Search
CPC .... G06F 16/213; G06F 16/168; G06F 16/212; G06F 16/248; G06F 16/252
See application file for complete search history.

(56) References Cited

U.S. PATENT DOCUMENTS 5,596,746 A 1/1997 Shen et al.
6,665,677 B1 * 12/2003 Wotring ................ G06F 16/258
(Continued)

FOREIGN PATENT DOCUMENTS

EP 0910024 A2 4/1999
EP 2827262 A1 1/2015

OTHER PUBLICATIONS

Chuck Murray, Oracle SQL Developer Data Modeler User's Guide, Release 4.0 E48205-06, pp. 172, Aug. 2014 (Year: 2014).*
(Continued)

*Primary Examiner* — Cam Y T Truong
(74) *Attorney, Agent, or Firm* — N.V. Nederlandsch Octrooibureau

(57) ABSTRACT

The present invention relates to a method for constructing a database schema model by a user by means of a computer, comprising the steps of: providing a set of collections and/or optionally one or more relationships linking at least two of said set of collections; editing one or more of said set of collections, each of which associated with a schema definition displayed by a single table on an entity relationship diagram on a graphical interface on said computer and comprising at least one object and/or one field, said schema definition editable via a tree diagram on said graphical user interface on said computer; automatically generating by means of said computer said database schema model for a database system or a REST API; characterized in that, said
(Continued)

set of collections comprises at least one collection comprising a nested object editable via said tree diagram with two levels or more.

14 Claims, 80 Drawing Sheets

(51) Int. Cl.
   *G06F 16/248* (2019.01)
   *G06F 16/25* (2019.01)

(56) References Cited

U.S. PATENT DOCUMENTS

| | | | |
|---|---|---|---|
| 9,507,820 B1* | 11/2016 | Hannah | G06F 16/211 |
| 2002/0010700 A1* | 1/2002 | Wotring | G06F 16/94 |
| 2005/0015732 A1* | 1/2005 | Vedula | G06F 8/34 |
| | | | 719/329 |
| 2005/0132276 A1* | 6/2005 | Panditharadhya | G06Q 10/10 |
| | | | 715/275 |
| 2006/0173873 A1* | 8/2006 | Prompt | G06F 16/284 |
| 2010/0131565 A1 | 5/2010 | Weinberg et al. | |
| 2010/0293203 A1* | 11/2010 | Williams | G06F 16/9024 |
| | | | 715/769 |
| 2012/0005241 A1 | 1/2012 | Ortel | |
| 2014/0279838 A1* | 9/2014 | Tsirogiannis | G06F 16/235 |
| | | | 707/603 |
| 2014/0365531 A1* | 12/2014 | Soundararajan | G06F 16/28 |
| | | | 707/798 |
| 2015/0106748 A1* | 4/2015 | Monte | G06F 3/0485 |
| | | | 715/753 |
| 2015/0149937 A1* | 5/2015 | Khalid | G06F 3/0484 |
| | | | 715/762 |
| 2016/0210268 A1* | 7/2016 | Sales | G06F 3/04842 |
| 2017/0090876 A1* | 3/2017 | Hale | G06F 16/245 |
| 2017/0185593 A1* | 6/2017 | Kumar | G06F 16/2228 |

OTHER PUBLICATIONS

Chuck Marray, OracleSQL Developer Data Modeler User's Guide Release 4.0 E48205-06, pp. 1-172, Aug. 2014 (Year: 2014).
Anonymous: "Data Modeler Concepts and Usage", Jun. 1, 2010, XP055350802, Retrieved from the Internet, Section 1.3.1, p. 22-3.d, p. 29-1.6, p. 31-1.7; Figure 1.1.

* cited by examiner

Source: Google Trends:
http://www.google.com/trends/explore?q=xml+api#q=xml%20api%2C%20json%20api

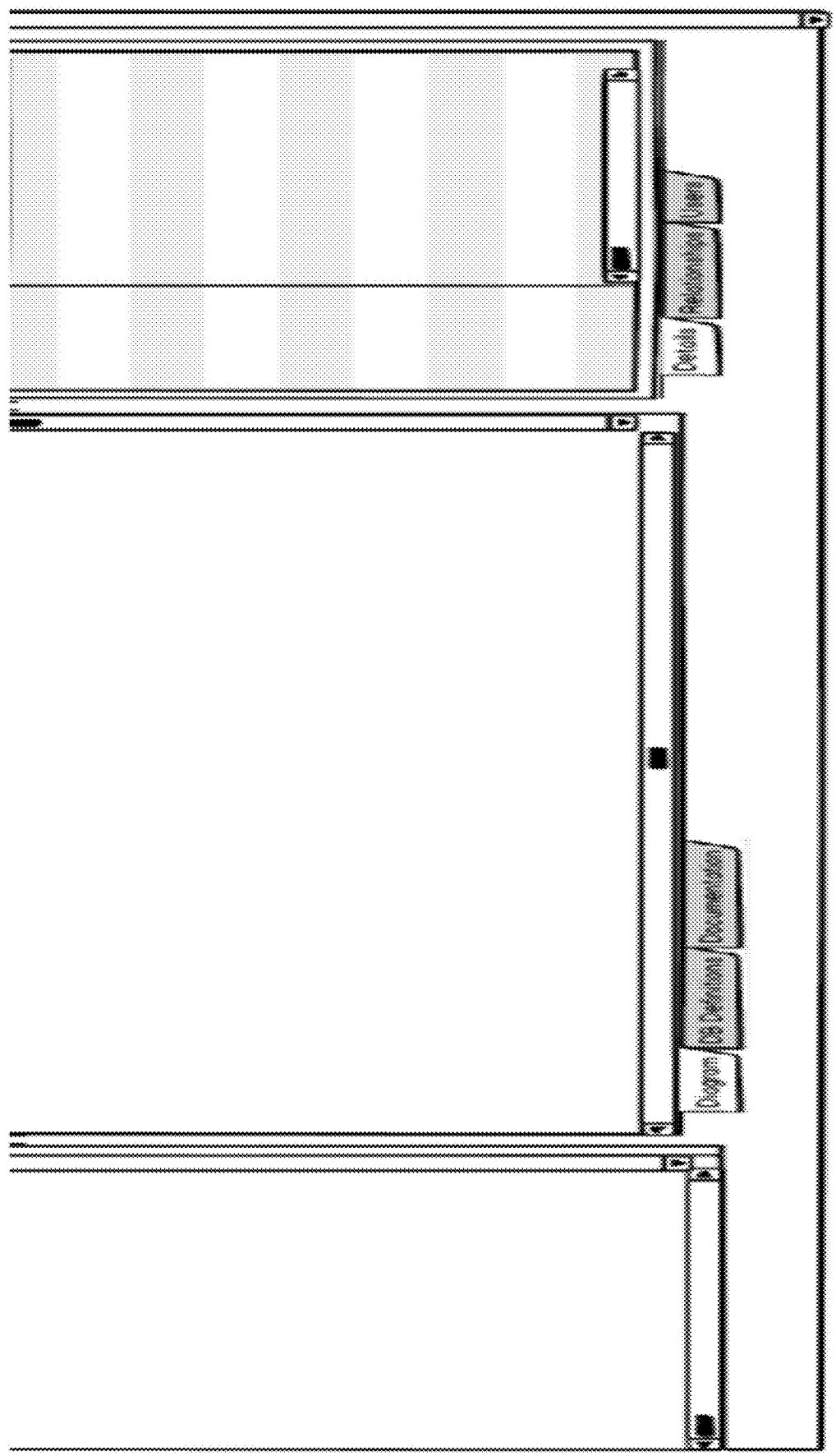

Fig. 37

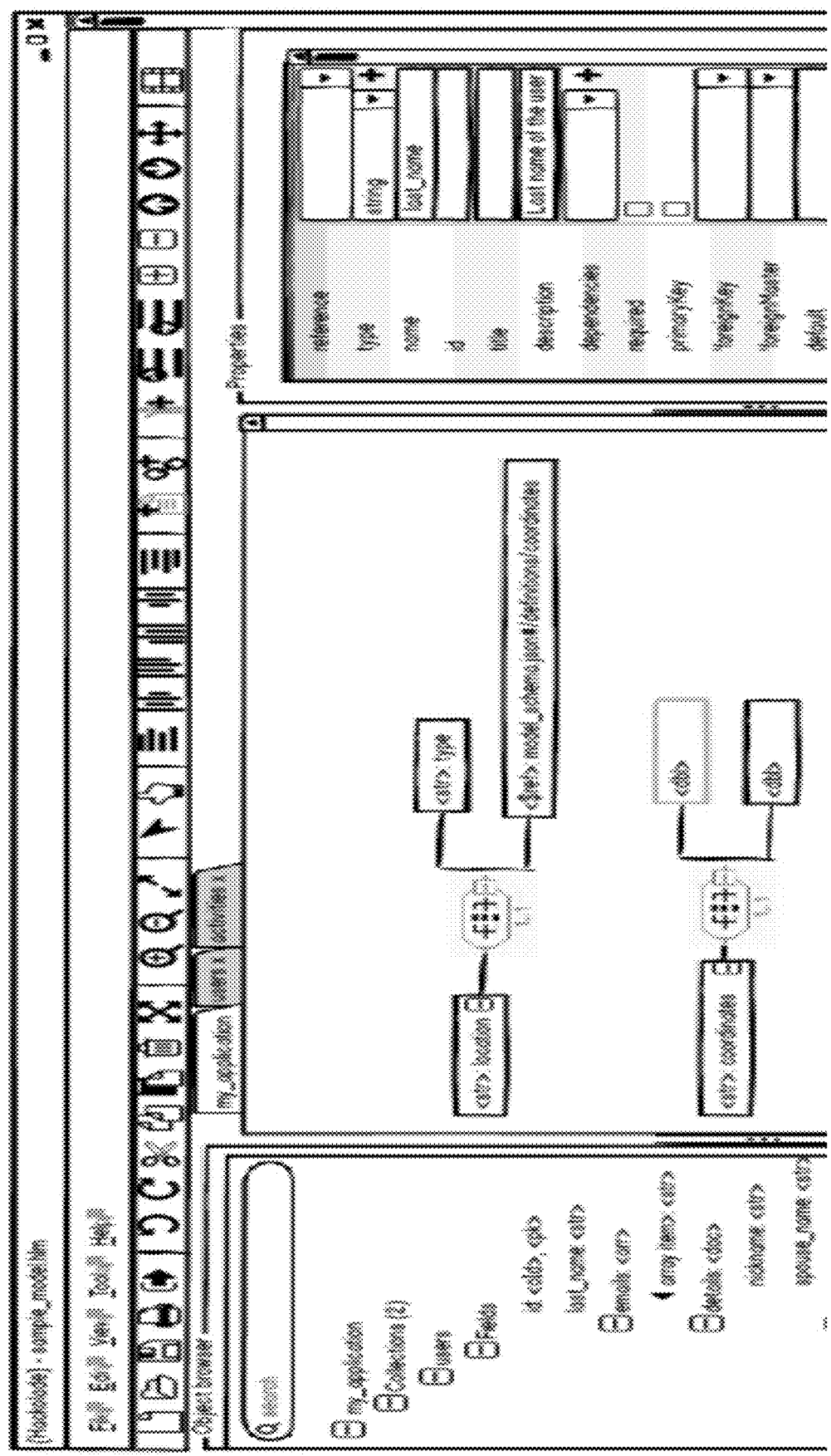
Fig. 48 (part 1)

Relationship: countriesRegions
Parent: collection countries, field code, cardinality 1
Child: collection regions, field iso_country, cardinality 1..n Relationship: New Relationship(5)
Parent: collection regions, field continent, cardinality 1..n
Child: collection countries, field continent, cardinality 1

Fig. 62

| countries | | |
|---|---|---|
| id | pk | <num> |
| code | | <str> |
| name | | <str> |
| continent | | <str> |
| wikipedia_link | | <str> |
| keywords | | <str> |
| ⊟regions | | <arr> |
| ⊟[0] | | <doc> |
|   id | fm | <num> |
|   code | fm | <str> |
|   local_code | fm | <multi> |
|   name | fm | <str> |
|   continent | fm | <str> |
|   wikipedia_link | fm | <str> |
|   keywords | fk | <str> |

| regions | | |
|---|---|---|
| id | pk | <num> |
| code | | <str> |
| local_code | | <multi> |
| name | | <str> |
| continent | | <str> |
| ⊟countries | | <doc> |
|   id | fk | <num> |
|   code | fm | <str> |
|   name | fm | <str> |
|   continent | fm | <str> |
|   wikipedia_link | fm | <str> |
|   keywords | fm | <str> |
| wikipedia_link | | <str> |
| keywords | | <str> |

Fig. 63

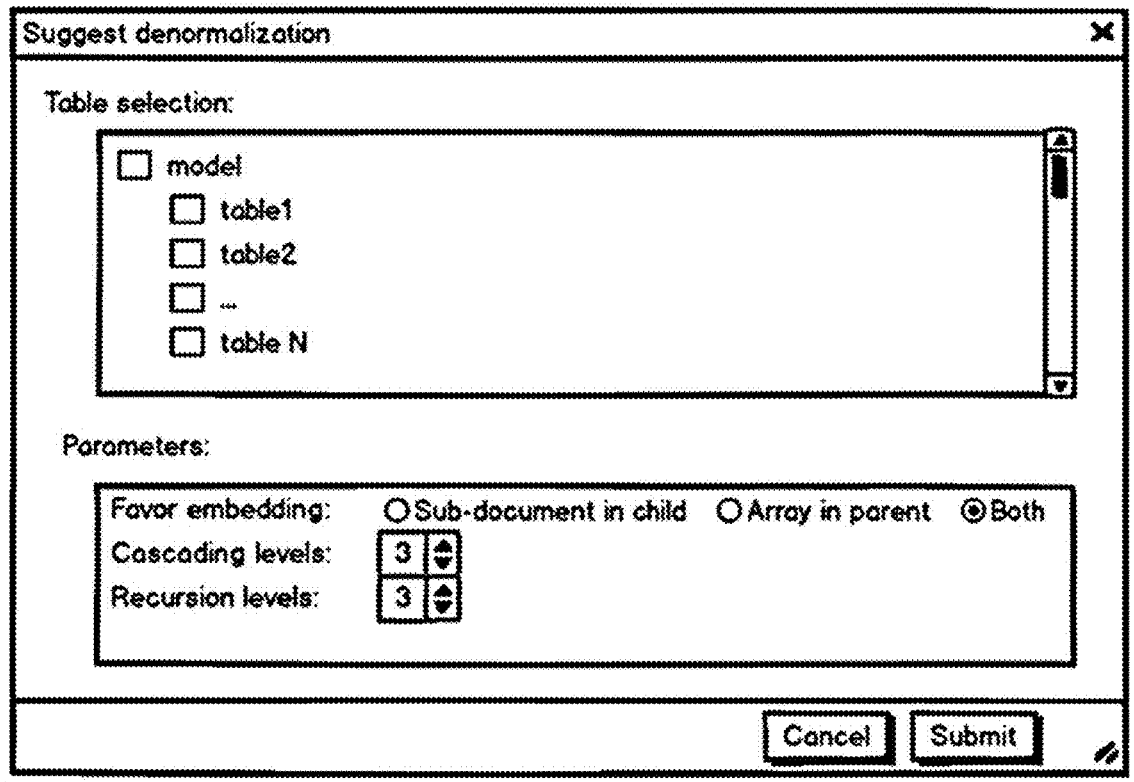
Fig. 72
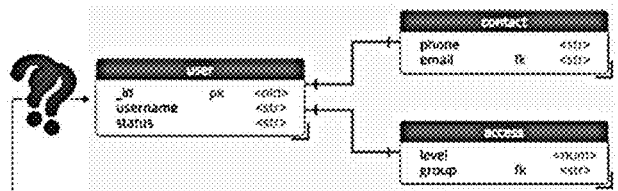
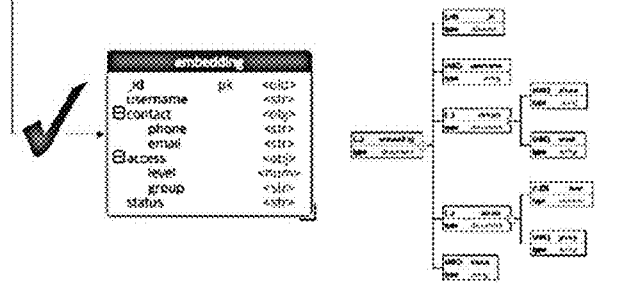
Fig. 73

```
 1 ▾ {
 2       "_id": ObjectId("507f1f77bcf86cd799439011"),
 3       "username": "string sample",
 4 ▾    "contact": {
 5           "phone": "123-456-7890",
 6           "email": "xyw@example.com"
 7       },
 8 ▾    "access": {
 9           "level": 5,
10           "group": "dev"
11       },
12       "status": "active"
13  }
```
Fig. 74
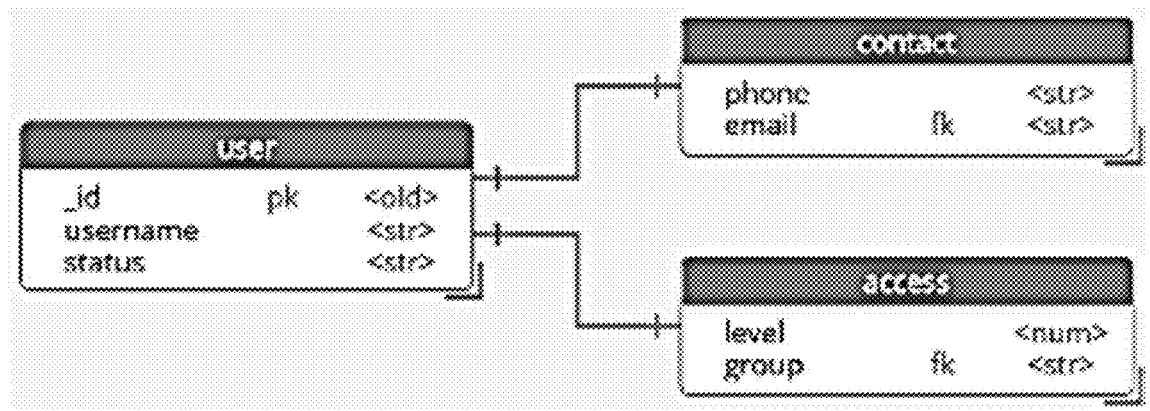
Fig. 75
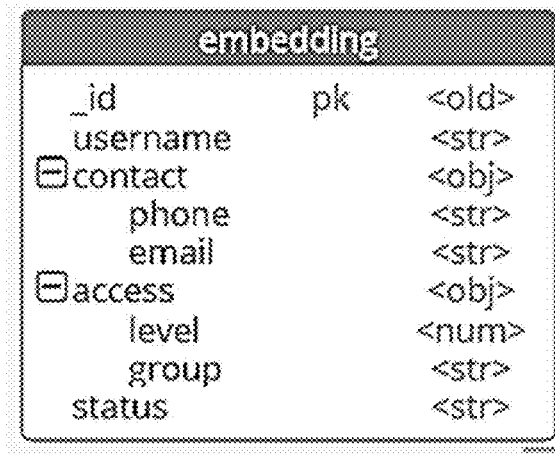
Fig. 76

| polymorphism | | |
|---|---|---|
| _id | pk | <old> |
| docType | | <str> |
| fristName | | <str> |
| lastName | | <str> |
| ⊟addresses | | <doc> |
| ⊟billing | | <doc> |
| city | | <str> |
| state | | <str> |
| ⊟oneOf | | <ch> |
| ⊟[0] | | <sub> |
| shipping | | <str> |
| ⊟shipping | | <doc> |
| city | | <str> |
| state | | <str> |

CONSTRUCTION OF DATABASE SCHEMA MODELS FOR DATABASE SYSTEMS AND REST API'S

TECHNICAL FIELD

The invention pertains to the technical field of database systems, in particular to the construction of database schema models for database systems and REST APIs.

BACKGROUND

While many present day data storage and data management systems still rely exclusively on relational database systems and the related special-purpose programming language SQL (Structured Query Language), many application developers are moving to database systems that are "Not Only SQL", i.e. NoSQL (originally: "Non SQL") database systems such as MongoDB, Couchbase, CouchDB, Amazon DynamoDB, RavenDB, Microsoft Azure DocumentDB, MarkLogic, and EnterpriseDB. Indeed, NoSQL databases offer important advantages for application developers: flexibility, fast and easy evolution, as well as the ability to start storing and accessing data with minimal effort and setup. This is equally true for JSON-based document-store databases, a class of NoSQL databases relating to the present invention that is organized as document store (as opposed to relational database) and relying on JSON (JavaScript Object Notation), a format also commonly used in implementing REST APIs (Application Programming Interfaces) and web services (where REST stands for Representational State Transfer, and a system complying to the so-called constraints of REST is called RESTful).

Just as for traditional databases, the planning and set-up of a NoSQL database is in need of a database model (or map) to help evaluate design options before the actual implementation. Said database model helps to think through the implications of different alternatives, to recognize potential hurdles before committing sizable amounts of development effort, and to plan ahead in order to minimize later rework. In the end, a modeling process aided by a good database model accelerates development, increases the quality of the application, and reduces execution risks.

Further, said database model is particularly important in the case of a NoSQL database, since it is able to handle the increased complexity associated with the data and the (typically, very large) scale of NoSQL databases. Additionally, it circumvents the NoSQL-related problem that data structures are only tacitly described in the application code, forcing anyone involved in the database management to examine the code, which is obviously not the most productive way to engage in a fruitful dialog between analysts, architects, designers, developers, and DBAs.

Despite the popularity of NoSQL databases, there remains a need in the art for a good database model for this type of databases. The existing traditional methods and tools of classic relational databases cannot be applied to NoSQL and REST APIs. As a matter of fact, this argument has sometimes been used as a justification against the adoption and implementation of NoSQL solutions.

An earlier attempted solution tried to model a JSON data store, but did not provide a graphical way to represent the collections' schemas. Another attempted solution provided a tree-like structured diagram for a single collection, but did not offer a way to graphically model the multiple collections that make up a database. Another attempted solution defines 'visual design' of a REST API as 'described in a human readable format—in other words, plain text' and hence fails to provide a diagram.

EP 0 910 024 discloses a method, and associated system, for converting object oriented models into an actual operable database. The method and system automatically convert object oriented models into inputs that are compatible with a target product data manager platform. A problem with EP 0 910 024 is that it is limited to relational database schema models, lacking means to handle typical features of NoSQL environments, such as nested objects.

U.S. Pat. No. 5,596,746 discloses an algorithm for transforming data base schema information to object modeling notation utilizing meta models of the data base tables and the target object modeling notation respectively to bridge the gap between the data base schema representation and the object model representation. Similar to EP 0 910 024, U.S. Pat. No. 5,596,746 is limited to relational database schema models, and hence lacks mechanisms to handle NoSQL-related features such as nested objects.

The present invention aims to resolve at least some of the problems mentioned above. The invention thereto aims to provide a method and system to graphically model schemas for NoSQL document databases and REST API's which is both functional and clear, thereby facilitating the work of, and the dialog between analysts, architects, designers, developers, testers, and operators of systems that are based on such technologies.

SUMMARY OF THE INVENTION

In the database community, there is an increasing need for database management systems (DMBSs) that support a combination of data models, relational and non-relational, in a single DBMS platform. Hence, a convergence between RDBMSes and other data models (e.g., a NoSQL document database) takes place, creating the need for multi-model database schema models, and new methods suitable for the construction of a broad range of database schema models, including classical as well as multi-model database schema models. The present invention is directed at such methods and systems for constructing a database schema model. Specifically, this invention relates to a GUI-supported construction method of database schema models that extends the typical, table-like representation of collections, known, e.g., from both RDBMSes and NoSQL document databases, with the concept of nesting of one or more objects within a single collection with table-like representation, which is not possible with state of the art methods. Editing of said single collection is enabled by a related tree diagram, representing the schema definition of said single collection. In this regard, the present invention provides a very general solution to a known problem, such as the basic example problem discussed below in the section "Detailed description" (Example 2), which provides a clear and accessible introduction to the overall concept.

In a first aspect, the present invention concerns a method for constructing a database schema model by a user by means of a computer, comprising the steps of:
  (a) providing a set of collections and optionally one or more relationships linking at least two of said set of collections;
  (b) editing one or more of said set of collections, each of which associated with a schema definition displayed by a single table on an entity relationship diagram on a graphical interface on said computer and comprising at least one object and/or one field, said schema definition editable via a tree diagram on said graphical user interface on said computer;

(c) automatically generating by means of said computer said database schema model for a database system or a REST API;

characterized in that, said set of collections comprises at least one collection comprising a nested object editable via said tree diagram with two levels or more.

Hereby, said "set" may comprise one or more collections. In a preferred embodiment of the method according to the present invention, said set of collections comprises at least two collections, and step (b) comprises generating and/or editing one or more relationships linking at least two collections belonging to said set of collections via said entity relationship diagram on said graphical user interface on said computer; and at least one of said one or more relationships links a first field belonging to a first collection belonging to said set of collections to a second field belonging to a second collection belonging to said set of collections.

In the context of the present invention, the term "collection" comprises any table-like representation of data within the context of databases and database management systems (DBMSes), such as a collection in a NoSQL document database, a REST-API-object, or a "classical" table in a relational database management system (RDBMS). Regardless of whether said collections are generated by the user via said graphical user interface or whether said collections have been imported from another format relating to, e.g., a NoSQL document database, a REST API or a RDBMS, the graphical interactive representation on a graphical user interface of said collections and their interrelationship is an integral part of the present invention.

For said graphical interactive representation of said collections, a tree diagram is used. Hereby, the term "tree diagram" comprises any tree-like structured diagram, said diagram comprising nodes and branches. Hereby, one of said nodes is a root node situated at a so-called top level, connected to different nodes at a lower level by branches, which nodes, in their turn, may be connected to branches at further lower levels. Hereby, the number of levels is counted excluding the top level. A node which is not connected to nodes at lower level is called a leaf node. Each node may comprise a field or an object, whereby an object at a given level comprises various nodes at a level lower than said given level. A nested object is therefore an object that is contained as node within a larger collection, whereby the presence of said nested object results in two levels or more for the tree diagram of said larger collection. In prior art methods, said nested object is not found in RDBMSes, since these assume "flat tables", limited to a table title at top level, and one or more attributes at the first level. This is a result of the fact that in RDBMSes, said nodes in said tree diagram all concern fields and not objects, whereby fields are by default leaf nodes. Likewise, said tree diagram with said two levels or more is found in NoSQL document DBMSes.

The interaction of the user with said graphical interactive representation of said collections allows for a variety of interactive manipulations, such as the editing of properties of each node, the rearranging of nodes within a collection, and the moving of nodes from one collection to another collection.

For said graphical interactive representation of said relationships, an entity relationship diagram is used. Hereby, the term "entity relationship diagram" is to be interpreted in the context of databases and DBMSes, with entities corresponding to collections, and relationships between a first field in a first collection and a second field in a second collection. This type of graphical interactive representation is partially found in RDBMS and NoSQL prior art methods. A related graphical representation is found in many RDBMSes, whereby each collection (a flat table) is a single entity that relates to one or more other collections through a foreign key relationship, involving the concepts of a foreign key and a primary key familiar to the skilled person. In a preferred embodiment of the present invention, two collections can be linked by more than one relationship. Hereby, said relationships may concern foreign key relationships but may also concern foreign master relationships. Linking collections by more than one relationship is desirable in view of the presence of nested objects, which typically exhibit a multitude of relationships, for instance due to the application of so-called denormalization as described in this document. Since RDBMSes do not allow nesting objects, the need for more than one relationship between two collections is much less felt. Furthermore, the reason that said graphical interactive representation of said relationships is not found in NoSQL prior art methods lies in the fact that NoSQL models are inherently schema-less, addressing collections mainly as isolated entities, without a useful way of defining relationships between a first field of a first collection and a second field of a second collection.

Also the interaction of the user with said graphical interactive representation of said relationships allows for a variety of interactive manipulations, such as the editing of properties of each relationship and the rearranging of collections in order to generate new relationships or to edit existing relationships.

Overall, the present invention has the advantage of enabling to handle a very general structure, such as a JSON structure, through improved structure (less collections, only "true" relationships) (particularly in the ERD), sequence preservation (both in the ERD and the tree diagram), interaction (both in the ERD and the tree diagram), and indentation (reflecting nesting) (particularly in the ERD), while state of the art methods fail to do so. The result of the present method is not only more true to the corresponding general structure, such as a JSON document definition, but is also more compact in terms of ERD, allowing for a clearer and overall better overview. Additionally, also the interactive editing of the database schema model is more flexible, with richer interaction thanks to the choice between the ERD and the tree diagram. This is discussed in more detail in Example 2. A related advantage is the ability to better handle polymorphism, as discussed in more detail in Example 4.

A key advantage of an embodiment according to the present invention is that the user is no longer constrained by the limitations of NoSQL and RDBMS prior art methods, allowing both object nesting and versatile relationship generation. In a preferred embodiment, individual collections (which may concern NoSQL collections but may also concern REST-API-objects) are editable in JSON schema definition via a tree diagram, while the relationships between collections are simultaneously editable via said entity relationship diagram. In a further preferred embodiment, this leads a single integrated interactive representation as illustrated, e.g., by FIGS. 60, 61, 63, 65, 66 and 68, greatly improving the efficiency with which said database schema model can be constructed and edited. Also, by providing such an explicit representation, the present invention overcomes the problem with known NoSQL methods, wherein data structures are only tacitly described in the application code.

A related advantage of the present invention is the ability to model relationships. As mentioned above, NoSQL models are inherently schema-less, addressing collections mainly as isolated entities, without possibility of defining relationships between a first field of a first collection and a second field of a second collection. The latter is particularly problematic when a user wants to import a relational database schema model in a NoSQL environment, or, for any reason, desires to follow a RDBMS-like approach by linking collections. While the foreign key relationships comprised in the relational database schema typically play a key role in the organization of data, there is no concept available in NoSQL to model these or other relationships. In a preferred embodiment of the present invention, the database schema model allows to generate and edit foreign key relationships, and, related, leave foreign key relationships intact when importing relational database schema models.

In a further preferred embodiment of the method according to the present invention, said one or more objects comprise an array and/or a sub-document. This allows to incorporate structures known from NoSQL. Also, this plays an important role in the denormalization detailed below.

In a further preferred embodiment, said database schema model is formatted according to any or any combination of the following formats: JSON Schema, YAML, Mongoose, RAML, Swagger, Apache AVRO or Parquet. This has the advantage of providing the user with a format matching his/her specific needs.

According to another preferred embodiment, said automatic generation in step (d) automatically generates a human-readable manual for said database schema model based at least partly on a logical link defined by said one or more relationships. This has the advantage of improving the automated generation of manuals, by incorporating the information that is inherent to the relationships in the generated manual.

In another preferred embodiment, said first collection and said second collection are linked by more than one relationship generated and/or edited in step (c). This has the advantage of further alleviating restrictions imposed by traditional prior art methods. As opposed to NoSQL DBMSes, the database schema model according to the present invention explicitly supports relationships between collections; as opposed to RDBMSes, two collections can be related by more than one relation. In a related further embodiment, on top of that, said first field belonging to said first collection is linked to both said second field and a third field belonging to said second collection by a first and second relationship, respectively. By allowing multiple relationships associated with a single field, which are preferably shown in a single integrated graphical interactive representation, flexibility for the end user is increased.

In a further preferred embodiment, said providing in step (a) comprises generating one or more of said set of collections on said graphical user interface on said computer. The user may thus choose to generate one or more collections directly on screen, and construct a database schema model from there. This has the advantage that the user can manually intervene in said construction, or even construct a database schema model from scratch.

According to a further embodiment, said providing in step (a) comprises denormalizing a relational database schema model provided by the user, said denormalizing comprising extracting said set of collections from a set of tables belonging to said relational database schema model, as well as any foreign key relationships belonging to said relational database schema model, for inclusion in said database schema model. This has the practical advantage that a user desiring to construct a database with NoSQL features such as said database schema model may take an existing available relational database schema model as a starting point, as is often desirable in practice. By "importing" both the collections and the foreign key relationships, all vital aspects of the relational database are carried over to said database schema model to be constructed. According to a related further embodiment, said denormalizing in step (a) further comprises processing a foreign key relationship between a parent collection comprising a primary key and a child collection comprising a foreign key, said processing comprising any or any combination of the following: including a nested sub-document in said child collection, said nested sub-document comprising one or more relationships to said parent collection; including a nested array in said parent collection, said nested array comprising one or more relationships to said child collection. This has the advantage that the features of the relational database are translated "without loss" to a context with nested objects, which is not possible in a RDBMS. This can be done according to different strategies listed above and commented in the detailed description below. In a sense, this translation comprises an "upgrade" of the original relational database schema model, in that the original collections and relationships are preserved, while the possibilities of interacting with said database have been extended to include NoSQL functionality. In a further related embodiment, said processing of a foreign key relationship comprises selecting one or more denormalization preferences on said graphical user interface on said computer, said denormalization preferences comprising any or any combination of the following: a table selection; an embedding preference with respect to said including of said nested sub-document in said child collection and/or of said nested array in said parent collection; a maximum number of cascading levels, a maximum number of recursion levels. This has the advantage that the user may customize the way in which the original relational database is translated into said database schema model, aiming either for a more concise result (e.g. with less tables, less nesting, less recursions) or a more extensive result (more tables, more nesting, more recursions).

In a second aspect, the present invention provides a computer-implemented method for constructing a database schema model upon input of a user according to a method according to the present invention, comprising the steps of:
 (i) receiving a set of collections and/or optionally one or more relationships linking at least two of said set of collections, optionally upon input of said user via a graphical user interface;
 (ii) receiving edit instructions for each of said set of collections with respect to a schema definition upon input of said user via a tree diagram on said graphical user interface;
 (iii) generating upon request of said user said database schema model for a database system or a REST API;
characterized in that, said set of collections comprises at least one collection comprising a nested object editable via said tree diagram with two levels or more.

In a preferred embodiment of said computer-implemented method, said set of collections comprises at least two collections, and step (ii) comprises receiving generate and/or edit instructions with respect to one or more relationships linking at least two collections belonging to said set of collections upon input of said user via said entity relationship diagram on said graphical user interface. Furthermore, at least one of said one or more relationships links a first field belonging to a first collection belonging to said set of collections to a second field belonging to a second collection belonging to said set of collections.

In a third aspect, the present invention provides a use of a database schema model constructed with a method according to any of the presented invention in a database system or a REST API. In a preferred embodiment thereof, said database system is any or any combination of the following: MongoDB, Couchbase, CouchDB, Amazon DynamoDB, RavenDB, Microsoft Azure DocumentDB, MarkLogic, EnterpriseDB, Oracle SQL, MySQL, PostgreSQL, Microsoft SQL, Oracle for NoSQL, ElasticSearch, Snowflake, FinchDB, MariaDB, IBM Cloudant, Google Cloud Datastore, Cassandra, BerkeleyDB, RethinkDB, Mapr. This has the advantage of providing a superior user experience due to the integration of the present invention in the working environment to which it applies, yielding improved convenience for the user.

In a fourth aspect, the present invention provides a computer system for constructing a database schema model upon input of a user, said computer system comprising a processor, non-volatile memory, program code present on said memory for execution on said processor, a graphical interface, wherein said computer is configured to carry out a computer-implemented method according to the present invention. The advantages of such a computer system are similar to those of the related computer-implemented method.

DESCRIPTION OF FIGURES

The present invention may be more readily described by reference to the accompanying drawings in which:

FIG. 37 shows the 'Details' tab of the properties of a collection.
FIG. 62 illustrates a foreign key relationship.
FIG. 63 shows a denormalization result.

FIG. 72 shows a parameter interface relating to the denormalization process.

FIG. 73 shows an example problem with solution according the present invention.

FIG. 74 shows the "JSON document to model" of the example problem.

FIG. 75 shows the "Modeling with traditional ER software" of the example problem.

FIG. 76 shows the "Modeling according to present invention" (part 1 of 2) of the example problem.

FIG. 80 shows an example ERD.

DETAILED DESCRIPTION OF THE INVENTION

Figure 1:
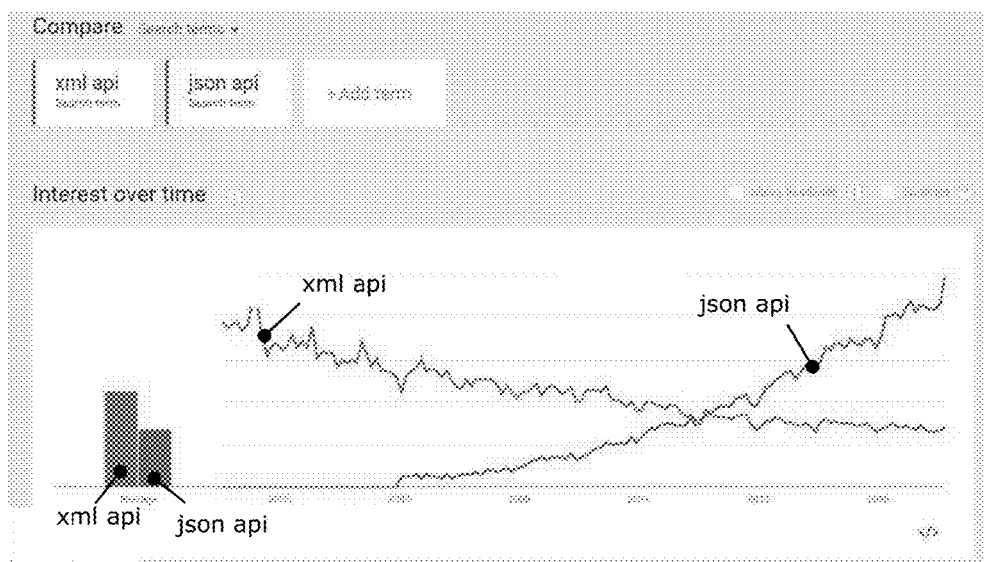
FIG. 1 illustrates trends in the rise of JSON.

In this document, the term "document" relates to a collection; particularly, data belonging to a collection is typically stored in one or more documents, preferably JSON documents. In this document, both "foreign master relationships" and "foreign key relationships" fall under the class of "relationships", whereby foreign master relationships concern relationships that are not foreign key relationships. Furthermore, the acronym "GUI" stands for Graphical User Interface.

A key aim of the present invention is to provide programmers, application developers and database managers with a powerful new method to construct database models. To this end, the present invention combines the graphical interactive representation of collections in a tree diagram with the graphical interactive representation of relationships between collections in an entity relationship diagram. Together, these graphical representations provide both the schema model and the documentation of that model. The present invention facilitates the work of, and the dialog between a variety of users such as analysts, architects, designers, developers, testers, and operators of systems that are based on such technologies. In a preferred embodiment of the present invention, schemas and documentation can be generated in a variety of machine-based formats such as JSON Schema, Mongoose, collection definition scripts, RAML, Swagger, YAML, Apache AVRO or Parquet, or human-readable formats. In a further preferred embodiment, the user is facilitated in the importing of a relational database schema model and its translation into a database schema model according to the present invention.

According to another aspect of the current invention, which is not intended to limit the scope in any way, the present invention provides a method and system to graphically model a database schema model for NoSQL document databases and REST APIs. Specifically, it provides a method and system to combine 1) the graphical representation of collections (in NoSQL Document Databases) or objects (in REST APIs) through an Entity Relationship diagram, with 2) the graphical representation of the JSON Schema definition of said collections or objects through a Tree-like structured diagram. Together, these graphical representations provide the schema model of a NoSQL document database or REST API, and the documentation of that model. The invention is further described by the following non-limiting example which further illustrates the invention, and is not intended to, nor should it be interpreted to, limit the scope of the invention.

According to another aspect of the current invention, not intended to limit the scope in any way, the present invention provides a method for graphically modeling schemas for NoSQL document databases and REST APIs, comprising providing a graphical representation of one or more collections or one or more objects, and simultaneously providing a graphical representation of a JSON Schema definition of said collections or objects through a tree-like structured diagram.

According to another aspect of the current invention, not intended to limit the scope in any way, the present invention provides a system for graphically modeling schemas for NoSQL document databases and REST APIs, said system configured to provide a graphical representation of one or more collections or one or more objects, and to simultaneously provide a graphical representation of a JSON Schema definition of said collections or objects through a tree-like structured diagram.

The present invention is directed to the construction of database schema models, whereby the database schema model may be a simple known representations such as a single JSON document, but also a "multi-model" database schema model, as long as the database schema model exhibits said nesting corresponding to a tree diagram with two levels or more. Hereby, the term "multi-model" refers to a database schema model that comprises features of both relational databases and NoSQL databases, and hence cannot be assigned to only one of these categories, as is currently emerging in the database community.

The present invention relates to database schema models such as the ones considered by MongoDB and other NoSQL systems such as DynamoDB. Hereby, several specific terms are borrowed from the context of existing systems, in particular MongoDB. However, it is important to note that the terms used in the present invention are chosen in correspondence to MongoDB merely for clarity's sake, and are not to be interpreted as limiting the invention in any way. Hence, the terms "collection", "document", "field", "sub-document" and "array" are similar yet not necessarily identical to the counterpart terms of the same name in MongoDB and many other NoSQL systems and/or RDBMSes. Moreover, some NoSQL systems use different terms; particularly DynamoDB adopts a different naming convention. Also Couchbase and Cassandra adopt a slightly different terminology. The following list of counterpart terms is included for clarity's sake, without limiting the present invention in any sense.

| SQL | MongoDB | DynamoDB | Couchbase | Cassandra |
| --- | --- | --- | --- | --- |
| Table | Collection | Table | Bucket | Table |
| Record | Document | Item | Document | Row |
| Column | Field | Attribute | Field | Column |
| Primary Key | ObjectID | Hash (& range) | Object ID | Primary Key |
| Index | Index | Index | Index | Index |
| Partition | Shard | Partition | Cluster | Partition |
| View | View | Global Secondary Index | View | Materialized View |
| n/a | Sub-document | Map | Map | Map |
| Array | Array | List | List | List |

Following are four examples relating to embodiments of the present invention. While Example 1 is directed to a multitude of aspects of the invention, Example 2 considers the simple case of a single JSON document with nesting, for which the invention equally applies. Example 3 relates to referencing in denormalization. Example 4 considers an example ERD and associated tree diagram according to an embodiment of the present invention.

Example 1

1. Project Drivers

The project relates to the activities of IntegrIT (doing business as Hackolade).

1.1 References

The following reading may be useful to inform the reader of the context:

JSON and BSON specifications: http://json.org/ and http://bsonspec.org/JSON

Schema specification: http://json-schema.org/Trends in the rise of JSON, cfr FIG. 1

1.2 the User Problem and Context of the Project 1.2.1 Schema-Less NoSQL Databases JSON-based document-store NoSQL databases (MongoDB, Couchbase, CouchDB, Amazon DynomoDB, MarkLogic, OrientDB, RavenDB, Microsoft Azure DocumentDB, EnterpriseDB, etc., cfr. http://db-engines.com/en/ranking/document+store) promote the concept of a "schema-less" approach with many advantages, such as the flexibility for the schema to easily evolve over time, or the ability to start storing and accessing data without first defining a schema.

The data transformations and data characteristics in NoSQL systems are not often mapped in models. The tools for such modeling haven't existed. The data isn't often captured in models; it's tacit in the code. To understand how the data is stored and read, the code has to be examined. The model is essentially "implicit" to the programmers and developers working on the system: it is in their brains and then is manifested in the code of the system.

The advantage of a schema-less DBMS is that one can start storing and accessing data without first defining a formal schema. While this sounds great, and certainly facilitates a speedy start to a data project, experience shows that a lack of forethought is usually followed by a lot of afterthought. As data volumes grow and access times become significant, thought needs to be given to re-organizing data in order to speed up access and update, and sometimes to change tradeoffs between the speed, consistency, and atomicity of various styles of access. It is also commonly the case that patterns emerge in the data's structure, and the realization grows that, although the DBMS demands no particular data schema, much of the data being stored has some significant schema in common.

1.2.2 Use of Schema Definitions

A data model of some kind is vital: definitions, elements, transformations, and relationships still need to be understood and documented. There is no way for an organization to gain a 360° view of their entire business at all data, system, application, decision process, transaction, and customer levels without some sort of models or maps to explain them.

A database model gives the opportunity to play with database design options on paper, on a whiteboard, or in a drawing tool, before one has to worry about the syntax of data definitions, data already stored, or application logic. It's a great way to think through the implications of data organization, and/or to recognize in advance important patterns in the data, before committing to any particular design. It's a lot easier to redraw part of a model than to recreate a database schema, move significant quantities of data around, and change application code.

A schema is a vehicle for describing content to determine compliance. It is often used under the covers as part of vetting content for entry into a program by a validation process.

It can also be effectively used as a tool for creating correct content and accelerating the correction process. This is especially true for content created by people or generated through interactive systems, where dynamic processes are part of the content definition.

Sometimes using a schema or other data definition capability is viewed as "locking down" a system, or making it inflexible. However, with the expressiveness of JSON Schema, the purpose of the schema is not to limit flexibility, but rather to correctly express only what is required from the data content, create useful notices of corrections required, and leave the remaining content to the programs to interpret.

1.2.3 Benefits of Using a Schema

Validation can be done with program logic. In fact, a significant portion of many programs is used to validate inputs to be processed by the program. This includes start-up command processing, reading configuration files, reading data files, receiving messages, and accepting user input.

In each case, the goal of the validation process is to determine whether the input content is correct and complete before invoking further processing. The use of a schema, and a corresponding validation function to apply the schema to the content, allows the validation function to be processed by a purpose-built function rather than bespoke coding. The schema definition, being in the domain of the data definition, is more expressive and easier to understand than program logic.

With simplified definition and maintenance, it is more likely that the validation will be:

More complete, since the time to produce schema content can be less than the time to write program logic to perform this task.

More readable. Reading program logic for validation often requires reading a mix of stream processing, type checking, and expression checking logic. Reading a schema focuses on the data representation, without the other processing logic mixed in.

Used correctly by others producing content. Often program logic is a black box, or the documentation limited, making determining all valid inputs for particular elements, or whether elements are required or optional, difficult to ascertain without excellent documentation being provided. Providing a schema to other parties makes the task of creating correct content to provide to the program much easier. Not all content benefits equally from using a schema. A program that only has one or two configuration options doesn't have a significant amount of validation code, and a program that expects free form content may not have enough definition to be very useful. Selecting the programs, and places in the program, where schema definitions can be of benefit is a design choice.

1.2.4 JSON Schema

In the message exchange space, JSON is commonly used in implementing REST web services. Its broad use reflects the flexibility of JSON-formatted content to support iterative definition for message exchanges between systems, coexistence with a range of technologies, and ease of understanding.

In addition to configuration files, many programs also have data management requirements. While some programs have requirements suitable for using databases, others have more modest needs and are better suited to the flexibility of using JSON files. However, for JSON-suited programs, as the content expands (both in the structure of the data model as well as the amount of data stored), there is greater risk of data consistency errors. Also, as is the case with many configuration files, updates to the data may be made with text editing tools and are subject to errors—often minor. Finding these errors is often more work than correcting them—a missing comma, misplaced closing } or ], or a typo in a keyword. Fortunately, there are two tools that address this well:

JSON syntax checkers, which find syntax errors.
JSON Schema, and its affiliated validation tools, which find content errors.

As JSON has gained support across a broad array of programming languages/runtime platforms, the use of JSON formatted files for configuration files and similar uses is now an available option for many projects.

JSON and JSON Schema are strong foundational technologies, with many avenues for building interesting and useful capabilities around them.

1.3 Goals

The present invention allows analysts, solution designers, architects, developers, and database administrators to visually design, model, define, and create documentation for the schemas of JSON Document-based NoSQL databases and REST APIs. The related application enables users to do with JSON documents what has been possible respectively for relational databases and for XML documents.

The graphical interface will let the user visualize and maintain a diagram of the model collections and their relationships, as well as the content of the collections. The outputs of the model will be: JSON documents and JSON-Schema v4-compliant JSON (http://json-schema.org/documentation.html), scripts (MongoDB, Mongoose, etc.), and a detailed documentation of the model in HTML (as well as Markdown, PDF and RTF formats) as well as RAML and Swagger.

The application will store in a local or central repository the properties of one or more documents defined by the user, as well as their relationships, if any.

2. Requirements
2.1 Business Requirements
2.1.1 Domain

Figure 2:
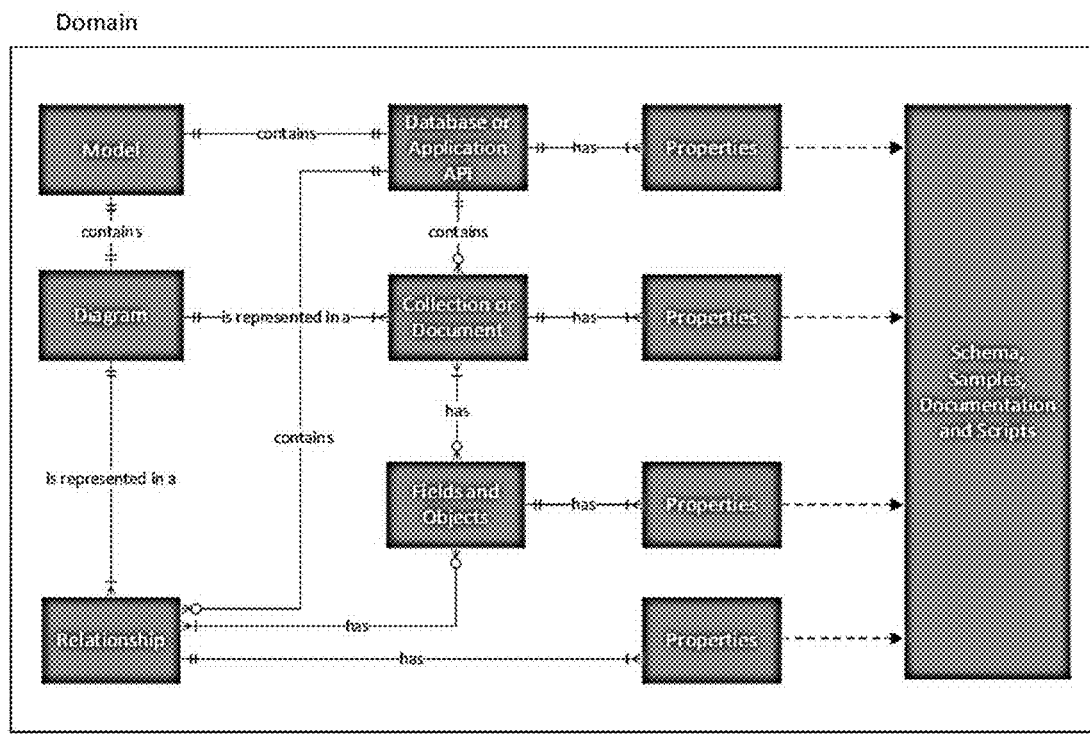
FIG. 2 illustrates the domain model.

Cfr FIG. 2. The application lets a user create a Model. The model is made of one Diagram for one Database (for MongoDB and other NoSQL systems) or Application (for REST APIs.) A Database is made of one or more Collections (or Documents) and possibly of logical Relationships between them. A Collection is made of Fields and Objects. It is possible for Relationships to exist between certain Fields of different Collections. The Database and each of its Collection, and each of the Collection's Fields and Objects, as well as Relationships, all have Properties. Collections and Relationships are represented in a Diagram. Diagram and properties lead to outputs in the form of Schemas, Samples, Scripts, and Documentation files.

2.1.2 Business Use Cases
Storage/retrieval of models
User creates a new model from scratch
User retrieves a previously stored model
User saves or cancel changes since last save
User saves a model under a new name as a new stored version of the previously saved model
Modeling
User defines a database and its properties
Graphically adapts layout of entities
User creates Collections, their content and related properties
Graphically
With a grid
Through the text-based editing of JSON Schema
User creates Relationships and their properties
User can visualize and print different outputs:
Model Entity Relationship (ER) diagram
Collection Document Type Definition (DTD) diagram
JSON document sample
JSON Schema
HTML/Markdown/PDF/RTF documentation
MongoDB Script
Mongoose Schema
Scripts for other database vendors
Utilities
Where-used capability
JSON validator
JSON Schema validator
Model comparison
Reverse engineer a database schema
Reverse engineer JSON documents and JSON Schema files
Repository
License key management
Check for and install updates to the application Regarding said Model Entity Relationship (ER) diagram, note that strictly speaking the concept of ER is generally related to relational databases, and not JSON or NoSQL databases. For ease of communication however, the concept is adopted in this document, but the vocabulary will not transpire in the application.

Regarding said Collection Document Type Definition (DTD) diagram, note that strictly speaking, the concept of DTD is related to XML and not JSON. For ease of communication however, the concept is adopted in this document, but the vocabulary will not transpire in the application.

2.2 Functional Requirements
2.2.1 User Interface
2.2.1.1 Application Sections

Figure 3:
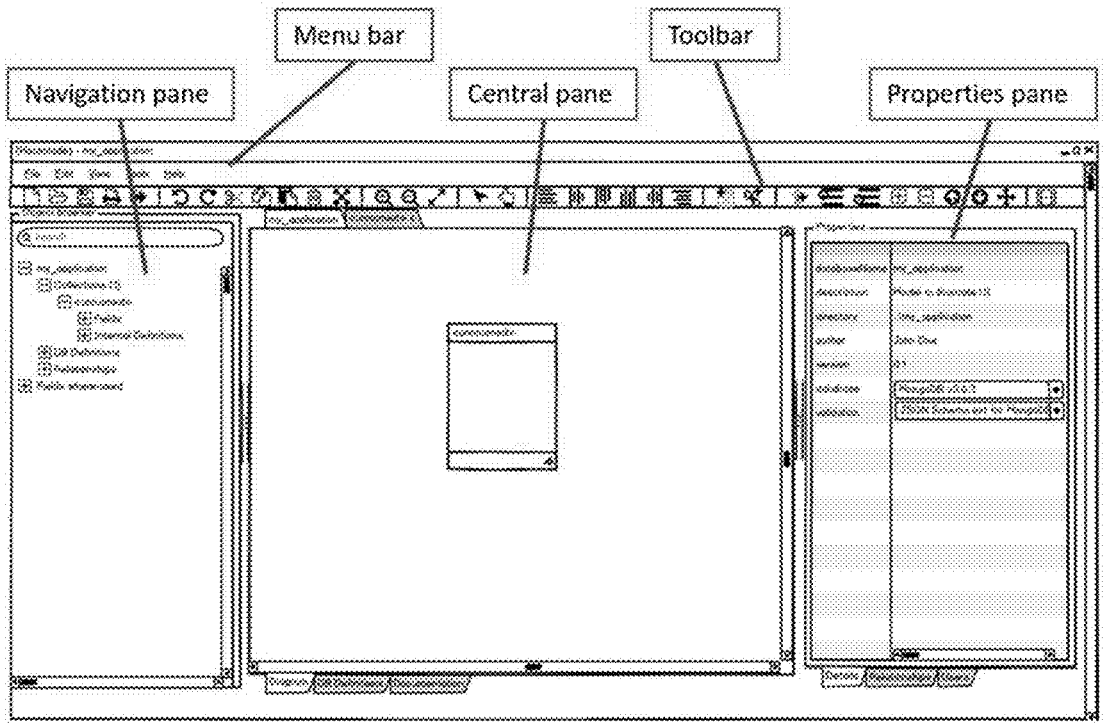
FIG. 3 illustrates the graphical user interface.

The application screen is divided in several sections, cfr. FIG. 3.

The different sections are described below.
2.2.1.1.1 Menu Bar

Figure 4:
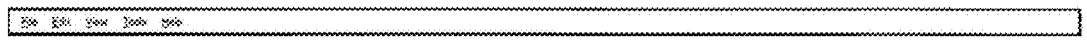
FIG. 4 shows the menu bar.

Cfr FIG. 4. These menus are configured in JSON documents to allow easy changes in relevant properties without programming impact. Options are greyed out if unavailable to the user in the application context.

Figure 5:
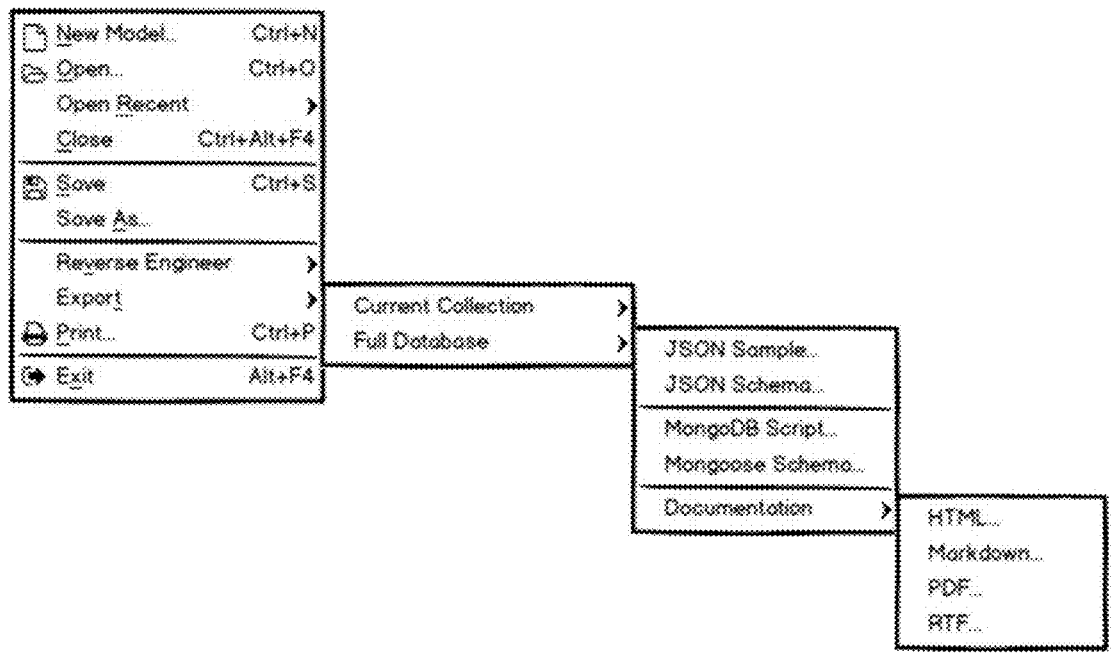
FIG. 5 shows the file menu (item: Export).

Each menu option is described in further detail below.
2.2.1.1.1.1 File Menu
Cfr FIGS. 5 & 6.

| | |
|---|---|
| New Model | Create a new model. If current model has unsaved changes, user is prompted to Save (or Save As if current model has never been saved.) In a later phase, user may be prompted to choose a model type (MongoDB, other NoSQL, REST API, basic JSON, . . .) |

| | |
|---|---|
| Open . . . | Retrieve an existing model. |
| Open Recent | Show sub-menu of last 5 model names opened. |
| Close | Close model. |
| Save | Save all changes to model. |
| Save As . . . | Save the model to a different repository name. |
| Reverse Engineer . . . | Select a JSON Document file, JSON Schema file, or Mongoose Schema on the file system, so the application can derive some collection properties. Specify access to a database, so the application can derive some collection properties. |
| Export | Export, for the current collection or for the entire database, the JSON Sample, JSON Schema, MongoDB Script, Mongoose schema, other NoSQL database, or documentation. |
| Print . . . | Print the current diagram. |
| Exit | Quit the application. |

2.2.1.1.2 Object Browser

Figure 7:
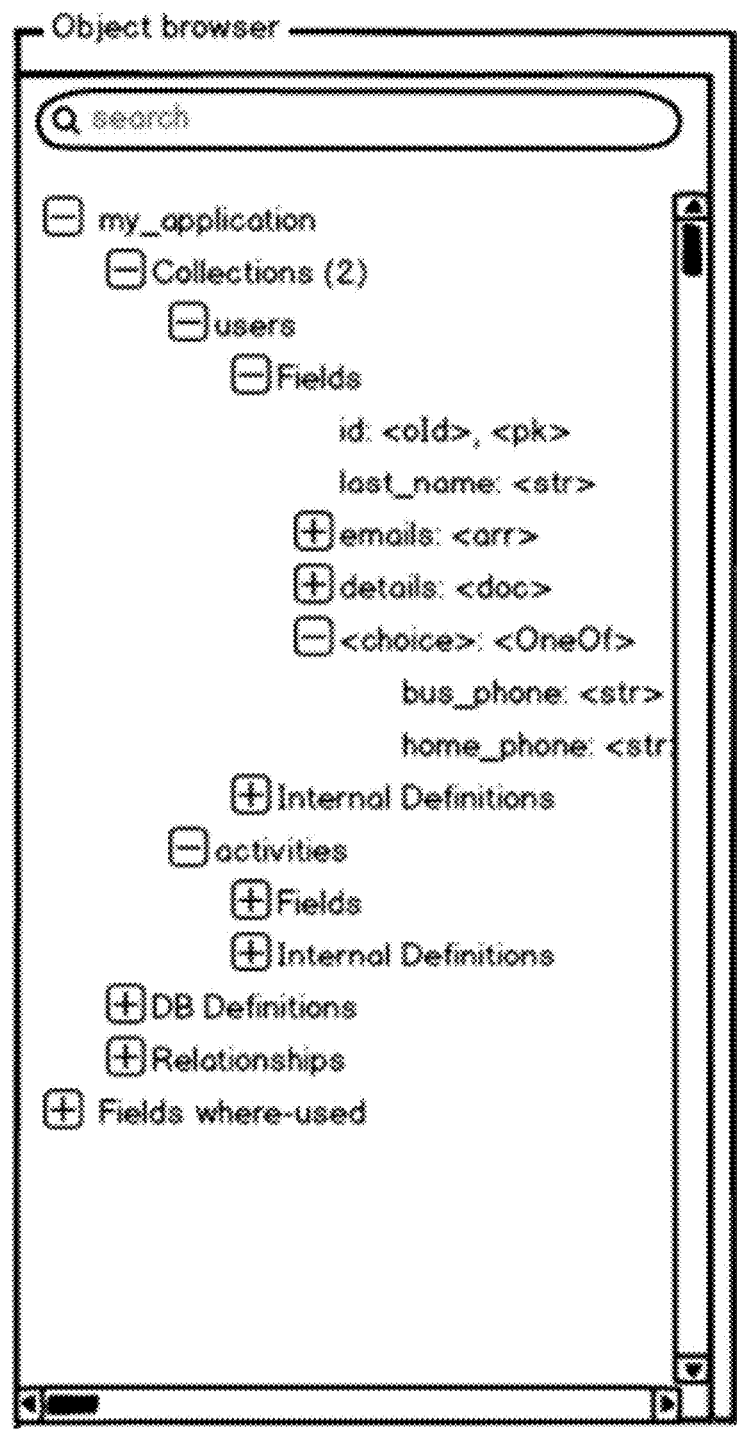
FIG. 7 shows the Object browser.

Cfr FIG. 7. This pane is dynamically constructed based on entities created in the Central and Properties panes. It provides a structured outline view of the model, and a quick access to elements of the model. This pane also includes a search bar as well as a 'where used' view of the elements.

If the data does not fit in the pane, vertical and horizontal scroll bars appear.

When elements in the pane are clicked, the central and the properties pane display more information.

Thanks to a toggle in the View menu, the user may choose to make the pane disappear (in order to provide more space for the central pane), or to make it re-appear.

2.2.1.1.3 Central Pane

Figure 8:
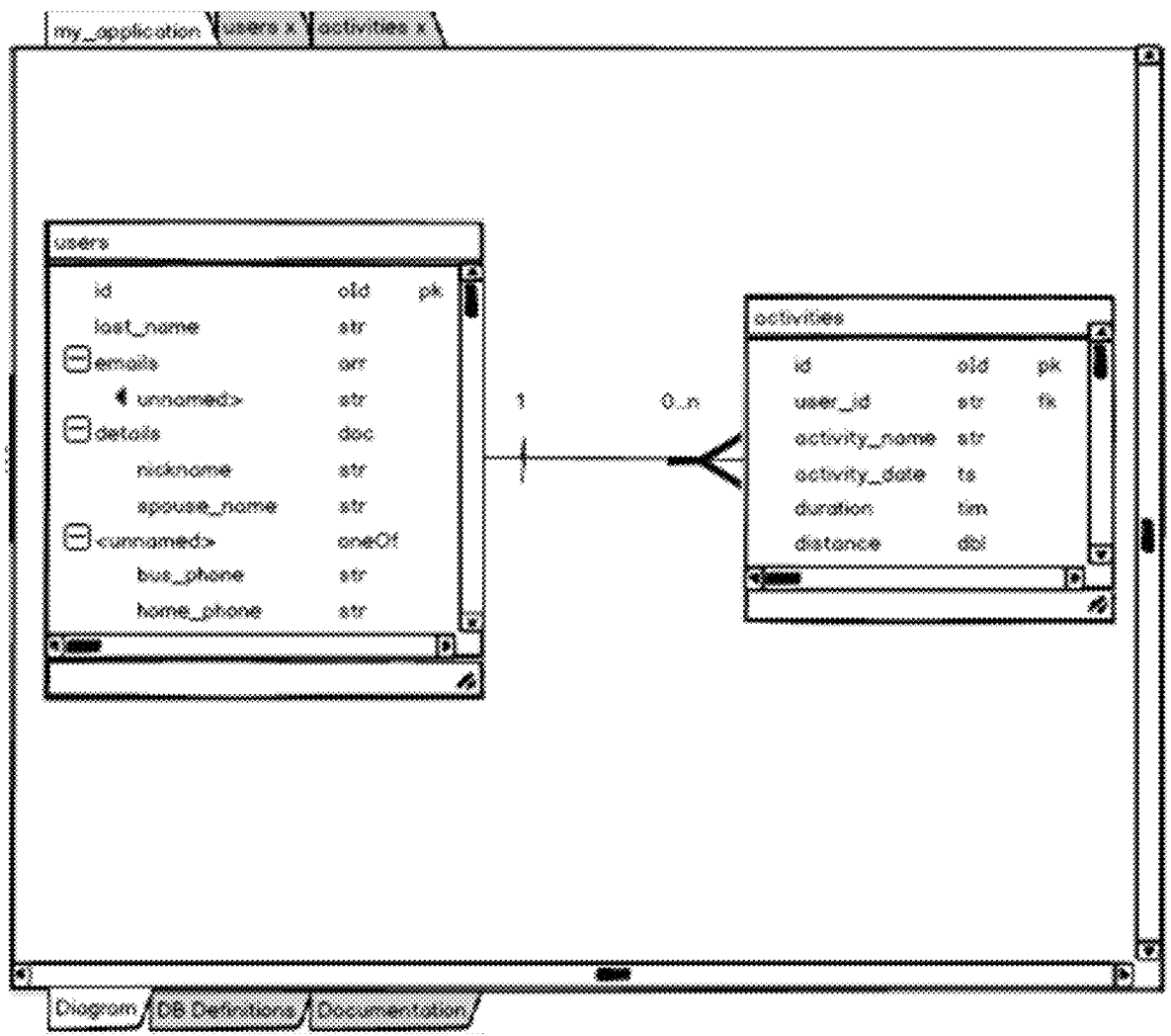
FIG. 8 shows a first view of the central pane, displaying an example entity relationship diagram.

The Central pane serves several purposes:

Graphical view of the database entity relationship diagram, cfr FIG. 8

Figure 9:
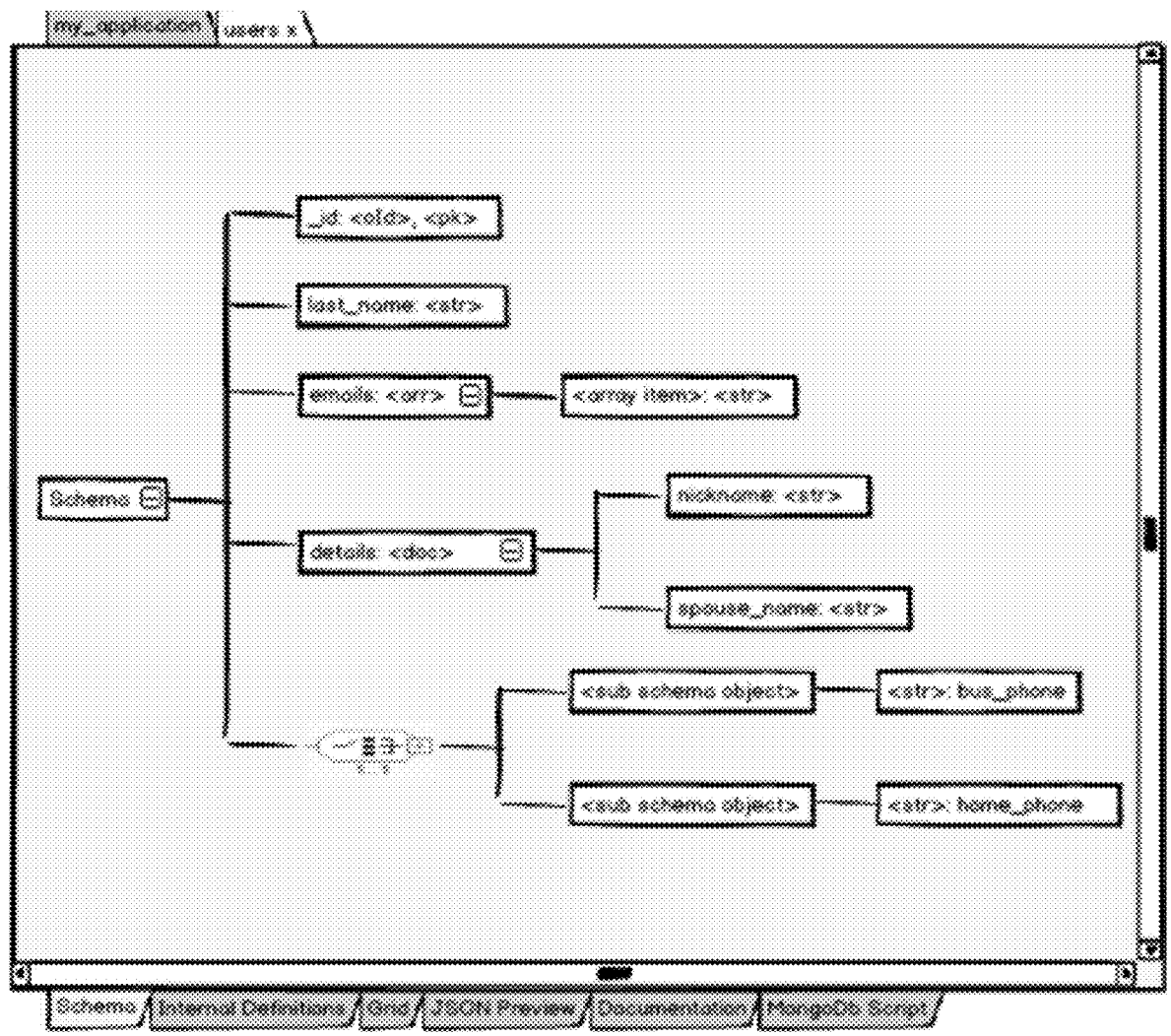
FIG. 9 shows a second view of the central pane, displaying an example tree-like structured diagram.

Graphical view of the field hierarchy diagram for a collection, cfr FIG. 9

Graphical view of database and collection definitions, cfr FIG. 8

Figure 10:
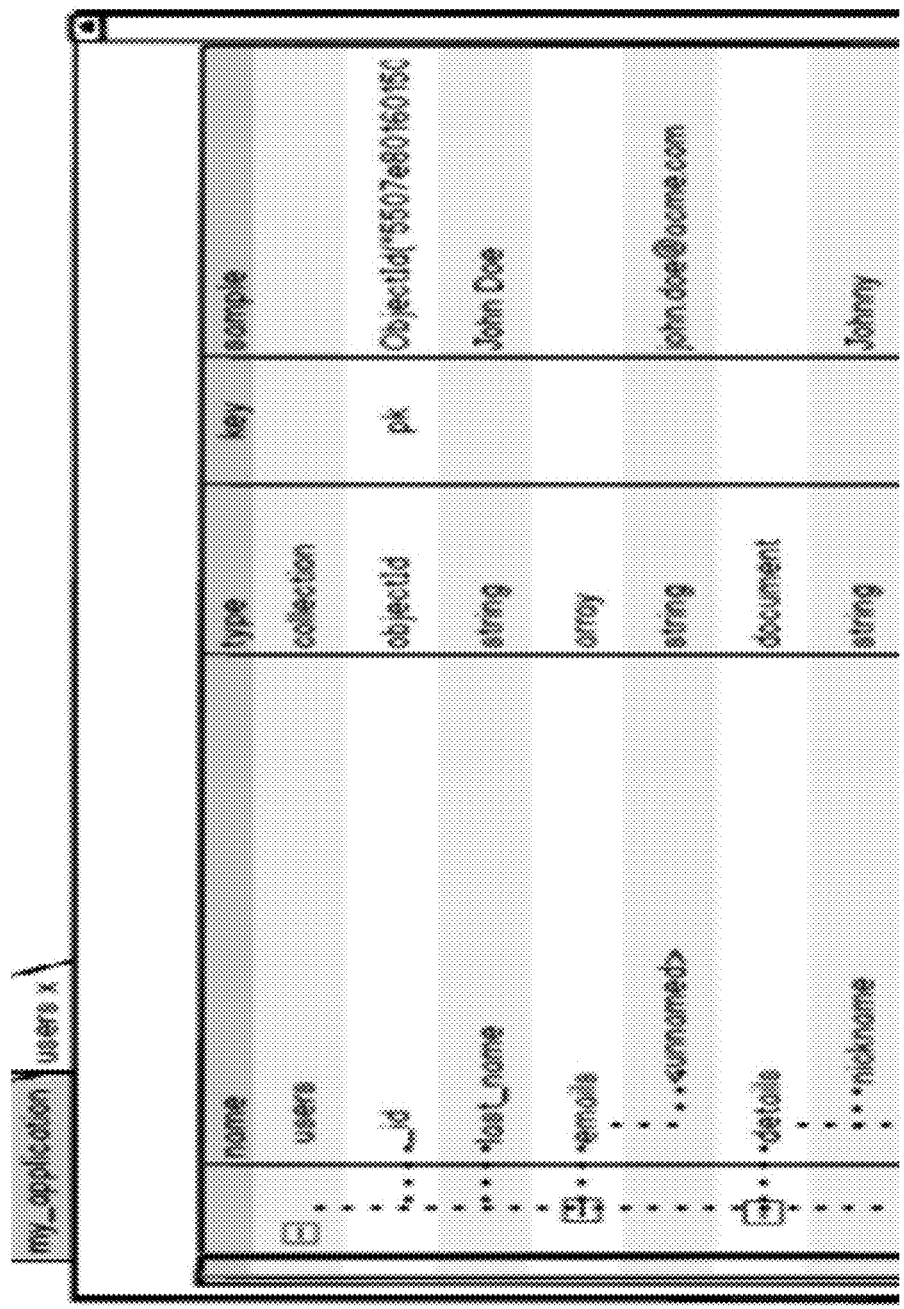
FIG. 10 shows a third view of the central pane, displaying an example grid view.
Figure 10:
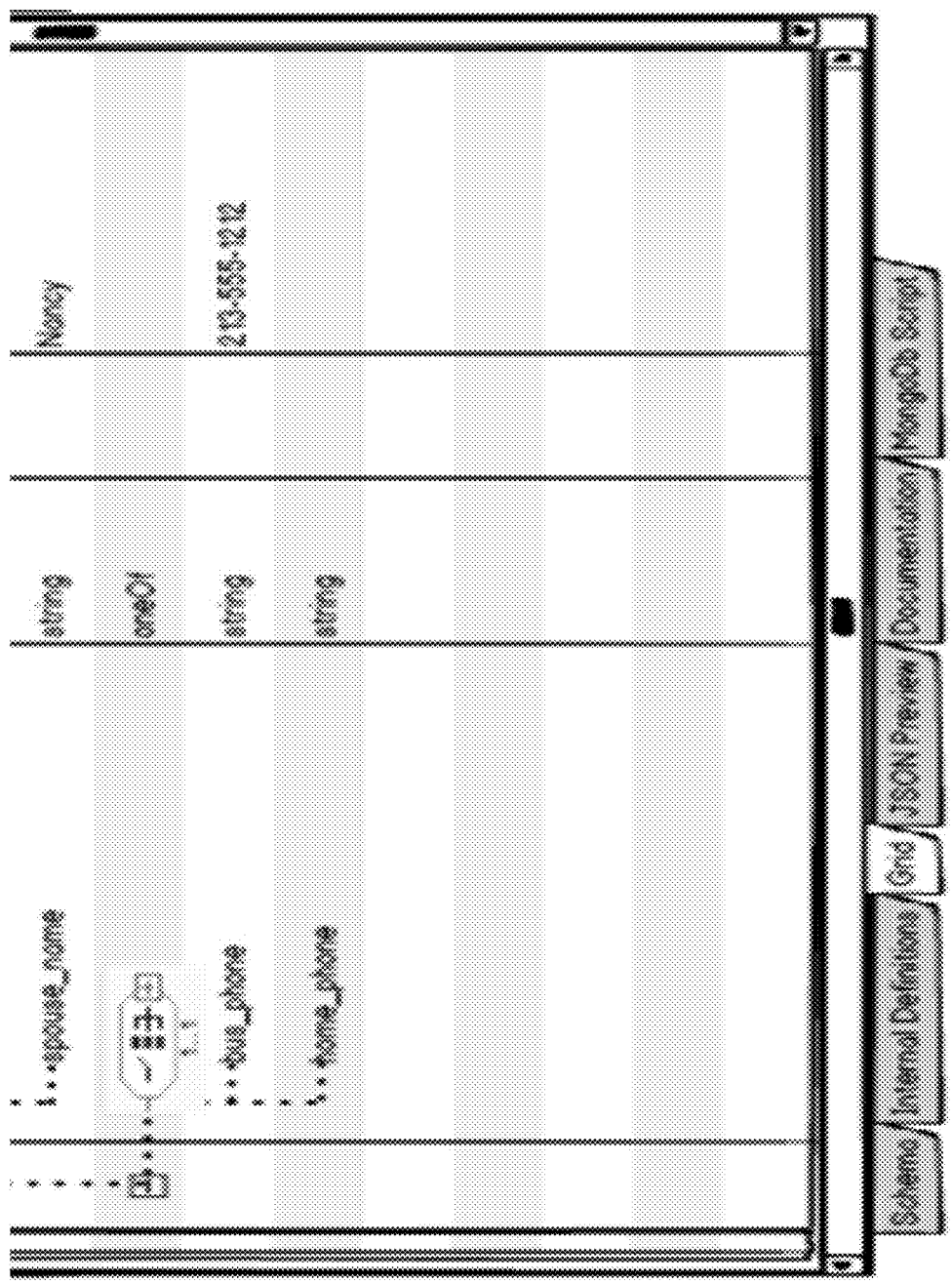

Grid view of the fields of a collection, cfr FIG. 10

Figure 11:
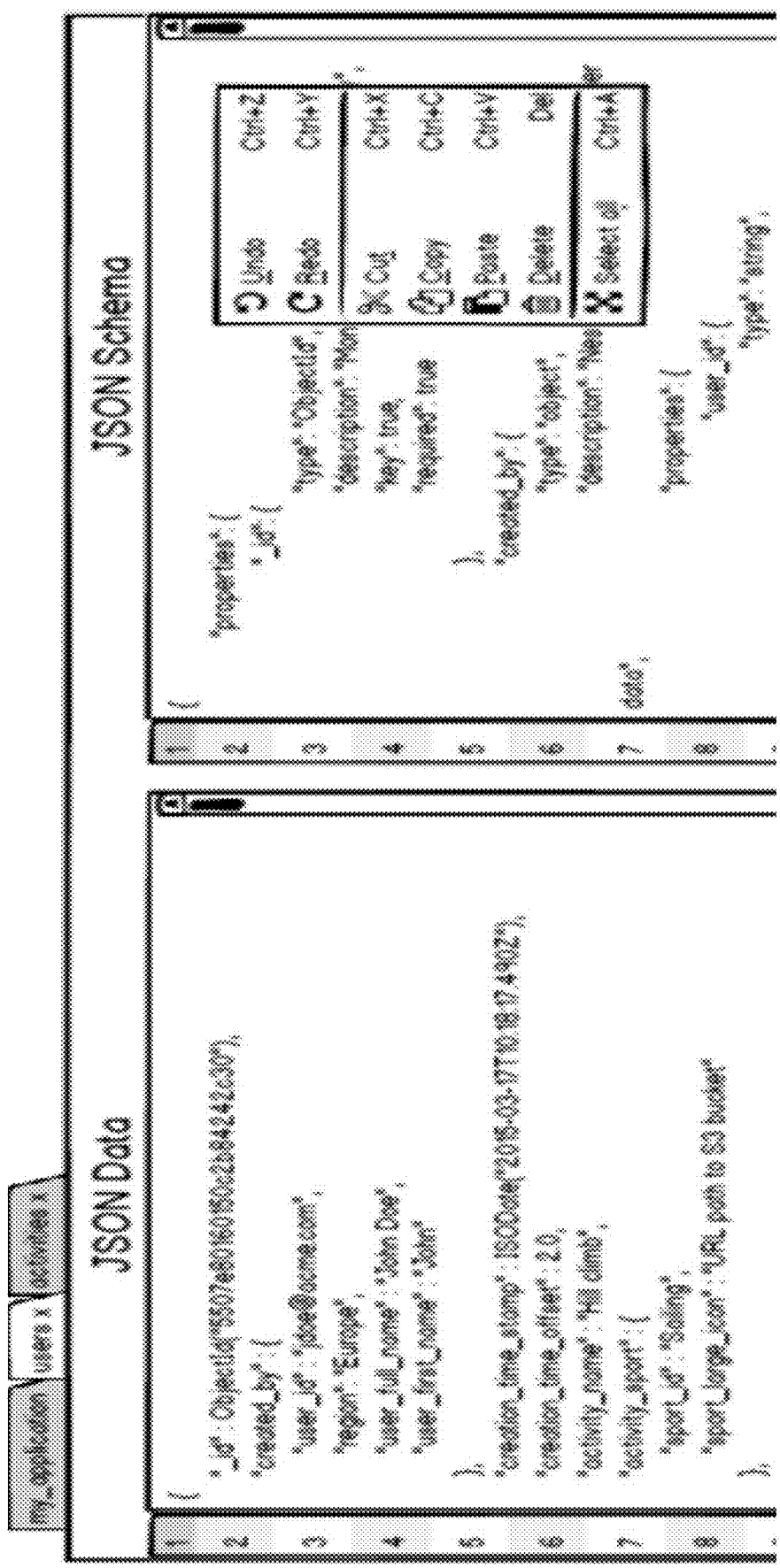
FIG. 11 shows a fourth view of the central pane, displaying an example JSON preview.
Figure 11:
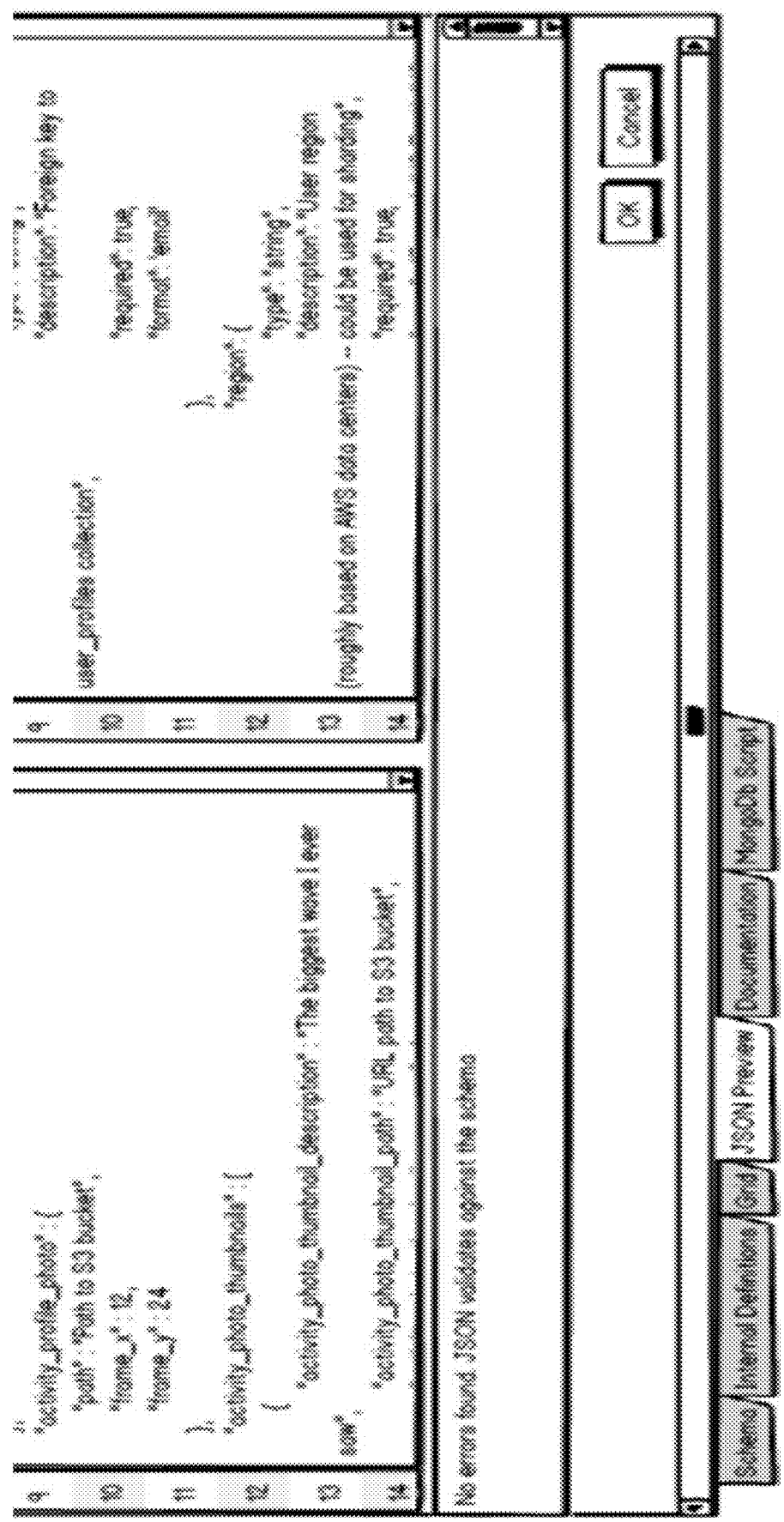

JSON preview of a sample document for a collection and corresponding schema, cfr FIG. 11

Figure 12:
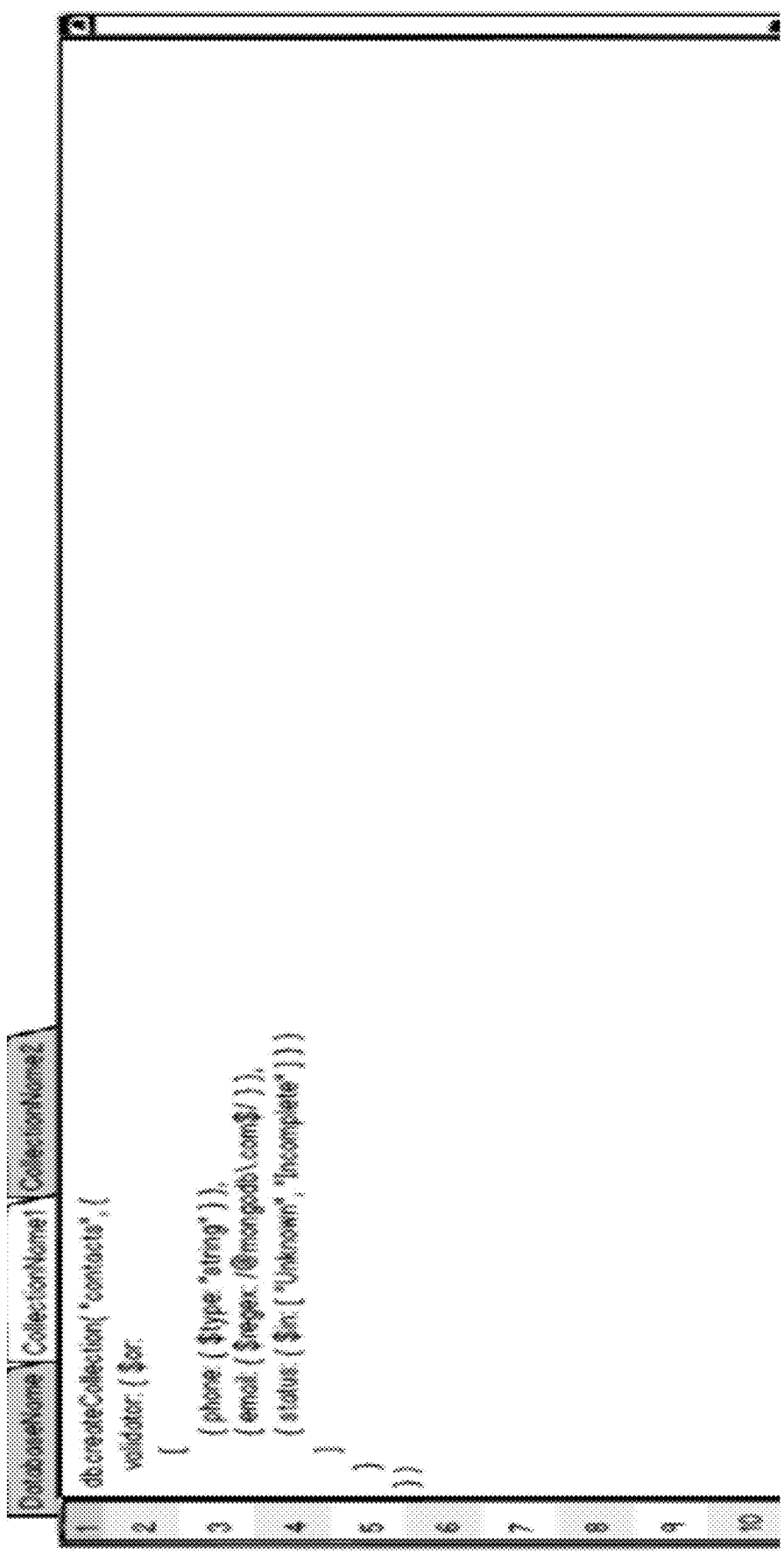
FIG. 12 shows a fifth view of the central pane, displaying an example database creation script.
Figure 12:
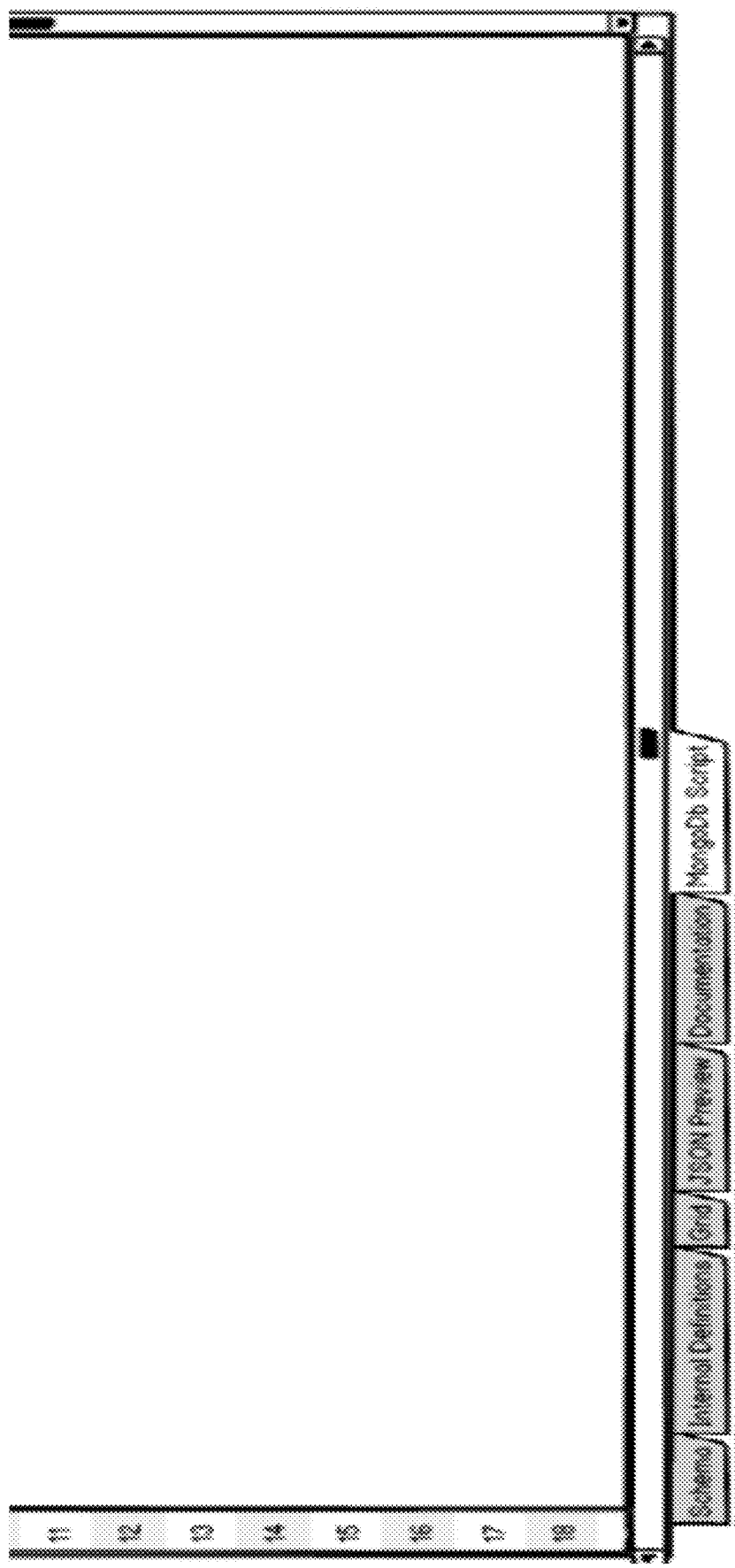

Preview of database creation script for a collection, cfr FIG. 12

Figure 13:
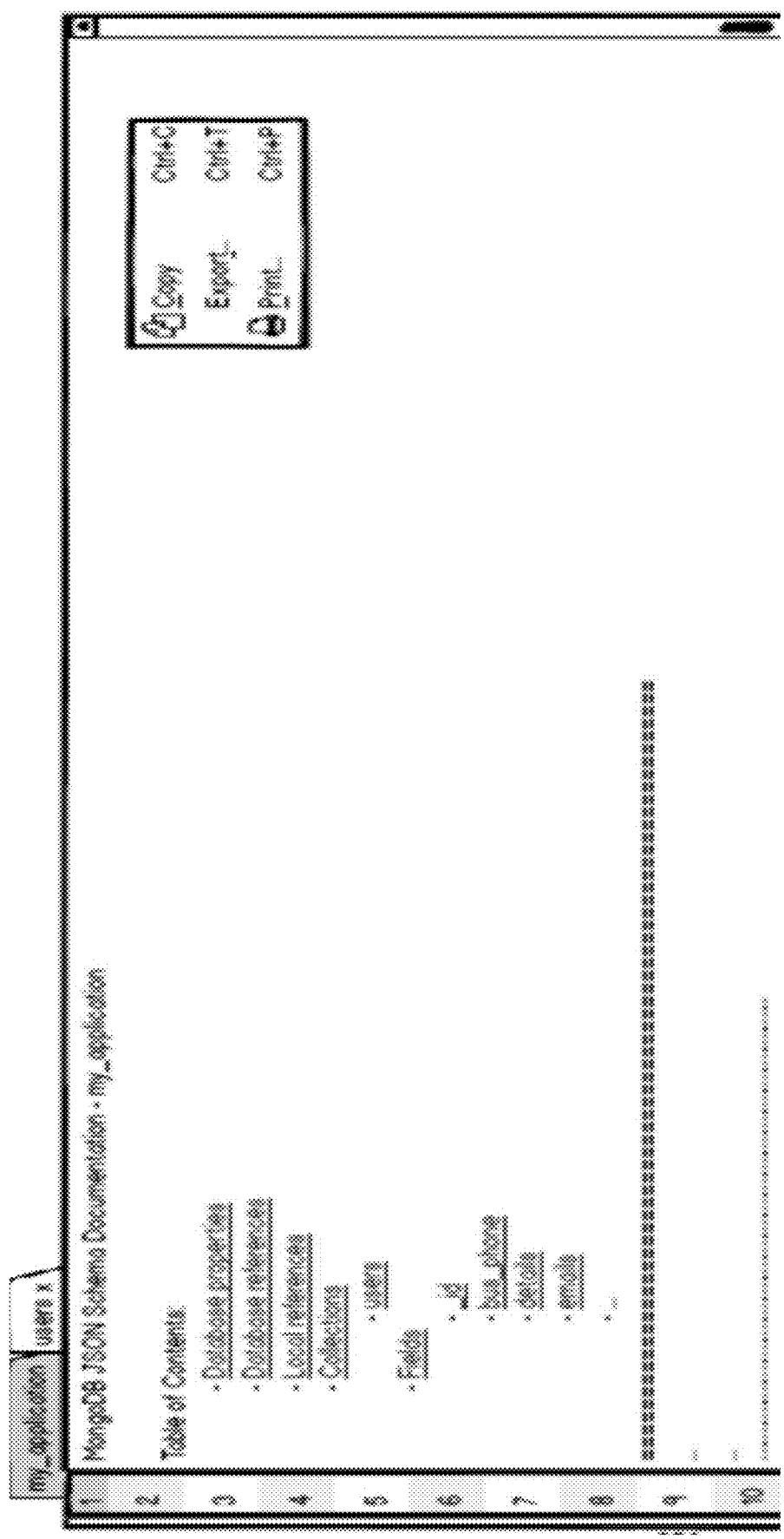
FIG. 13 shows a sixth view of the central pane, displaying an example database documentation.
Figure 13:
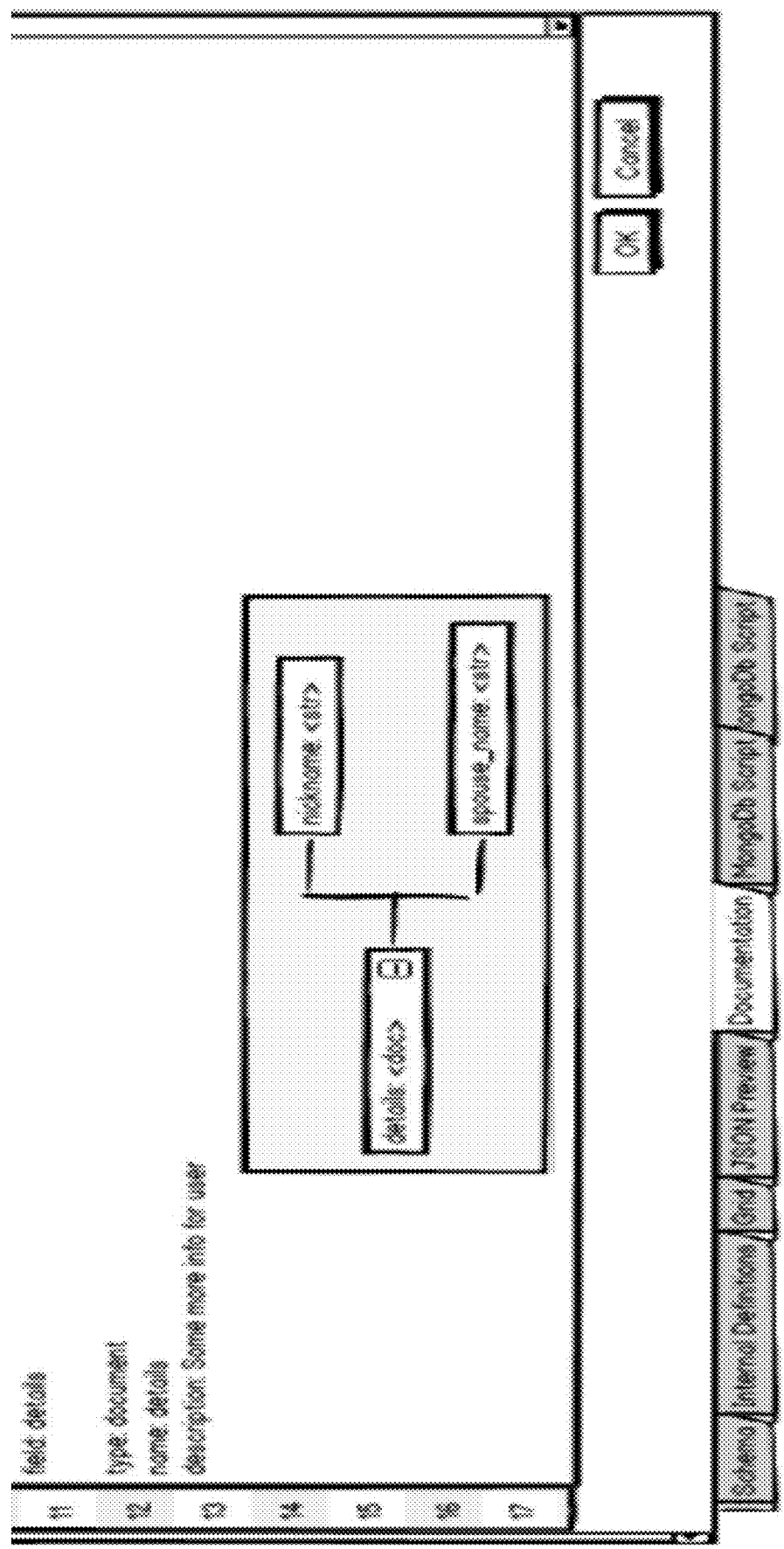

Database and collection documentation, cfr FIG. 13

The pane has 2 sets of dependent tabs: top and bottom.

Figure 14:
FIG. 14 shows example top tabs of the central pane.

The top set has one fixed tab, the tab for the model database, and one tab for each collection created or consulted, cfr FIG. 14. Collection can be closed, re-opened, and moved around, whereas the database tab remains fixed. If too many tabs are opened to fit in the width of the pane, depending on the library used, tabs will keep their size (full length of Collection name) with arrows left/right will let the user scroll (Firefox-style), or the tabs will shrink with a tooltip (Chrome-style.)

Figure 15:
FIG. 15 shows the first set of bottom tabs of the central pane (corresponding to the database top tab).
Figure 16:
FIG. 16 shows the second set of bottom tabs of the central pane (corresponding to the collection top tabs).

There are 2 bottom sets of fixed tabs, one set of bottom tab for the database top tab, cfr FIG. 15, and one set of bottom tab for the collection top tabs, cfr FIG. 16.

The bottom tabs cannot be closed or moved.

The central pane has both a vertical and a horizontal scroll bar if the data or diagram do not fit in the pane, particularly in responsive mode.

The central pane can display graphics (database and collection), a grid, JSON (sample/schema), documentation, or database script. These tabs are functionally linked together, and changes in one may have effects on the other, and vice-versa. They need to be dynamically updated.

The pane is permanent (cannot appear or disappear like the Object Browser or the Properties Pane.) However, its size may vary with the appearance or disappearance of the Object Browser and/or the Properties Pane. The user may manually modify the width distribution of the 3 panes.

Figure 17:
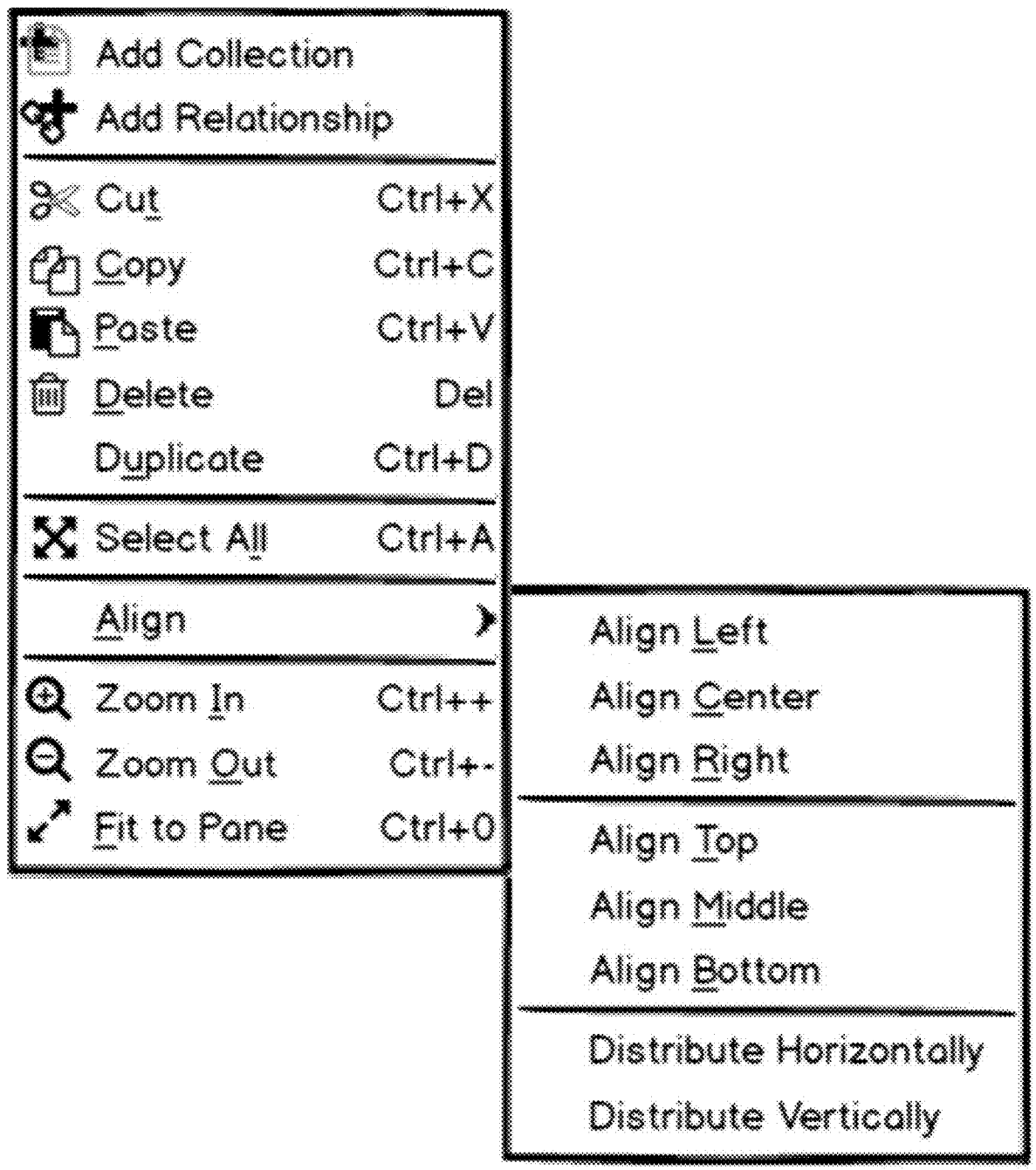
FIG. 17 shows the contextual menus (item: Align).
Figure 18:
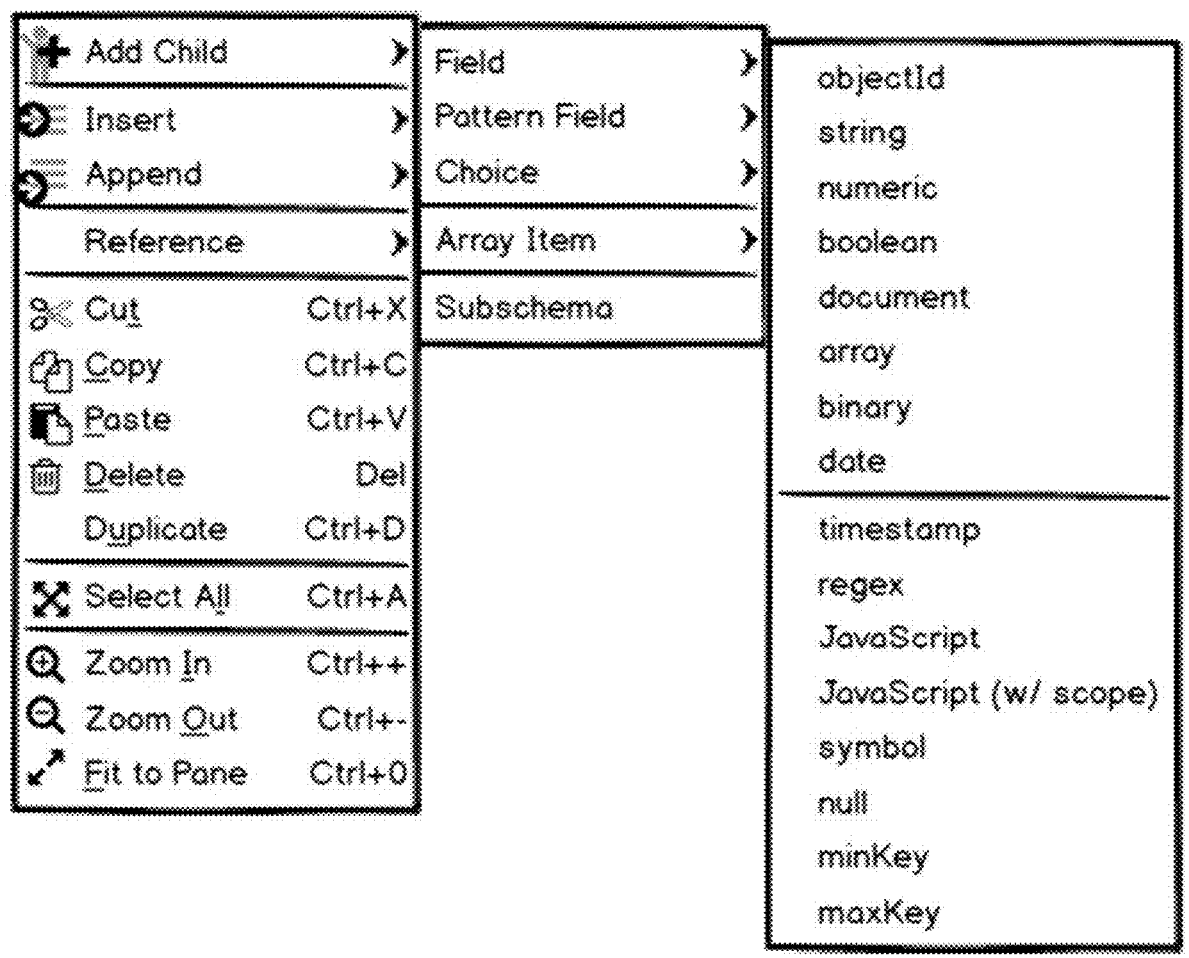
FIG. 18 shows the contextual menus (item: Add child).
Figure 19:
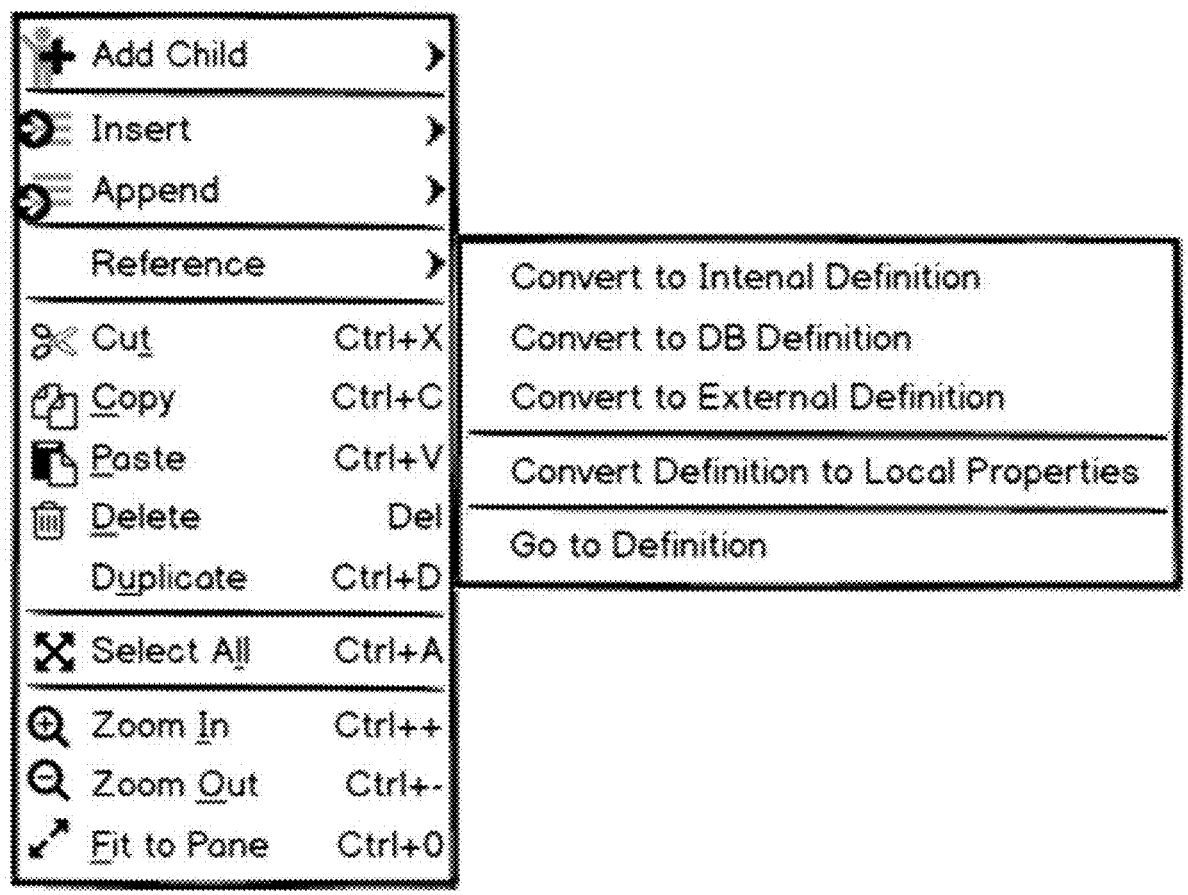
FIG. 19 shows the contextual menus (item: Reference).

The Central Pane supports contextual menus (right mouse click), cfr FIG. 17-19.

These contextual menus are configured in JSON documents to allow easy changes in relevant properties without programming impact. Options are greyed out if unavailable to the user in the application context.

Arrow keys direct the following behavior:

In the ER diagram when a collection is selected: move it around

In the DTD diagram: move from one element to the other:

Left and right arrow keys: move shallower or deeper in the tree

Up and down arrow keys: move along the elements of the current level in the tree 2.2.1.1.4 Properties Pane This pane is where most of the data entry is performed. It can have different configurations depending on the element being edited/displayed.

There are 3 levels of properties panes: database (including relationships), collection, and field. The appropriate properties pane is displayed depending on the element being selected in the Central Pane or the Object Browser. The properties panes for database and for collections have fixed bottom tabs.

Figure 20:
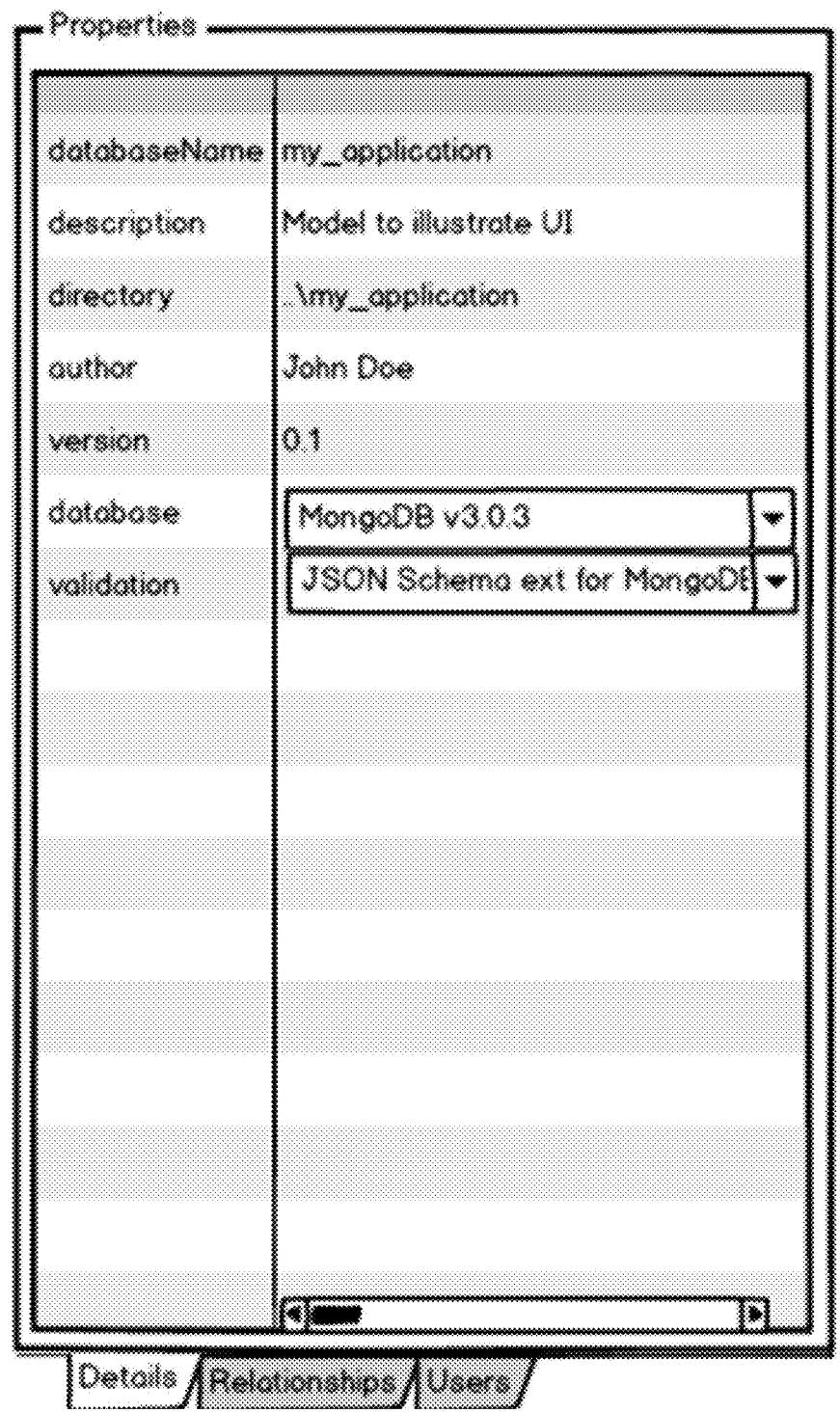
FIG. 20 shows a first view of the properties at database level.
Figure 21:
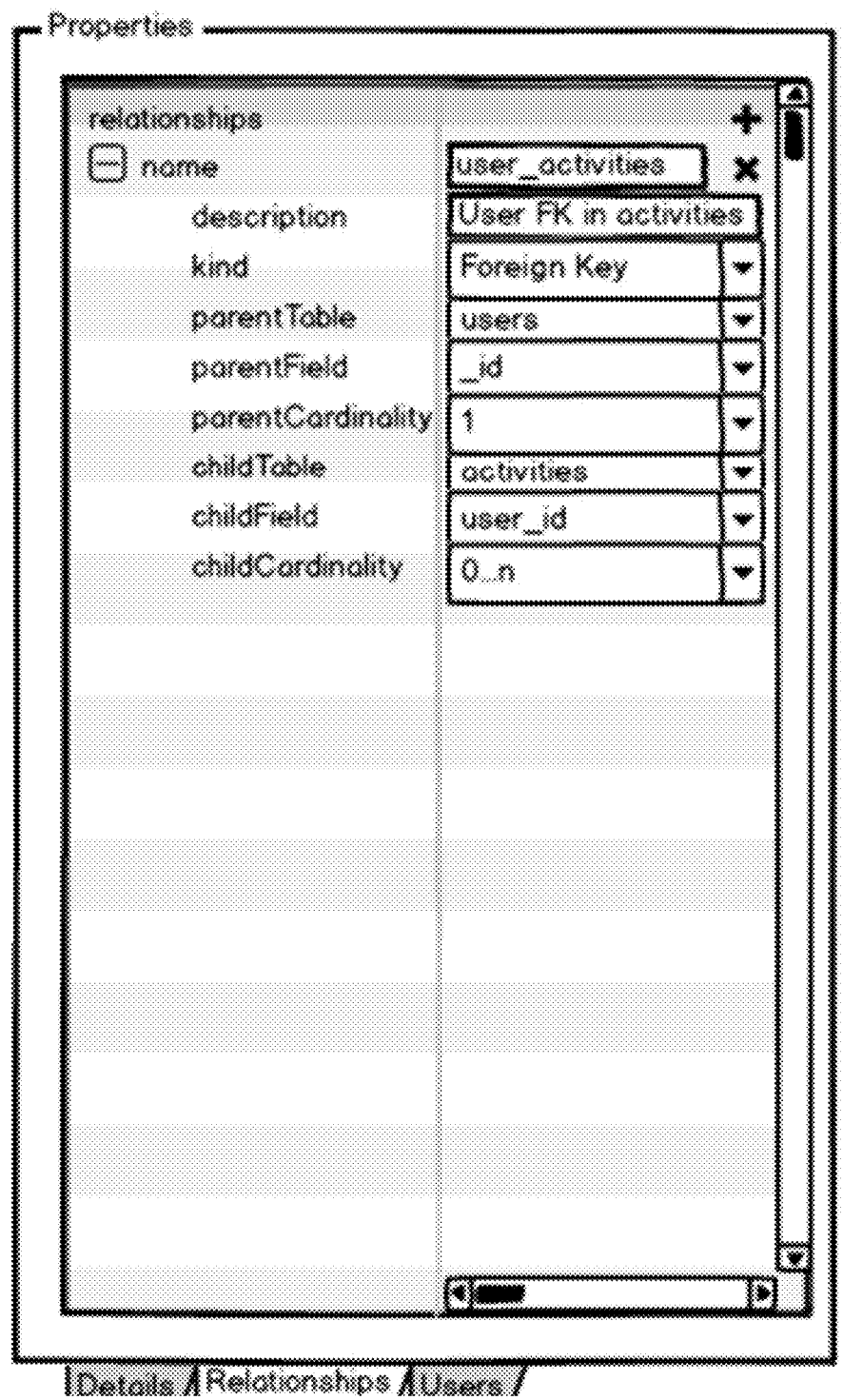
FIG. 21 shows a second view of the properties at database level.
Figure 22:
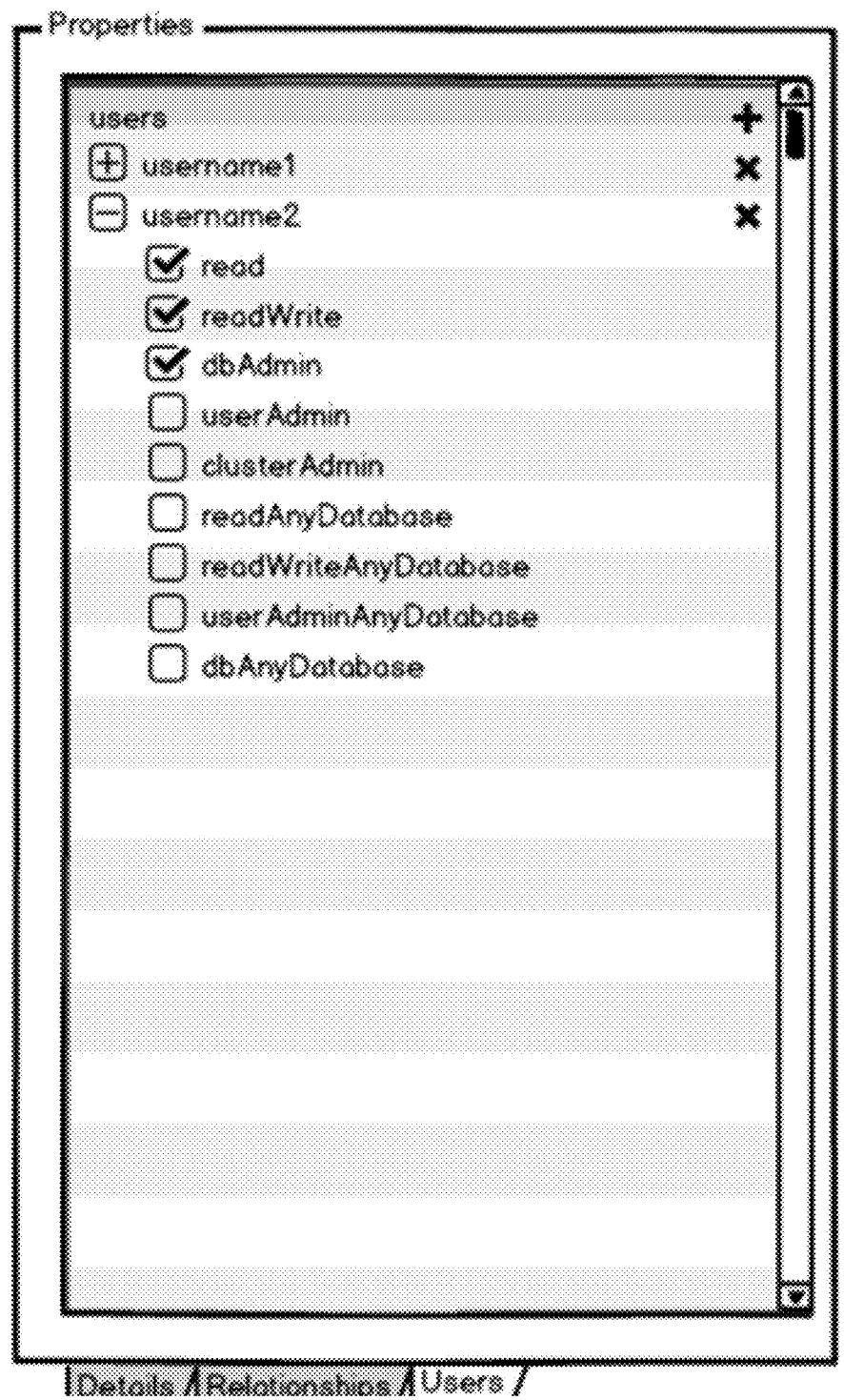
FIG. 22 shows a third view of the properties at database level.

Properties at database level, cfr FIG. 20 through 22

Figure 23:
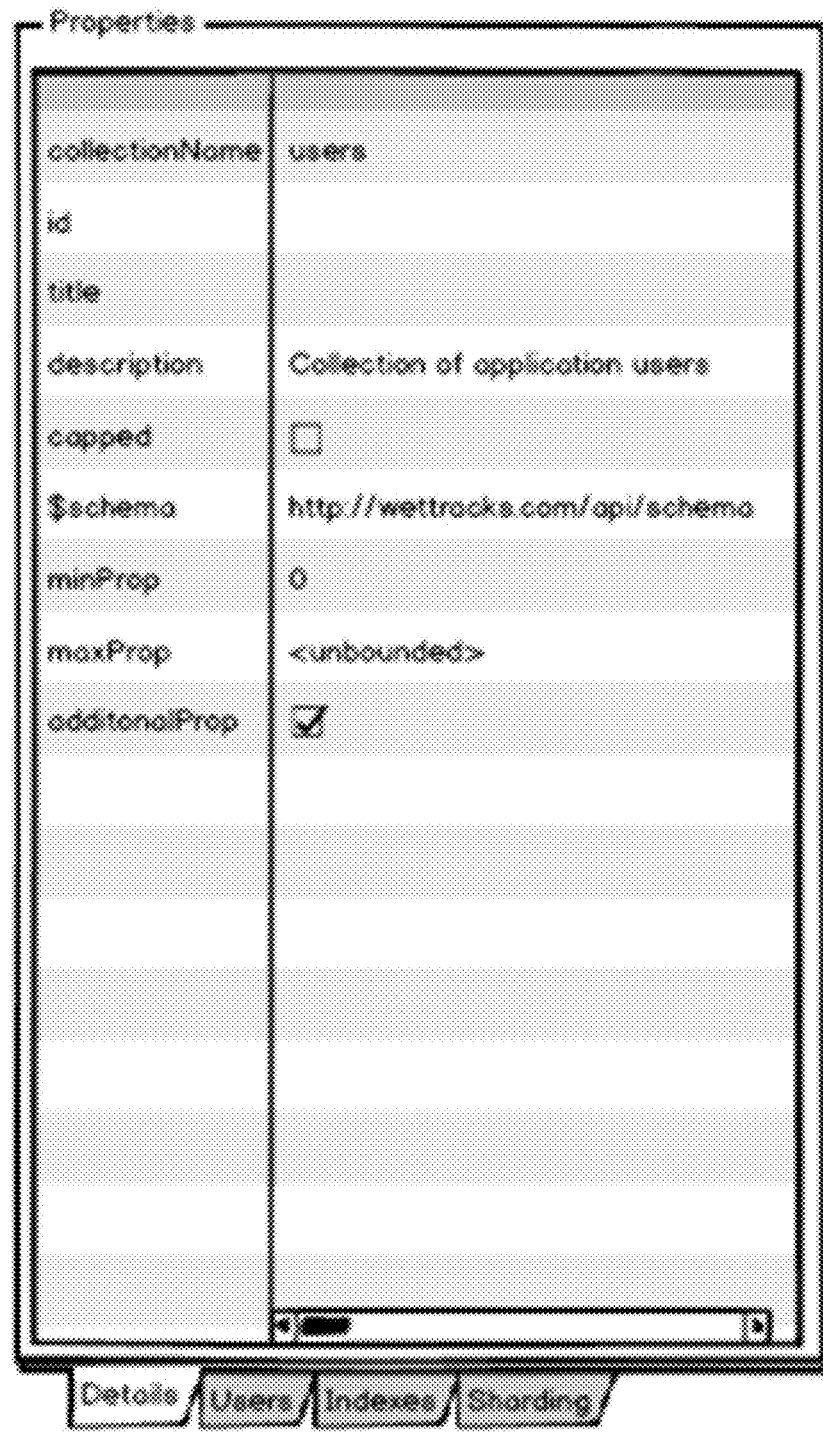
FIG. 23 shows a first view of the properties at collection level.
Figure 24:
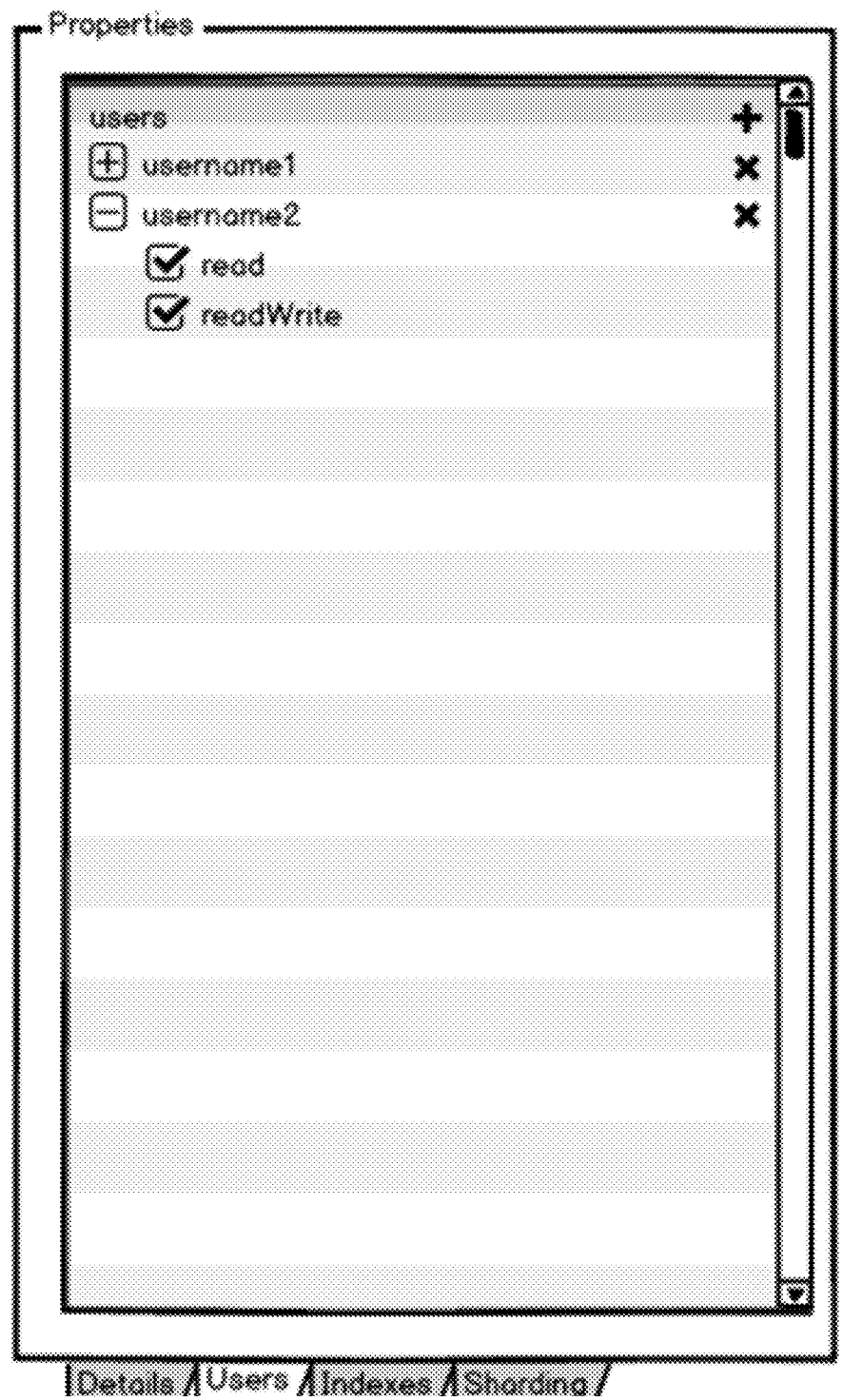
FIG. 24 shows a second view of the properties at collection level.
Figure 25:
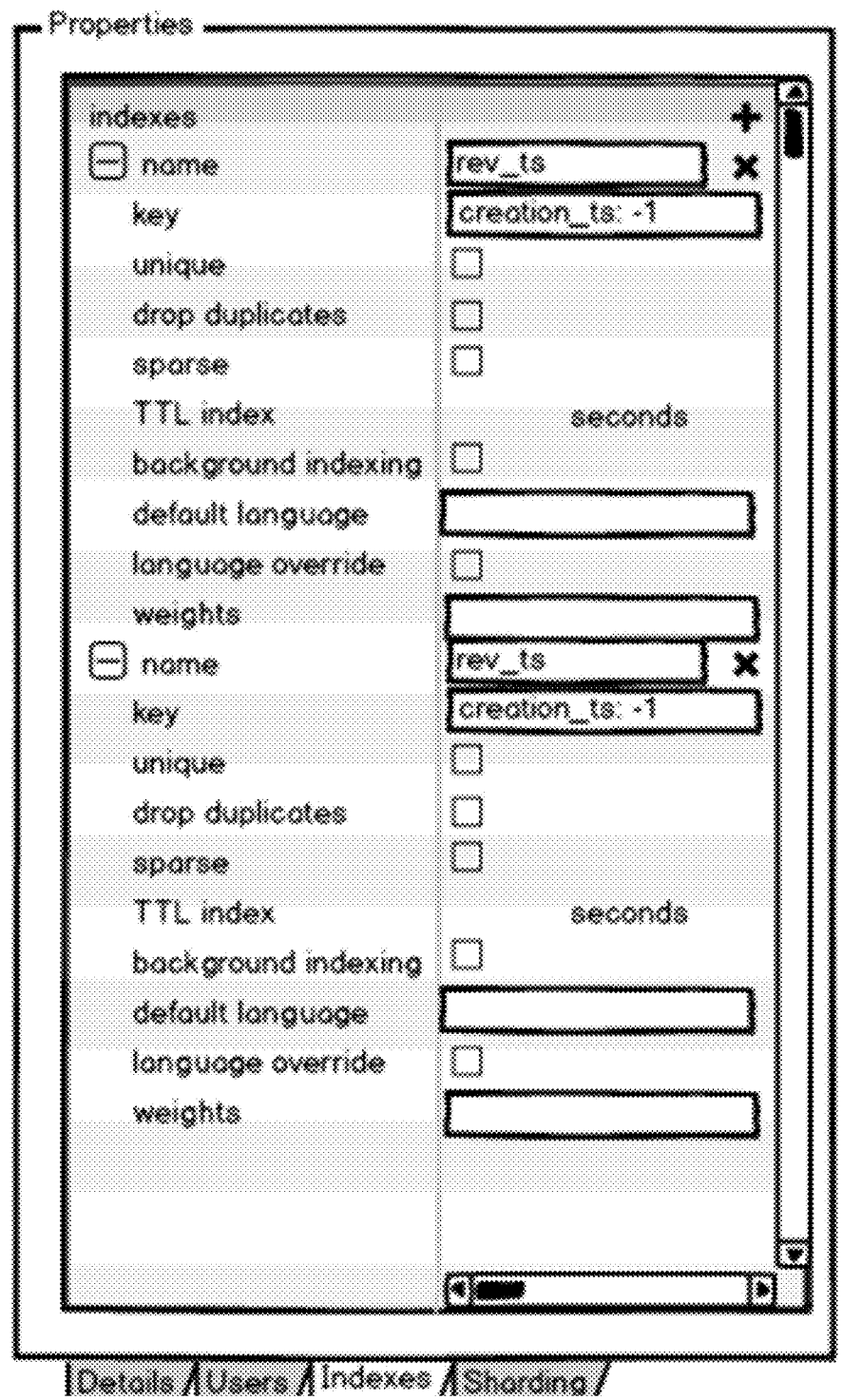
FIG. 25 shows a third view of the properties at collection level.

Properties at collection level, cfr FIG. 23 through 25

Figure 26:
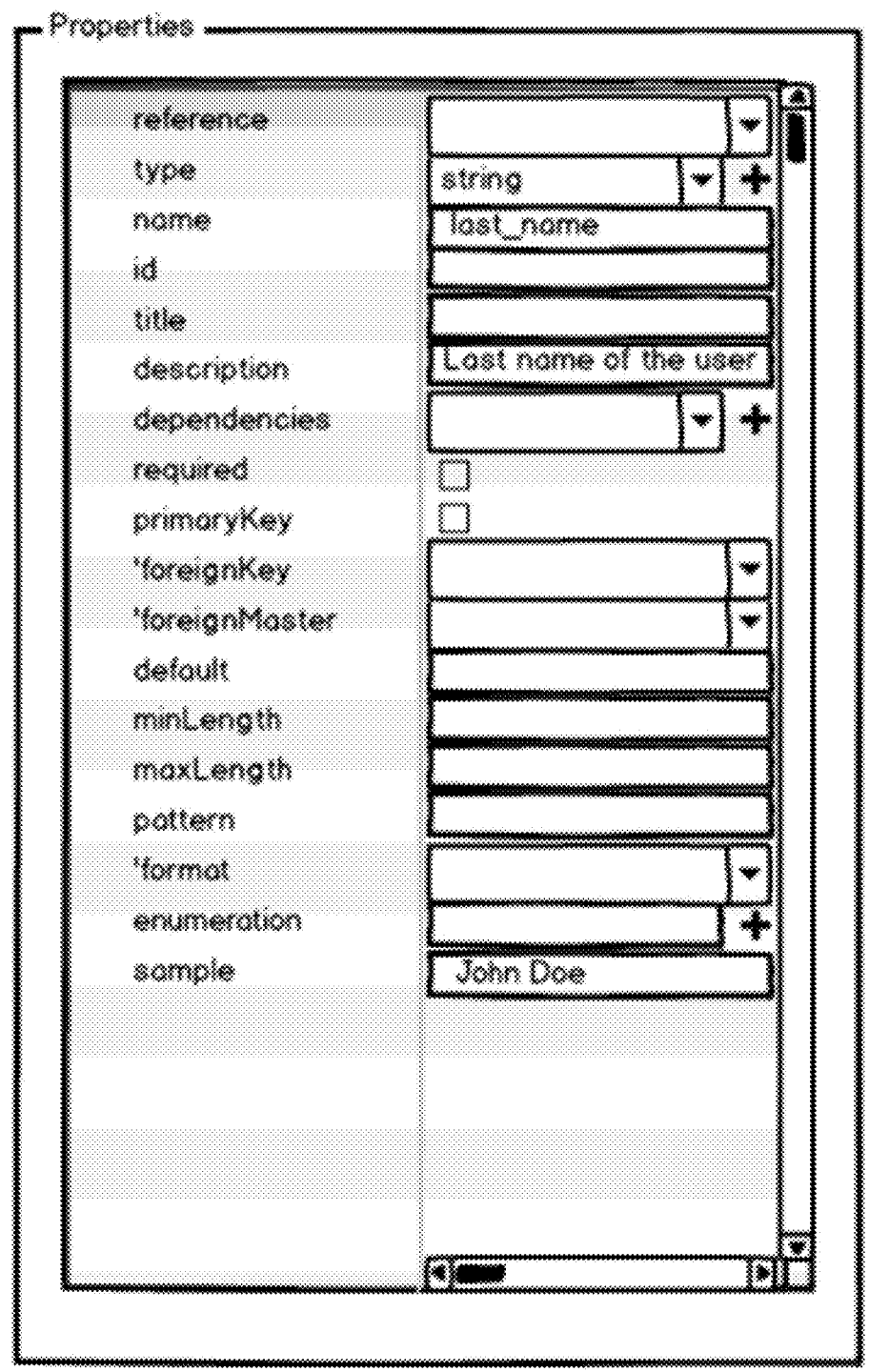
FIG. 26 shows a first view of the properties at field level.
Figure 27:
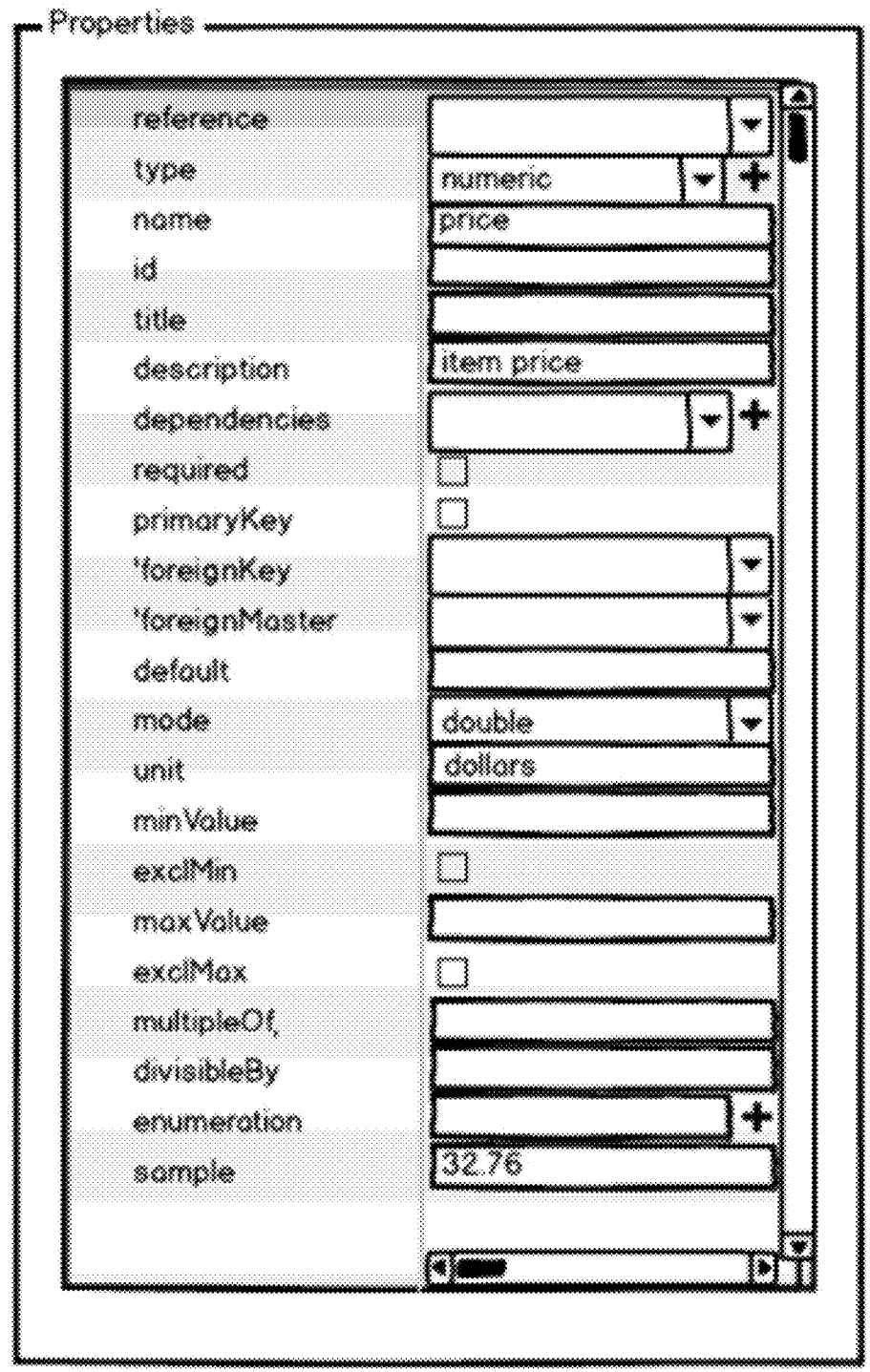
FIG. 27 shows a second view of the properties at field level.
Figure 28:
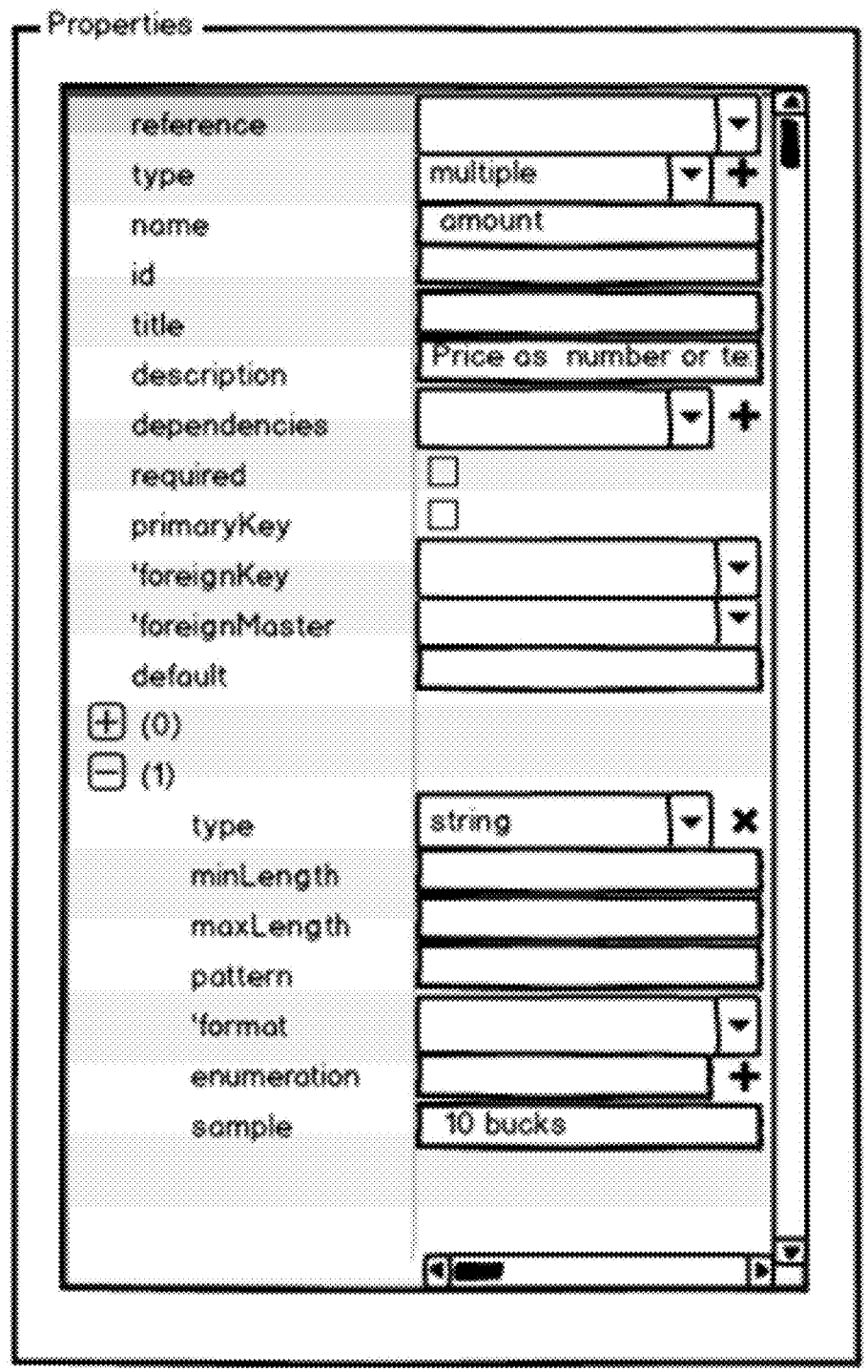
FIG. 28 shows a third view of the properties at field level.

Properties at field level, cfr FIG. 26 through 28

Properties are controlled by a JSON schema to allow easy changes in relevant properties without programming impact, and property entries are stored in each Collection's definition in a JSON document.

Fields are editable directly (no edit/cancel/save buttons).

If the data does not fit in the pane, vertical and horizontal scroll bars appear.

2.2.2 Core Functions 2.2.2.1 Creation of a Model

A model is made of diagram and relationships representing a database of collections made of fields.

Figure 29:
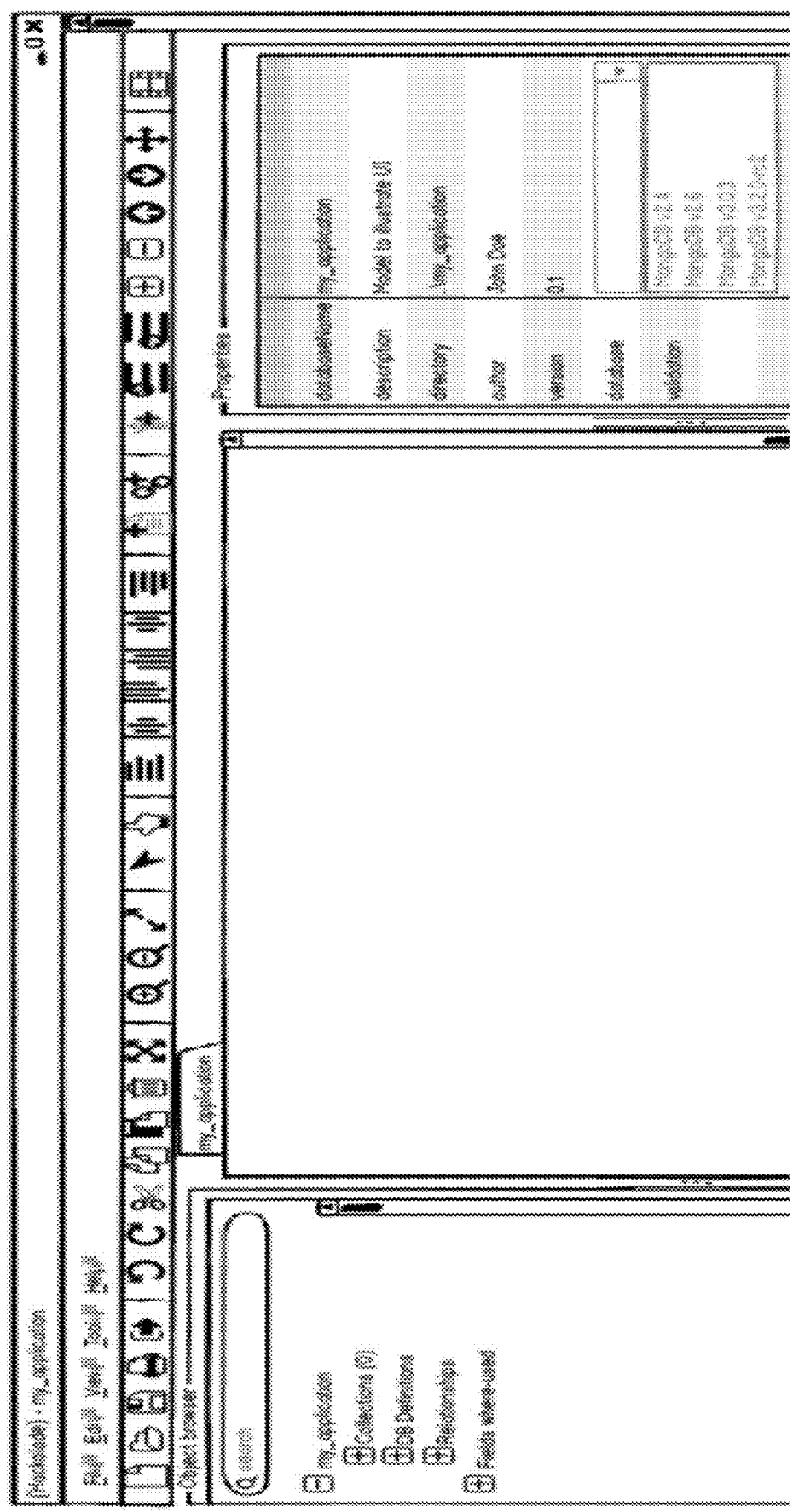
FIG. 29 illustrates a first step in the creation of a model.

When a new model is created from scratch, typically for a database underlying an application or API, the user gets an empty screen, cfr FIG. 29.

The unnamed top tab of the Central pane is active, as well as the bottom Diagram tab.

Figure 30:
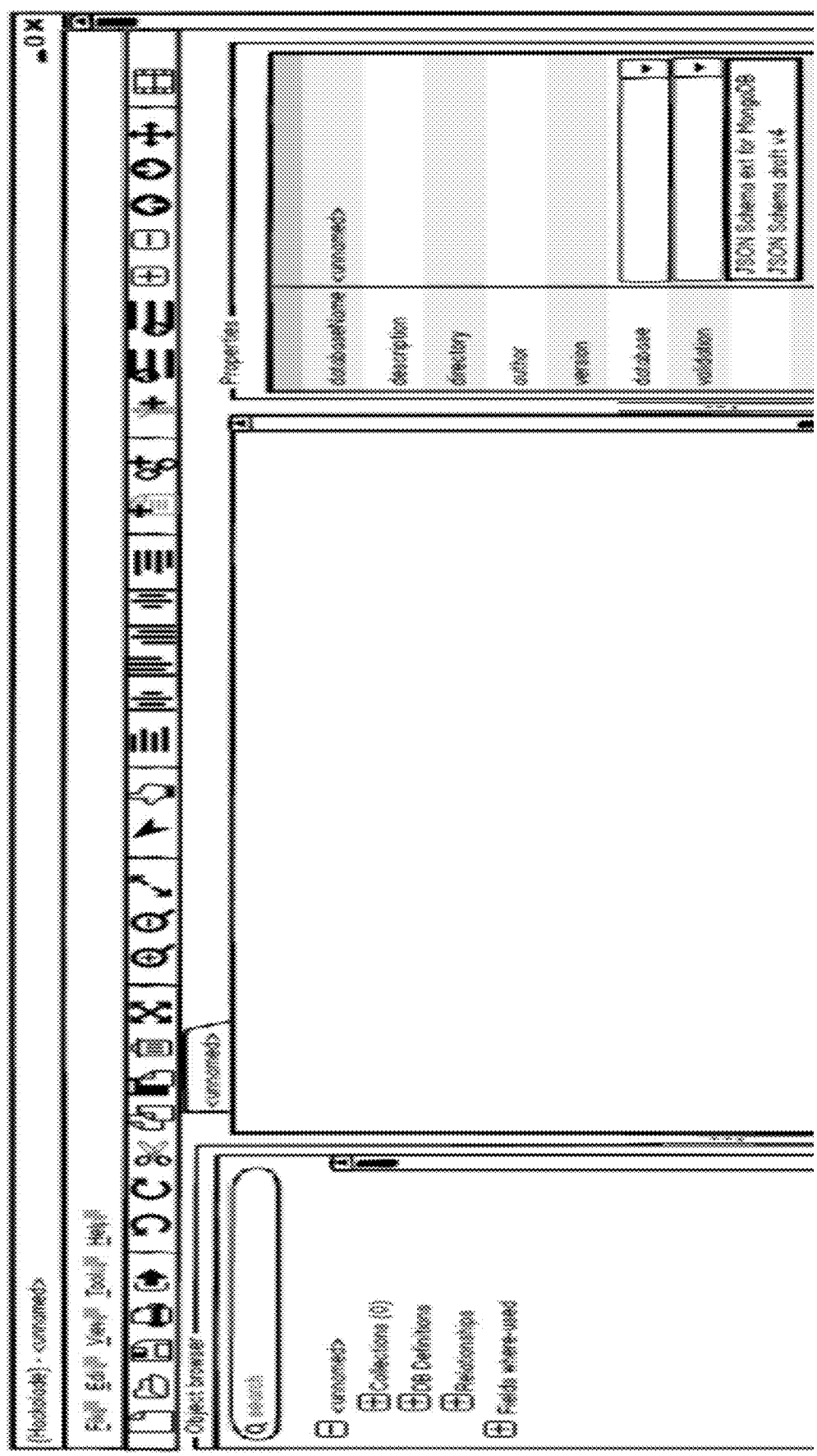
FIG. 30 illustrates a second step in the creation of a model.
Figure 30:
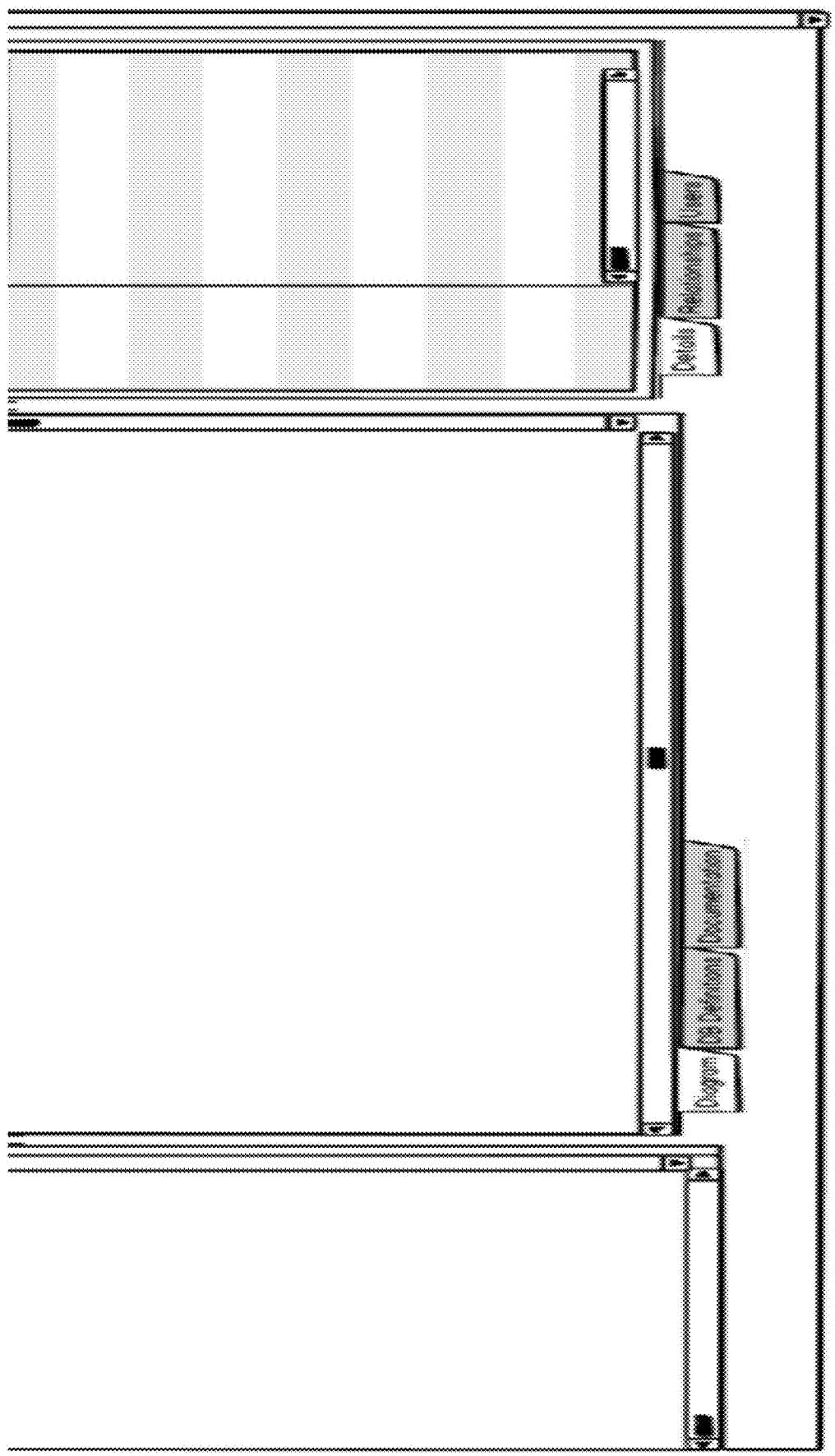

At this point, the user starts by filling-in the properties for the database, cfr FIG. 30. Creating the name in the Properties pane dynamically updates the name in the fixed tab of the Central pane, in the Object Browser, and in the application Title bar (all the way at the top left).

2.2.2.2 Properties of a Database 2.2.2.2.1 Details

Figure 31:
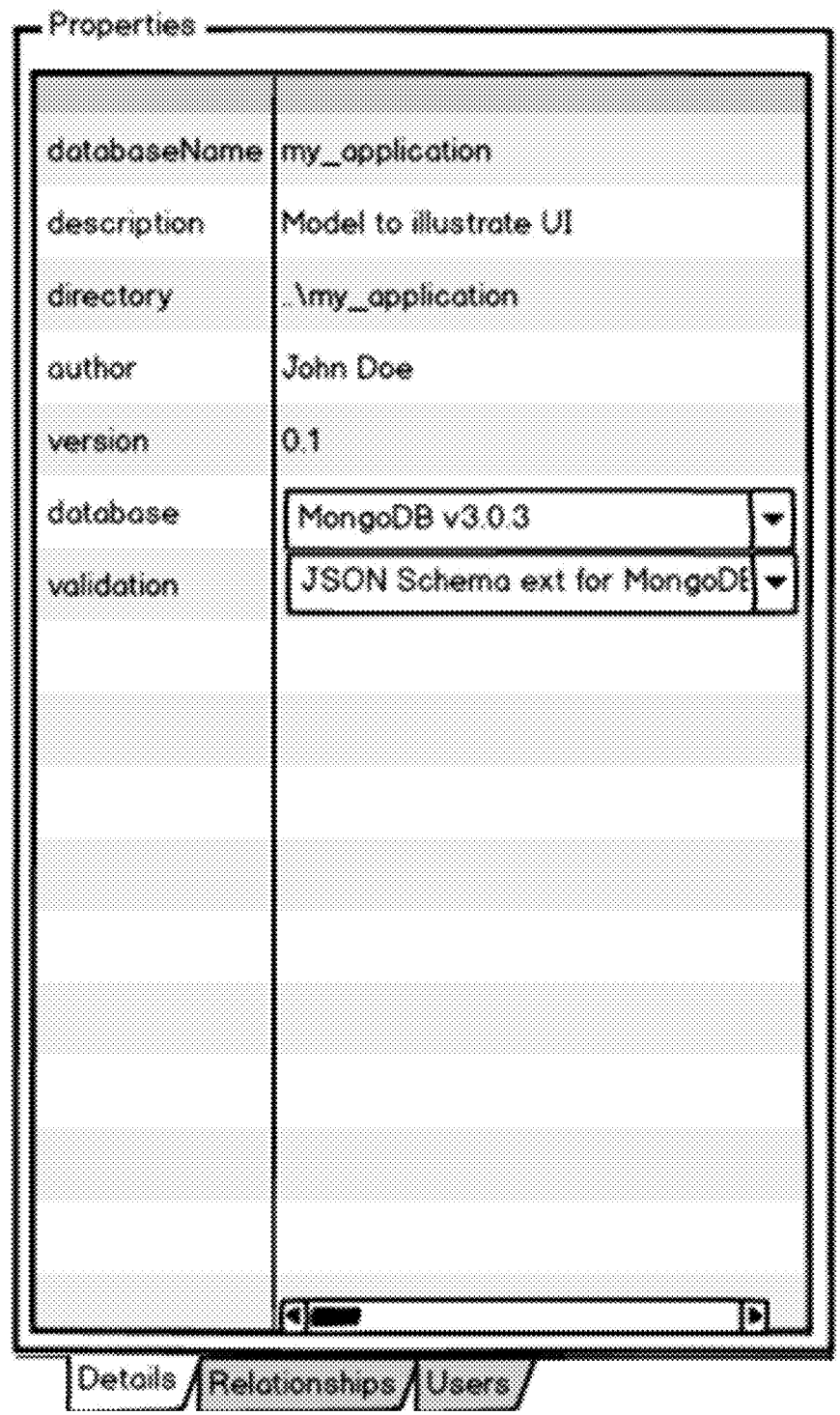
FIG. 31 shows the 'Details' tab of the properties of a database.

Most of the information maintained here is just for documentation purposes, or metadata for internal use by the application, cfr FIG. 31. Some may be used in script creation.

2.2.2.2.2 Relationships

Figure 32:
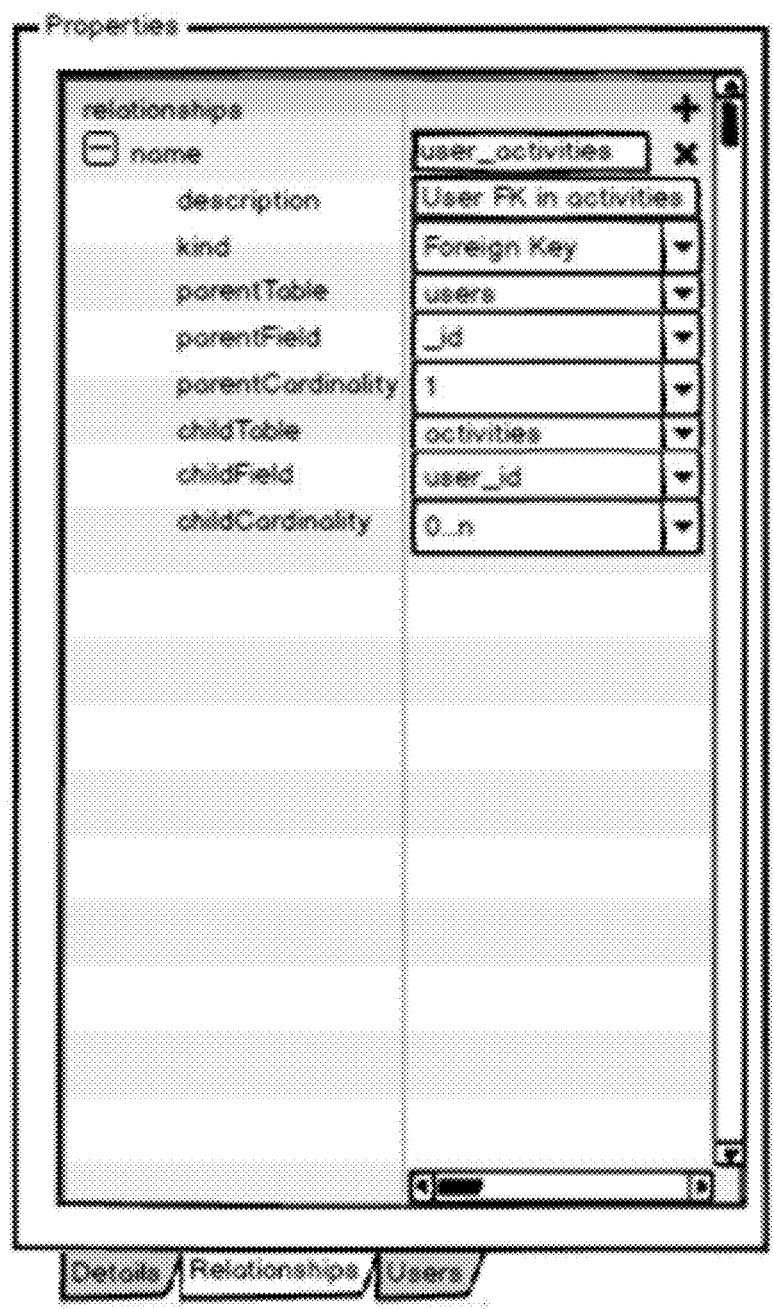
FIG. 32 shows the 'Relationships' tab of the properties of a database.

Relationships are links between different Collections of a Database. As a reminder, contrary to an RDBMS, relationships are not explicit in a schema-less NoSQL database, but well in the application code. They can however (and should) be documented here, and serve as a basis for design and troubleshooting discussions, cfr FIG. 32.

Until 2 or more Collections are created documented in the database, this tab is not enabled. There are 2 kinds of relationships: foreign key, and foreign master.

Just as in an RDBMS, a foreign key relationship makes reference to the unique identifier of a document in another Collection in the database. Particularly with the release of MongoDB v3.2 and the introduction of the $lookup functionality and the BI Connector, the documentation of foreign keys becomes a lot more relevant.

A foreign master relationship documents a denormalization, or the repetition of the content of a field in another collection. The source is considered the master (or parent) and the child is where the data is duplicated. Particular care should be given to making sure that children are updated when data in the master changes.

Important note: there can be more than one relationship between 2 tables. There can even be several relationships pointing to one field in a parent table, coming from different fields in a child table.

2.2.2.2.3 Users

The only information useful to a database (besides the name in the details section) is user credentials.

Figure 33:
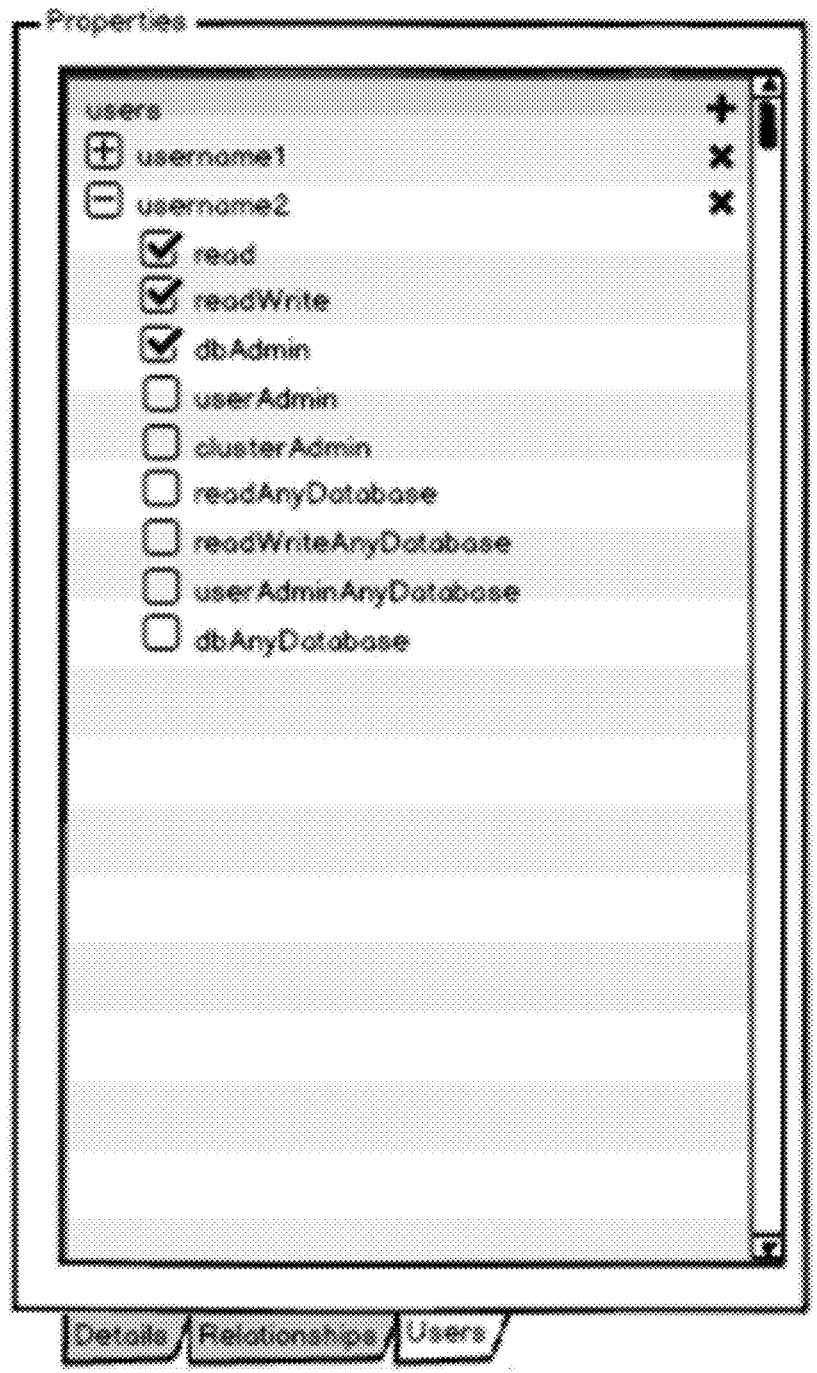
FIG. 33 shows the 'Users' tab of the properties of a database.

Additional credentials can be maintained at Collection level, cfr FIG. 33.

Note that security rights tend to change from version to version, and should therefore be tied to a version number.

2.2.2.3 Creation of a Collection

Figure 34:
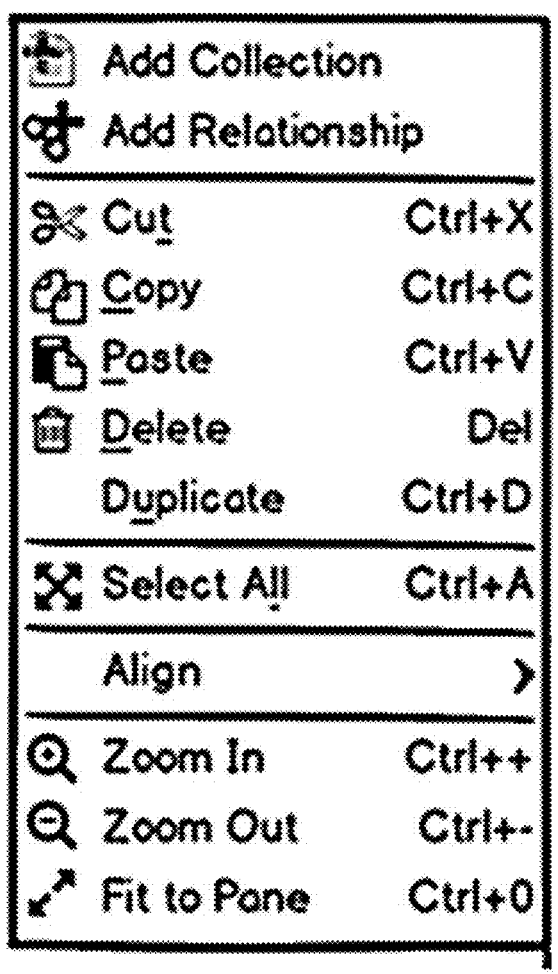
FIG. 34 shows a first step in the creation and editing of a collection.

The next step is to create a Collection. This can be done in 2 ways:
  By clicking on the Add Collection button in the toolbar,
  By doing a right-click of the mouse anywhere in the Central pane to get a contextual menu, and choosing the option "Add Collection", cfr FIG. 34.

Figure 35:
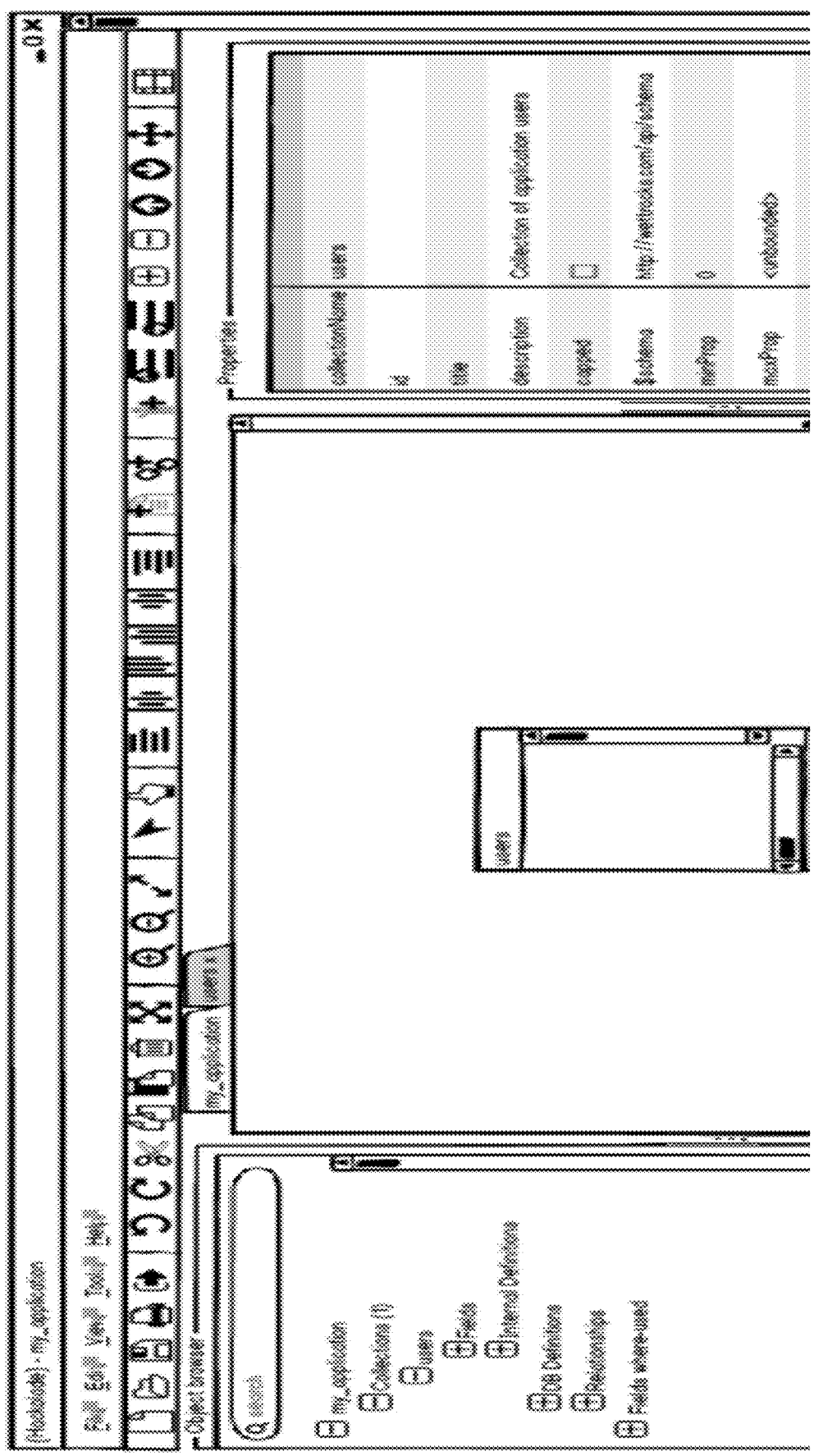
FIG. 35 shows a second step in the creation and editing of a collection.
Figure 35:
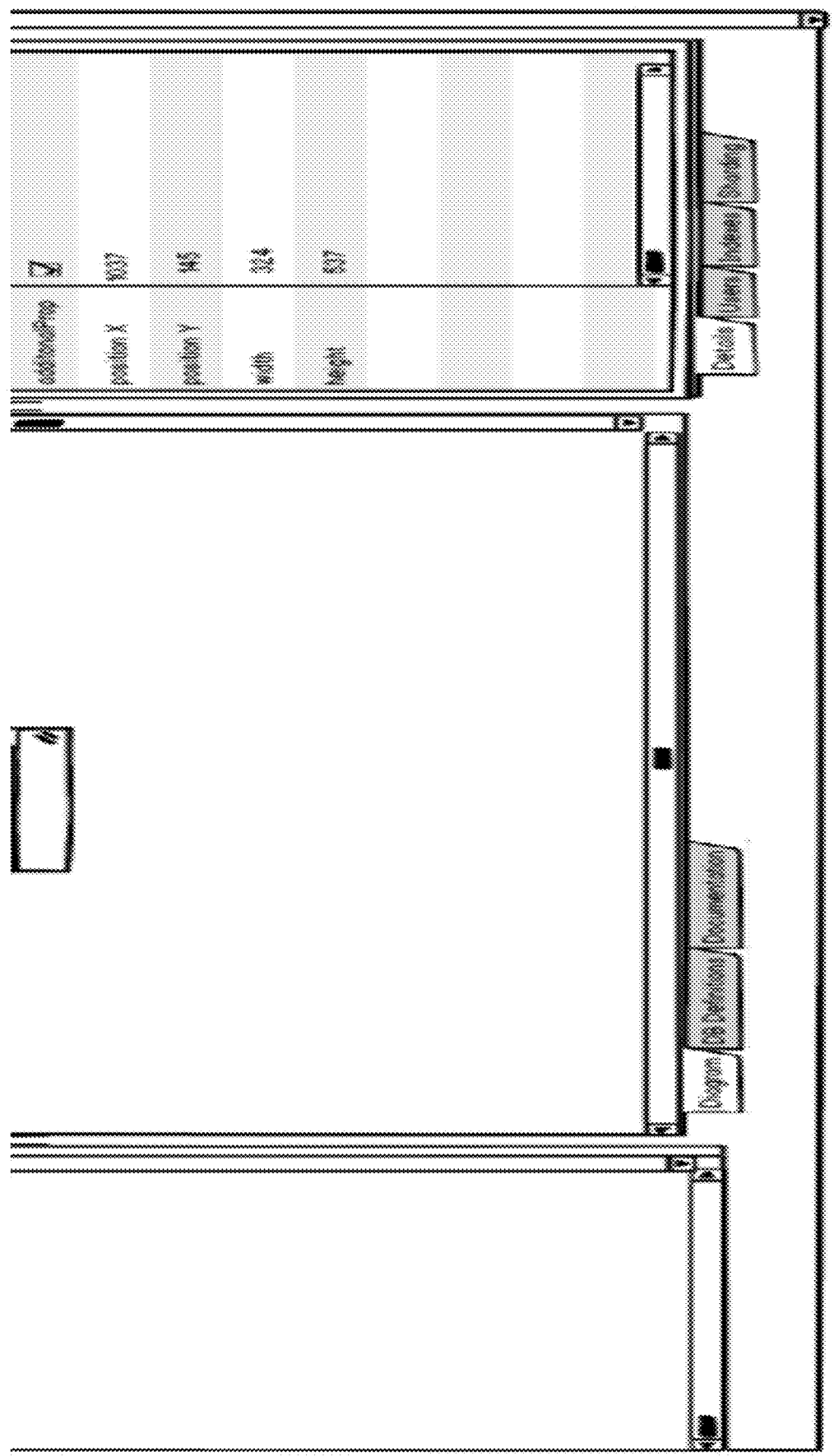

A new empty collection now appears in the Central pane, cfr FIG. 35 A tab appears at the top of the Central pane, but is not activated. An entry is created in the Object Browser hierarchy.

Now, in order for the user to start editing the new collection, 3 possibilities are offered:
  Double-click on the Collection box in the Central pane diagram,
  Single-click on the Collection line in the Object browser,
  or single-click on the Collection tab at top of the Central pane.

Figure 36:
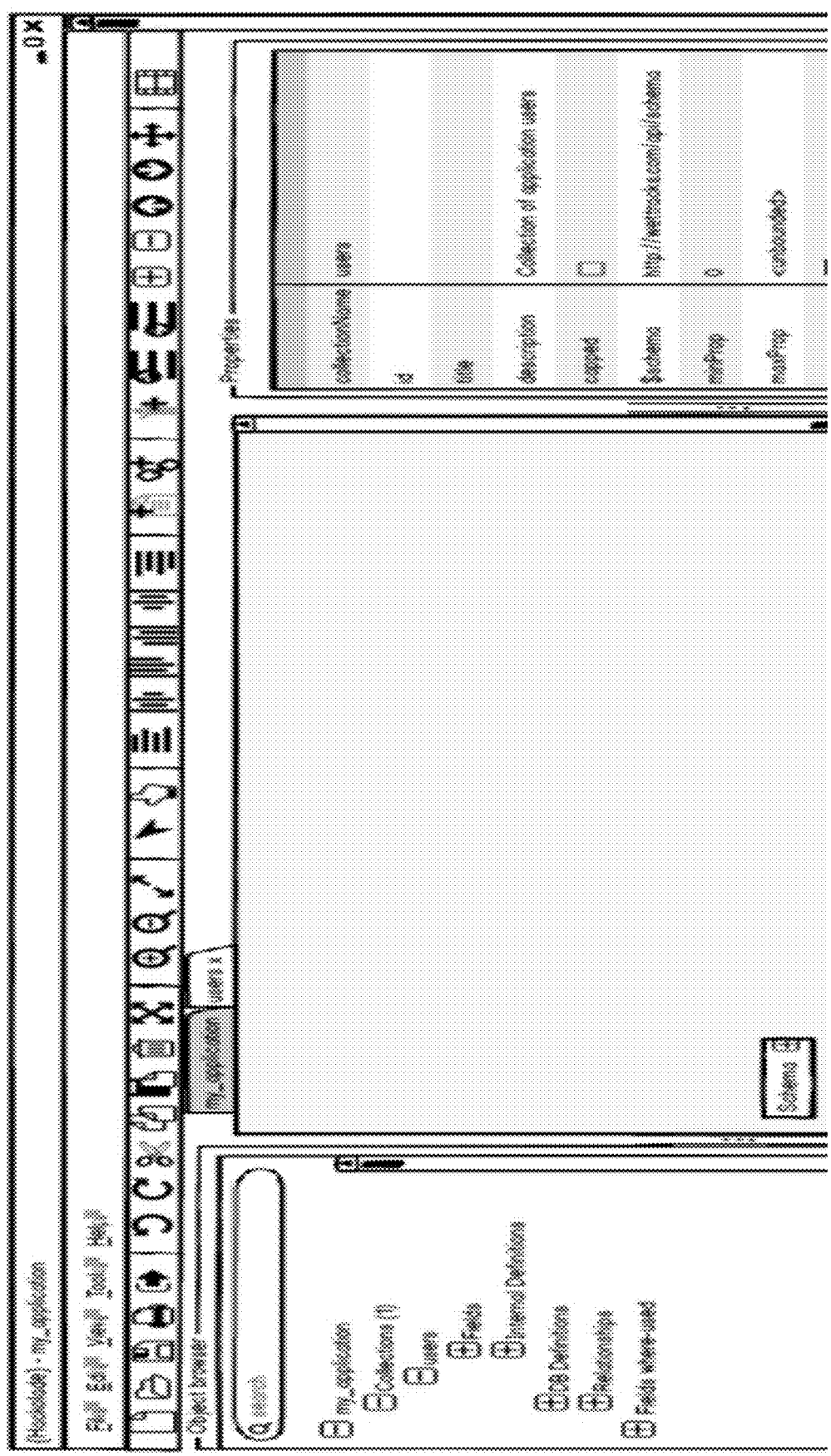
FIG. 36 shows a third step in the creation and editing of a collection.
Figure 36:
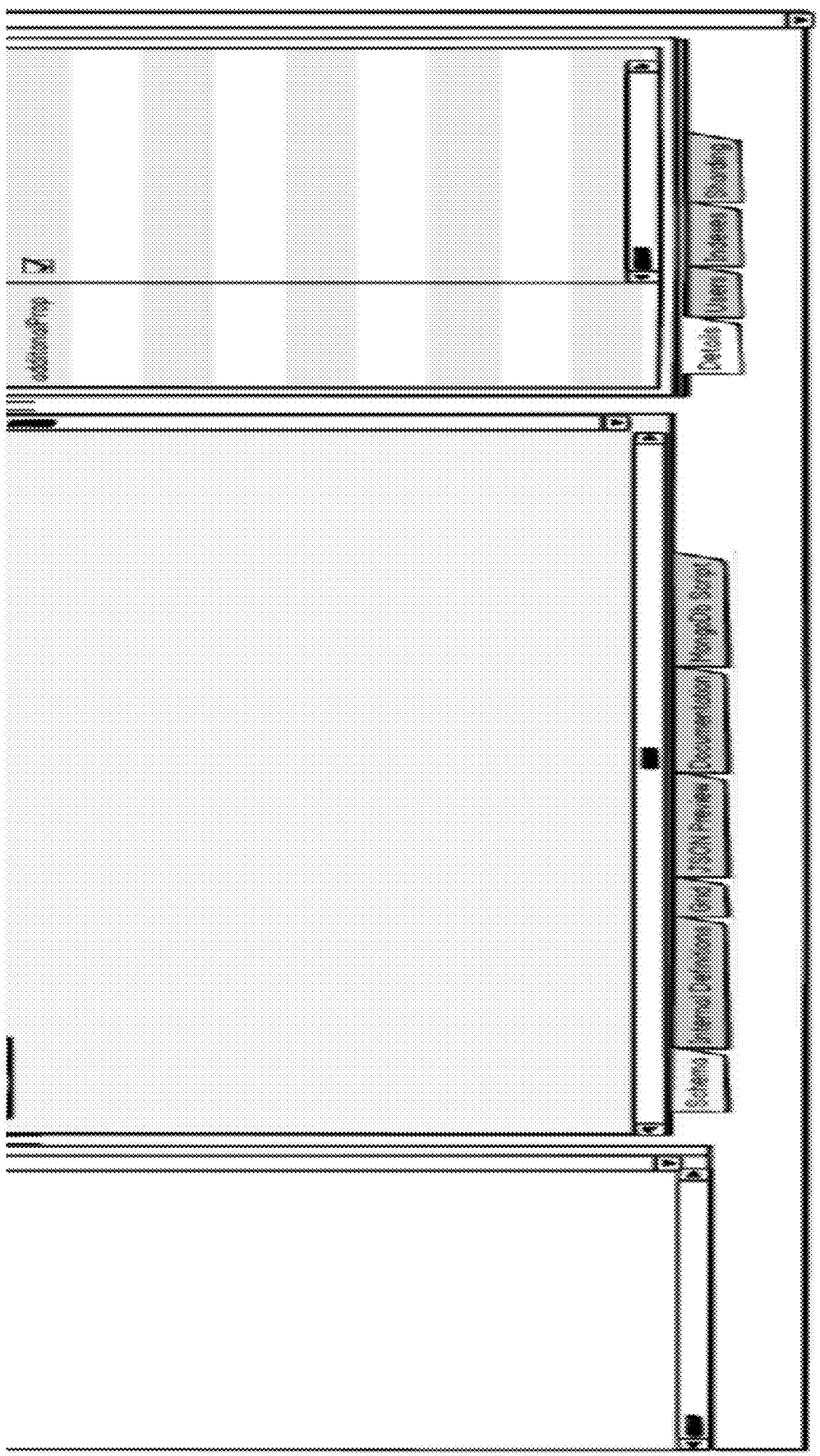

The Collection top tab is active, with the bottom Schema tab active, and the Central Pane displays a single fixed element: the root of the Collection schema, cfr FIG. 36.

As the user enters the Collection name in the properties, the name gets updated in the Central pane tab, and in the Object Browser. The user fills in additional properties.

2.2.2.4 Properties of a Collection 2.2.2.4.1 Details

Figure 37:
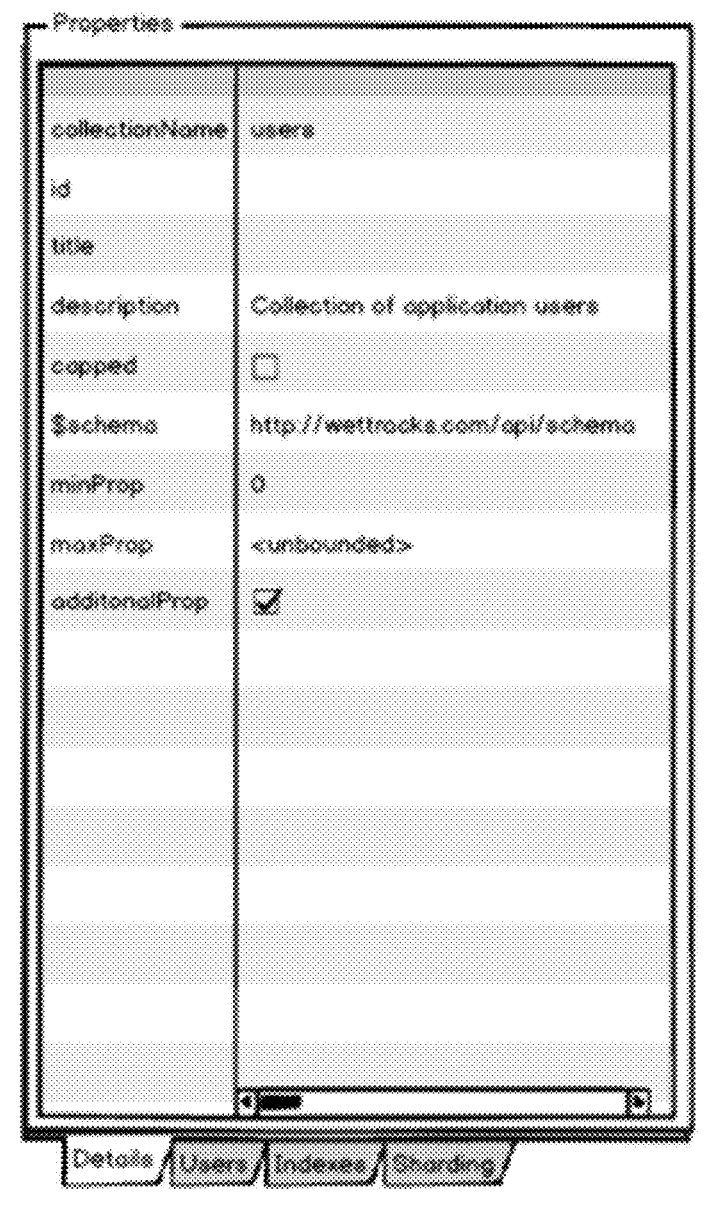

The user can record here some data useful for the database creation script, as well as some info useful for the application, cfr FIG. 37.

2.2.2.4.2 Users

Figure 38:
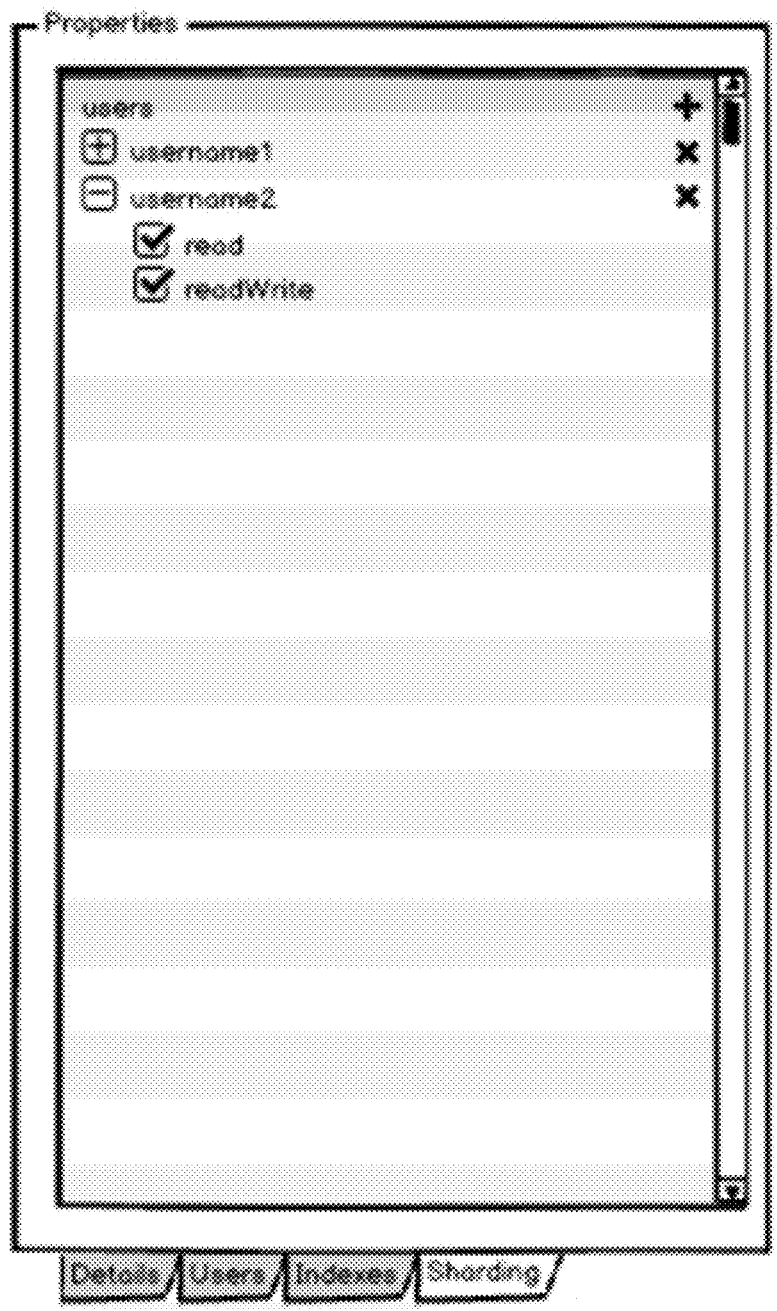
FIG. 38 shows the 'Users' tab of the properties of a collection.

Collection-level security credentials, cfr FIG. 38. Note that security rights tend to change from version to version, and should therefore be tied to a version number.

2.2.2.4.3 Indexes

Figure 39:
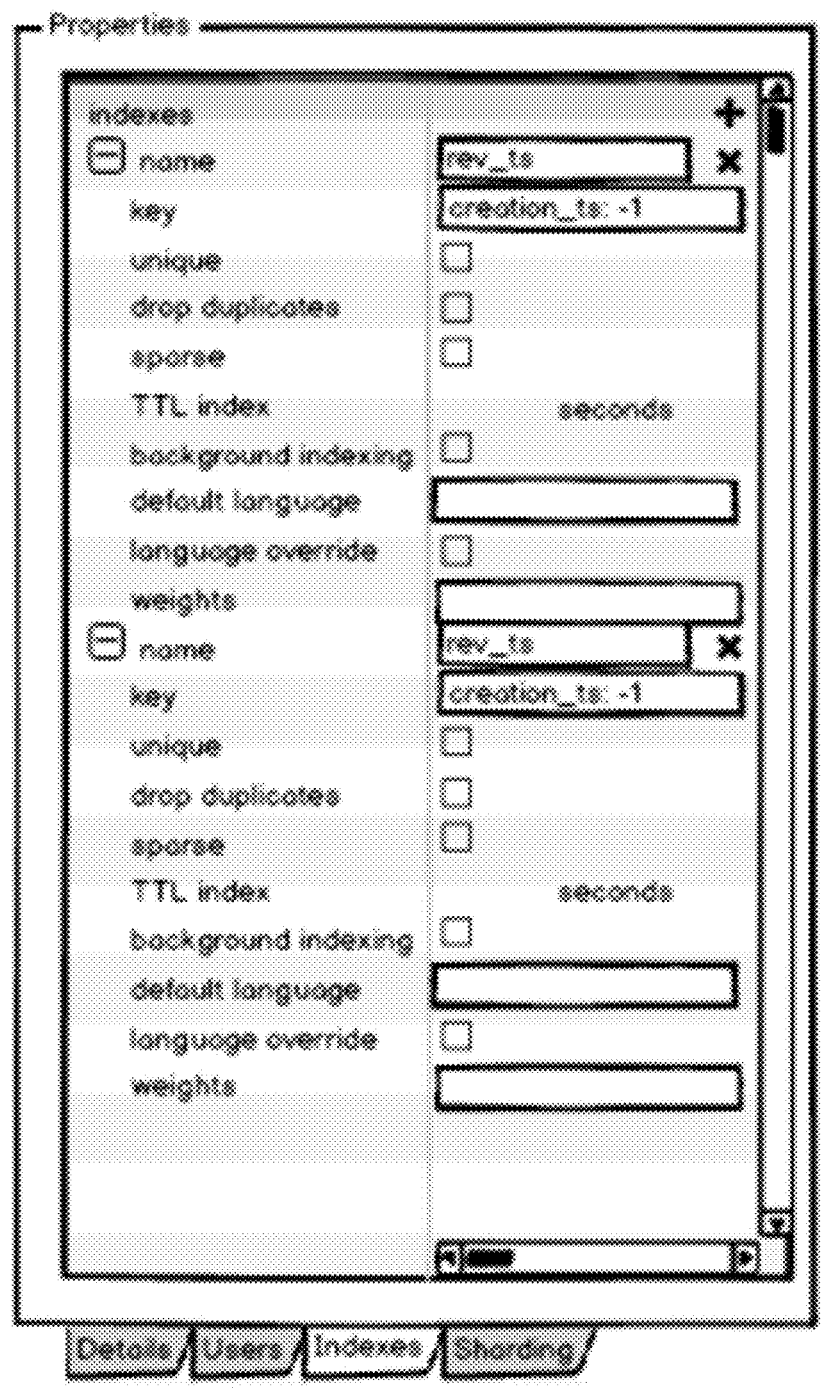
FIG. 39 shows the 'Indexes' tab of the properties of a collection.

The information is useful for documentation purposes as well as for the database creation script, cfr FIG. 39.

2.2.2.4.4 Sharding (To be Determined)

2.2.2.5 Creation of Fields in Graphical View

Next, the user is ready to create fields for the Collection, in a variety of ways:

Click on the Add Child button in the toolbar, which pops up the contextual menu,
Or right-click on the Schema root to display a contextual menu, then click on Add Child, then Field, then the appropriate Field type
By clicking on the 'plus sign' of the schema box (also for complex objects such as documents and arrays.)

Figure 40:
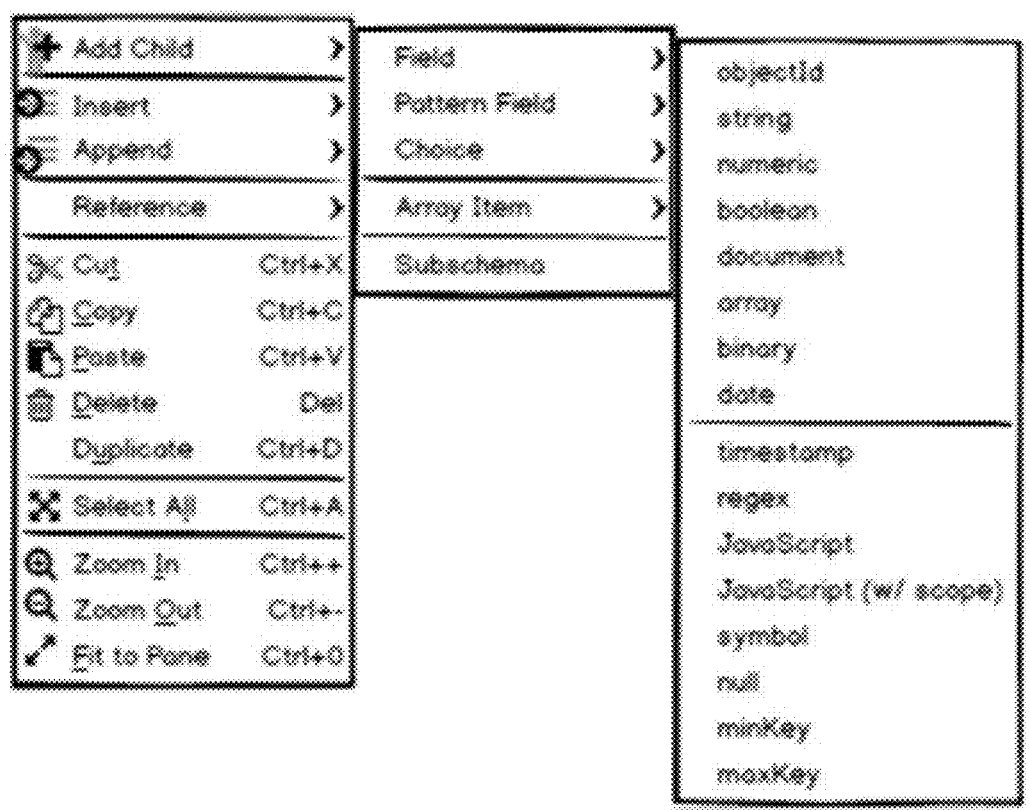
FIG. 40 illustrates the creation of fields for a collection.

The options accessible in the contextual menu, cfr FIG. 40 depend on the type of element selected prior to invoking the contextual menu.

2.2.2.5.1 Root Element

There is only one root possible per document. For the purpose of a NoSQL database schema, the root element can only be of type: document. Properties can be filled for the root element. One or more children can be created. The Insert, Append and Reference options are greyed-out since the functions are not possible for a root element.

2.2.2.5.2 Non-Root Elements

Figure 41:
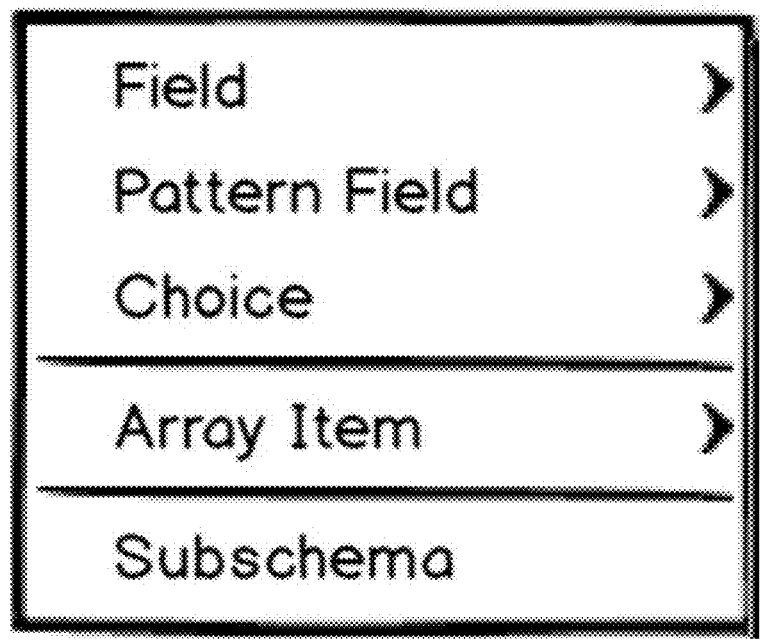
FIG. 41 illustrates the non-root elements that can be created.
Figure 42:
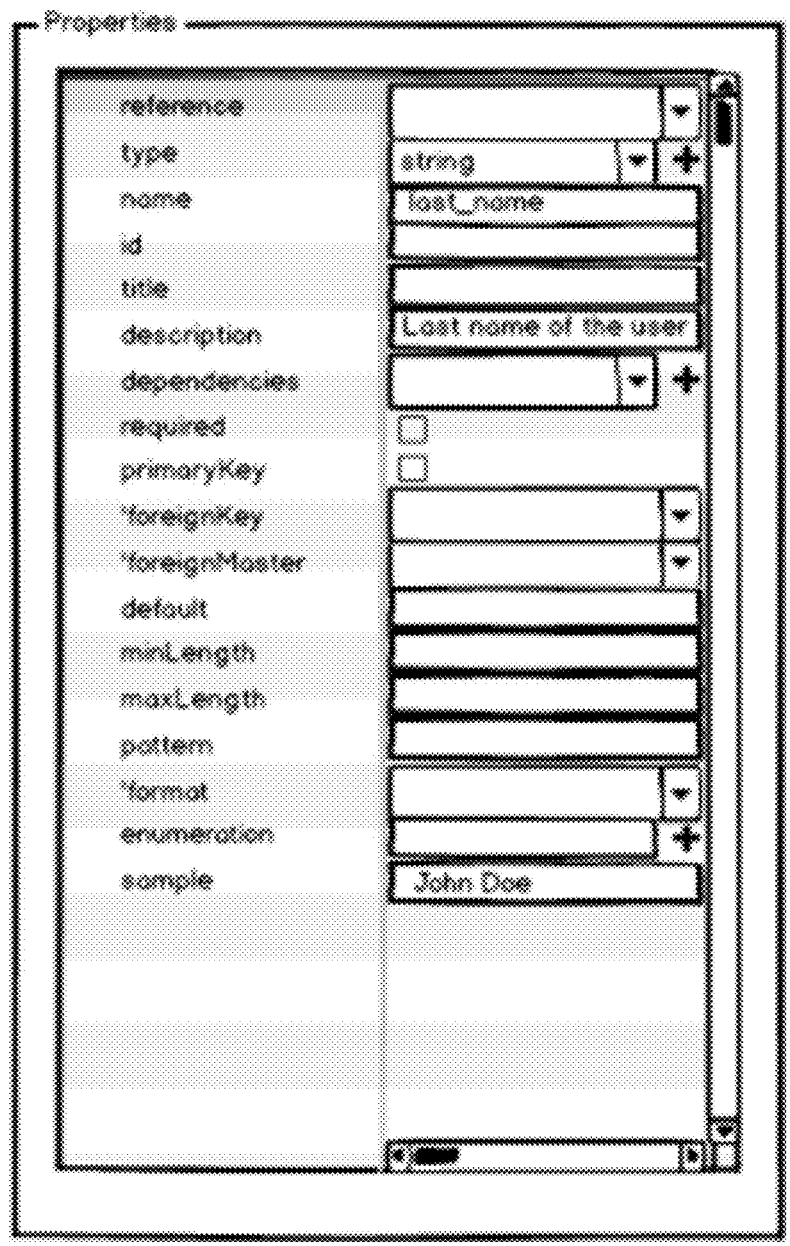
FIG. 42 shows the properties of a field.
Figure 43:
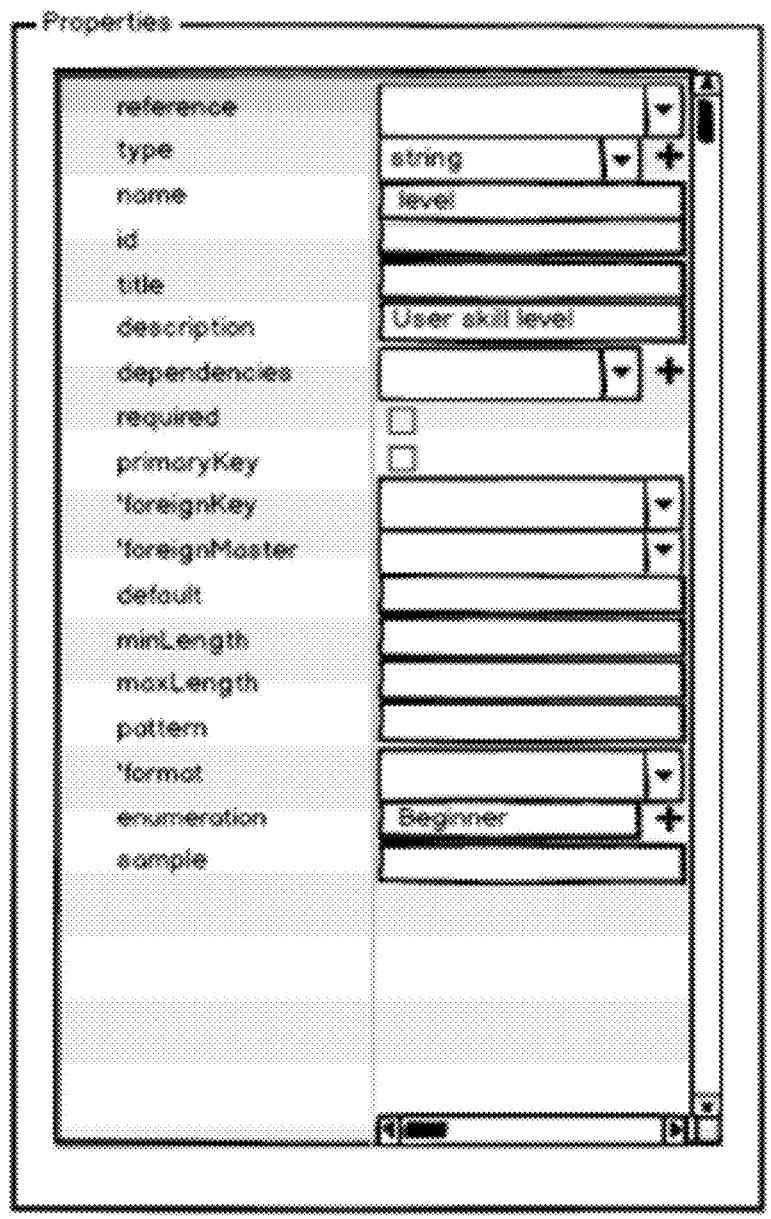
FIG. 43 shows a first step in the addition of entries with a 'plus' icon in the field properties.
Figure 44:
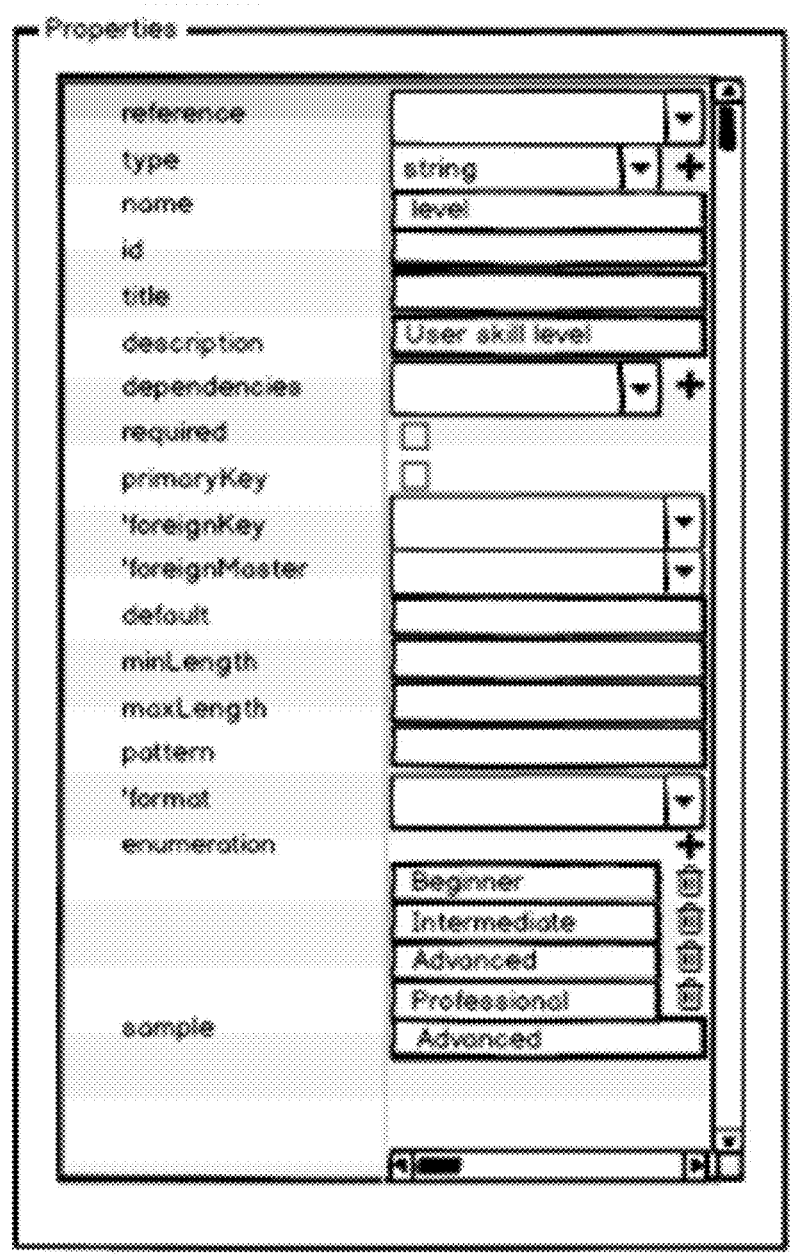
FIG. 44 shows a second step in the addition of entries with a 'plus' icon in the field properties.
Figure 45:
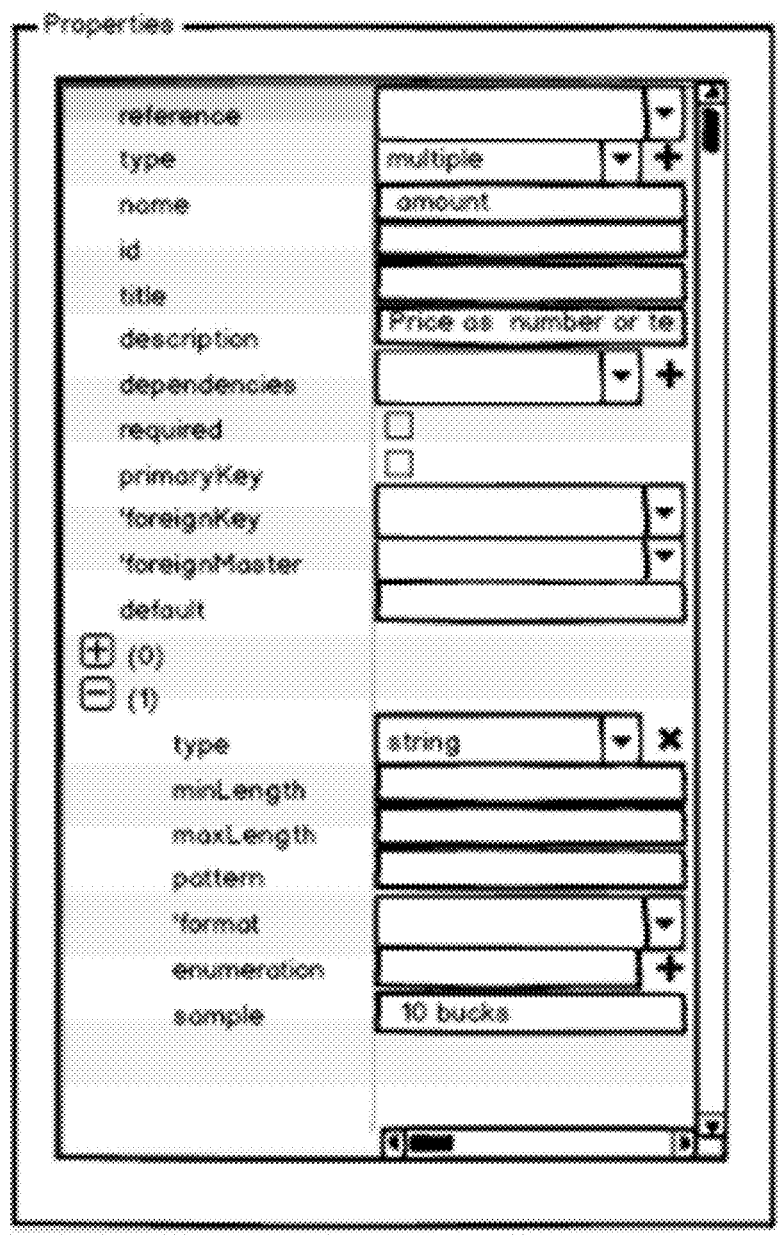
FIG. 45 shows the case of multiple types in the field properties.

For any other element than the root element, the 4 options (Add Child, Insert, Append, and Reference) are possible, cfr FIG. 41. The options of the sub-menu depend on the nature of the element selected. Let's first define the different elements that can be created.

2.2.2.5.2.1 Field

This is the most common element in a schema. It defines the name-value pair that will be found in the JSON data. The properties define the details and constraints of both the name and the value in the pair. As defined by the JSON Schema specification, the available types for a field value are: string, numeric, boolean, object (document), array, and null. For the purpose of MongoDB, additional BSON types are available: objectID, binary, date, timestamp, regex, JavaScript, JavaScript with scope, symbol, minKey, and maxKey.

The nominal case is for an element to have only one type. The JSON specification however allows a field to be of multiple types. The application UI is able to define and maintain multiple types for a field, cfr FIG. 42 through 45.

The name of a standard field is a fixed string.

The nature of children is different for document, array, or other elements. Documents are allowed to have one or more Fields, Pattern Fields, and/or Choices as children. Arrays are allowed to have one or more Array Items and/or Choices as children. As for all other types of fields, the only possible child is 'Choice'.

As a result, for all elements, a 'plus sign' ('+') appears at the right edge of the element box with label 'Schema' and the 'Add Child' option in the contextual menu is enabled. However, if the 'plus sign' is clicked and:
  The element is a document, array, or Choice, then the contextual sub-menu is opened below Add Child level;
  The element is of any other type, then a Choice element is created.
  For all elements, the options in the sub-menu of 'Add Child' appear as follows:
  If the element is a document, then the options Field, Pattern Field, and Choices are enabled;
  If the element is an array, then the options Array Item and Choices are enabled;
  If the element is a Choice, then the options Choices and Subschema are enabled;
  If the element if of any other type, then only the option Choices is enabled.

Since it is possible for an element to have multiple types, the available options are the sum of the options of each type of an element.

The Insert and Append functions in the contextual menu work in a similar way, except that while an element is selected, the Insert and Append behaviors are tied to the type of the parent element.

The properties of each field type are configured in a JSON Schema file.

2.2.2.5.2.2 Pattern Field

Pattern fields function in exactly the same way as standard fields, with only one exception: the name (in the name-value pair) is not a fixed string, but a regex pattern. This is particularly useful in MongoDB in combination with 'dot notation'.

2.2.2.5.2.3 Choice

In JSON Schema, there are 4 possible choices: "allOf", "one of", "anyOf", and "not". Each of these elements contains an array, with each element of the array representing content that will be matched against. The choice of "allOf", "one of", "anyOf", or "not" determines how the validation processor will treat the results of the matches:

allOf requires that all elements in the array are matched successfully.

oneOf requires one, and only one, of the elements in the array to match successfully.

anyOf requires one or more of the elements in the array to be matched successfully.

not requires that no element in the array is matched successfully.

Schema definitions can use "allOf", "oneOf", "anyOf", and "not" individually or in combination, providing significant flexibility for defining elements that have complex definitions or contextual relationships. These choices apply both to fields and to field properties.

In both cases, the only possible child of Choice is a Subschema or another Choice. When clicking on the 'plus sign' of a Choice element, a Subschema element is created. Similarly, in the contextual submenu when a Choice element is selected, only the Subschema and Choices options are enabled. And when the child of Choice is selected, then the Subschema and Choices options are the only enabled options in the submenu of Insert and Append.

2.2.2.5.2.4 Array Item

This is the only possible child type of an Array field. Different types of array items are possible for a same parent element. Each can have from 0 to n occurences, but can be limited by the minItems and maxItems properties of the Array. It has a behavior quite similar to that of a standard field, except that the field properties are limited in comparison. This is controlled in the Field Prop JSON Schema in Appendix.

2.2.2.5.2.5 Subschema

If the choice applies to a field, then the subschema is a document with all the schema possibilities of a JSON object.

The choice may also apply to an individual field property, in which case it is a simplified schema with the just the appropriate property of a field type. Example, a string field could have a format of ipv4 or ipv6.

2.2.2.6 Properties of a Field 2.2.2.6.1 Details

The field properties are located on the right-hand side in a dedicated pane. Depending on the field type selected in the previous step, the appropriate properties schema appears in the properties pane. The field properties are controlled by a Field Properties JSON Schema file found in appendix.

Vertical and horizontal scroll bars appear when content spills over the displayed pane size (variable according the responsiveness nature of the application.) Different types of input are possible in the properties pane:

Text field

Checkbox

Drop-down box: a list of values controlled either by the Field Properties JSON Schema (e.g.; possible string formats) or by entries in the DB or Collection (e.g.: foreign keys, references or field dependencies.)

Additionally, the properties pane allows the addition of other entries with a 'plus sign' icon. For example with enumerations, the user may fill one entry, then click the 'plus sign' icon so more entries are allowed underneath.

Multiple entries are also possible with drop-down boxes, such as dependencies.

A bit more complicated is the case of multiple types. In such case, some fields are common, and others are specific.

2.2.2.6.2 References

JSON Schema allows the creation of reusable definitions, so they don't need to be duplicated in multiple places. The definitions can cover a single field or a more complex structure like a document. A definition may exist at 3 levels:

Internal to a Collection (and therefore not available for referencing elsewhere than in its own collection), Database model workspace, in which case it is available to any collection of the database, External, i.e. in a public location on the Internet Definitions are not possible for Choices or Array Items. Only for Fields, Pattern Fields, and Subschemas. Therefore, the Reference option in the contextual menu is only enabled for these last 3 elements.

Figure 46:
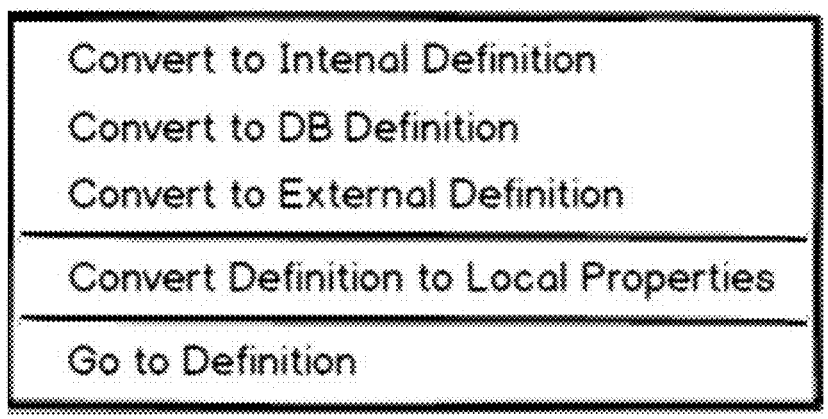
FIG. 46 shows the reference option in the contextual menu.

The Reference option in the contextual menu leads to the following actions, cfr FIG. 46.

2.2.2.6.2.1 Convert to Internal Definition

When this option is selected, the system takes the element properties, copies them to the Definitions section of the same Collection JSON Schema, and replaces the element properties with a Reference to the newly created definition.

2.2.2.6.2.2 Convert to DB Definition

When this option is selected, the system takes the element properties, copies them to the Definitions section of the database model workspace JSON Schema, and replaces the element properties with a Reference to the newly created definition.

2.2.2.6.2.3 Convert to External Definition

The system takes the element properties, copies them to the Definitions section of JSON Schema to be stored in a central repository, and replaces the element properties with a Reference to the newly created definition.

2.2.2.6.2.4 Convert Definition to Local Properties

Once an element references a definition, the user may want to convert the reusable definition into a local instance, typically to diverge from the reusable definition. With this action, the Reference is removed from the element properties, and replaced by a full copy of the Definition previously referenced. The definition remains in place, as it may be used elsewhere in the DB or collection.

2.2.2.6.2.5 Go to Definition

When an element references a Definition, choosing this option will let the user view the properties and details of the Definition.

2.2.2.7 Definitions

External definitions cannot be maintained in the application. Definitions appear in the Object Browser in a separate section.

2.2.2.7.1 at Collection Level

Figure 47:
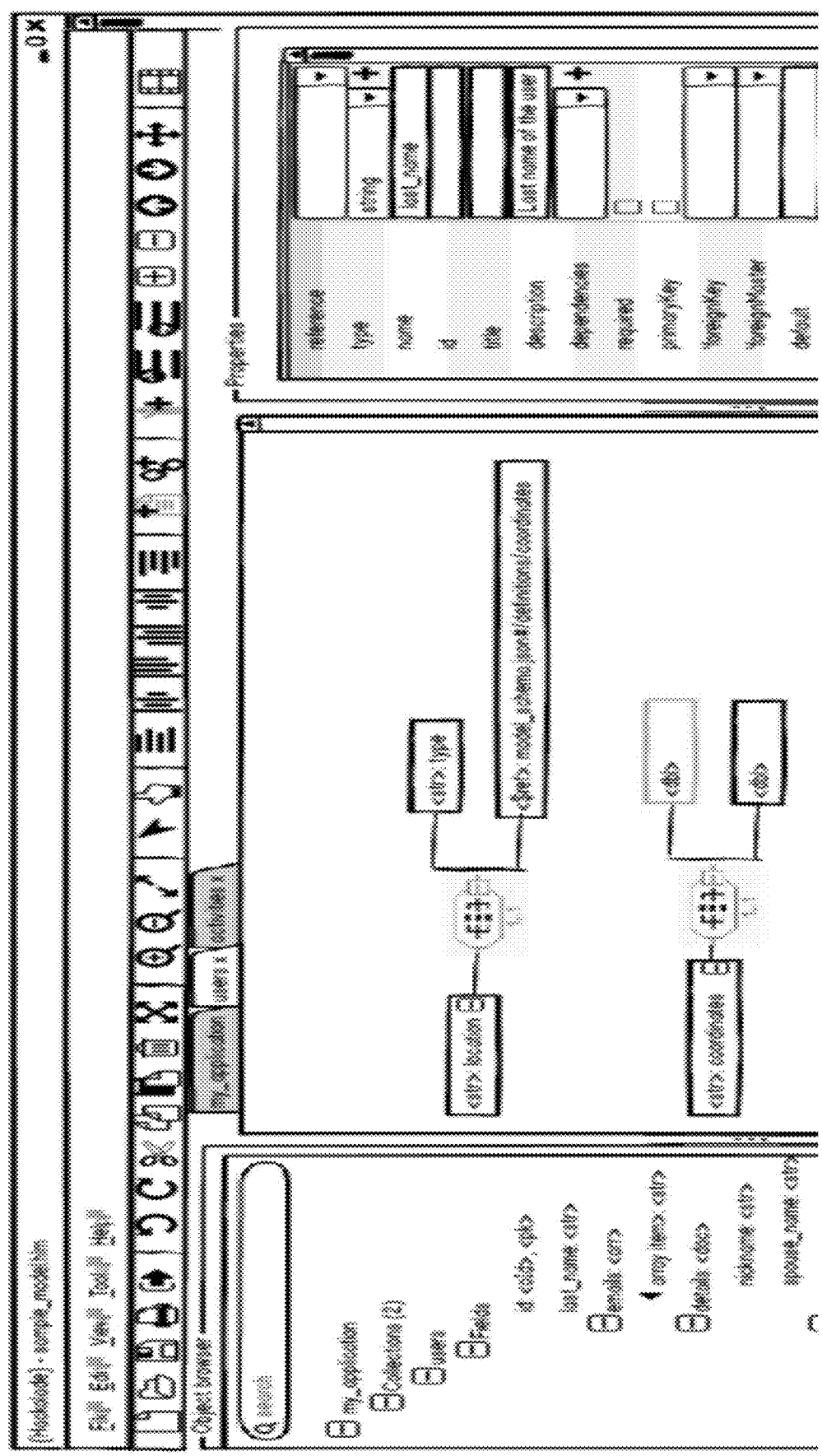
FIG. 47 shows a graphical view of the definitions at collection level.
Figure 47:
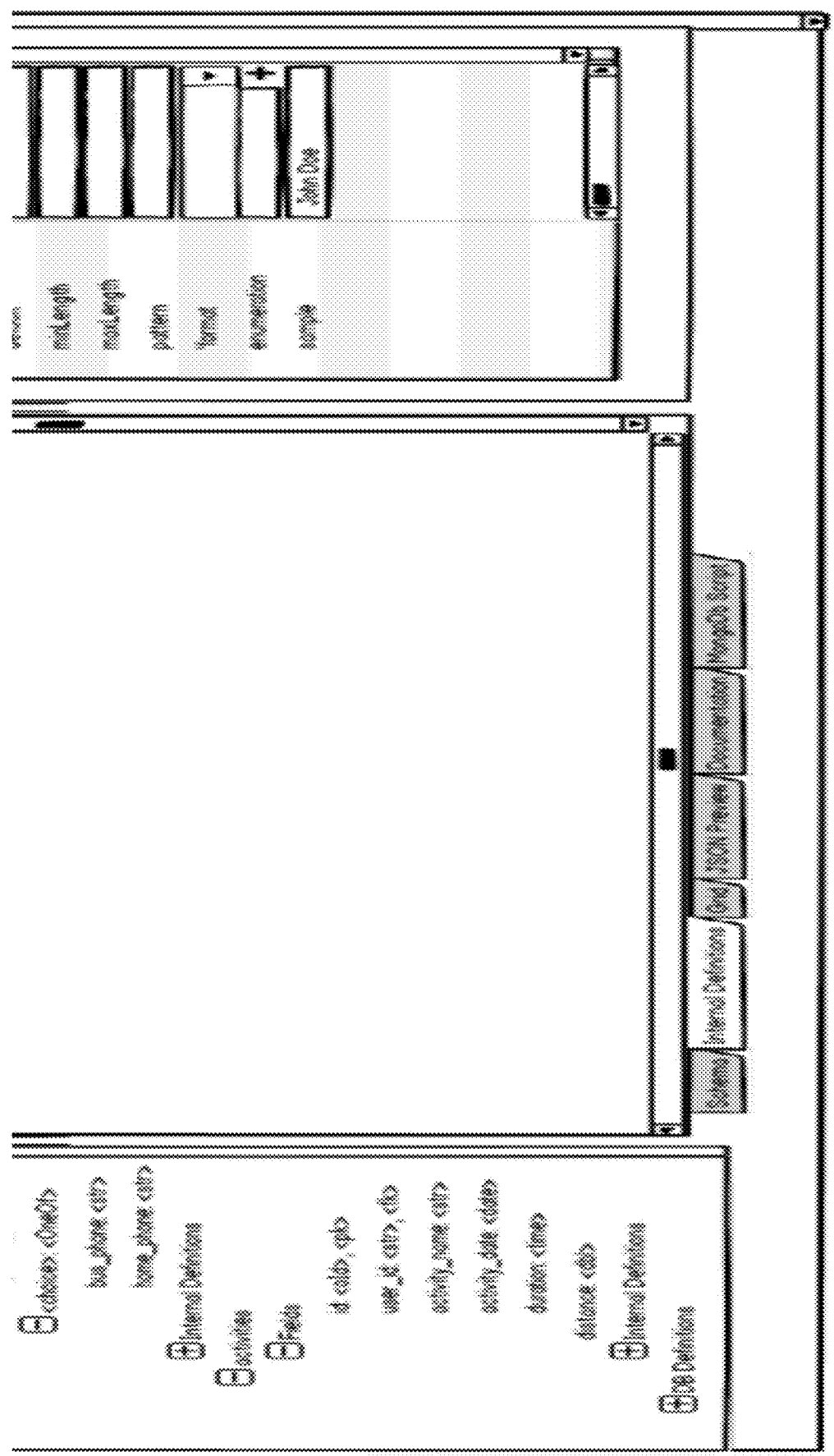

Definitions at collection level are maintained in a graphical view similar to that of a complete collection schema, cfr FIG. 47.

2.2.2.7.2 at Database Level

Figure 48:
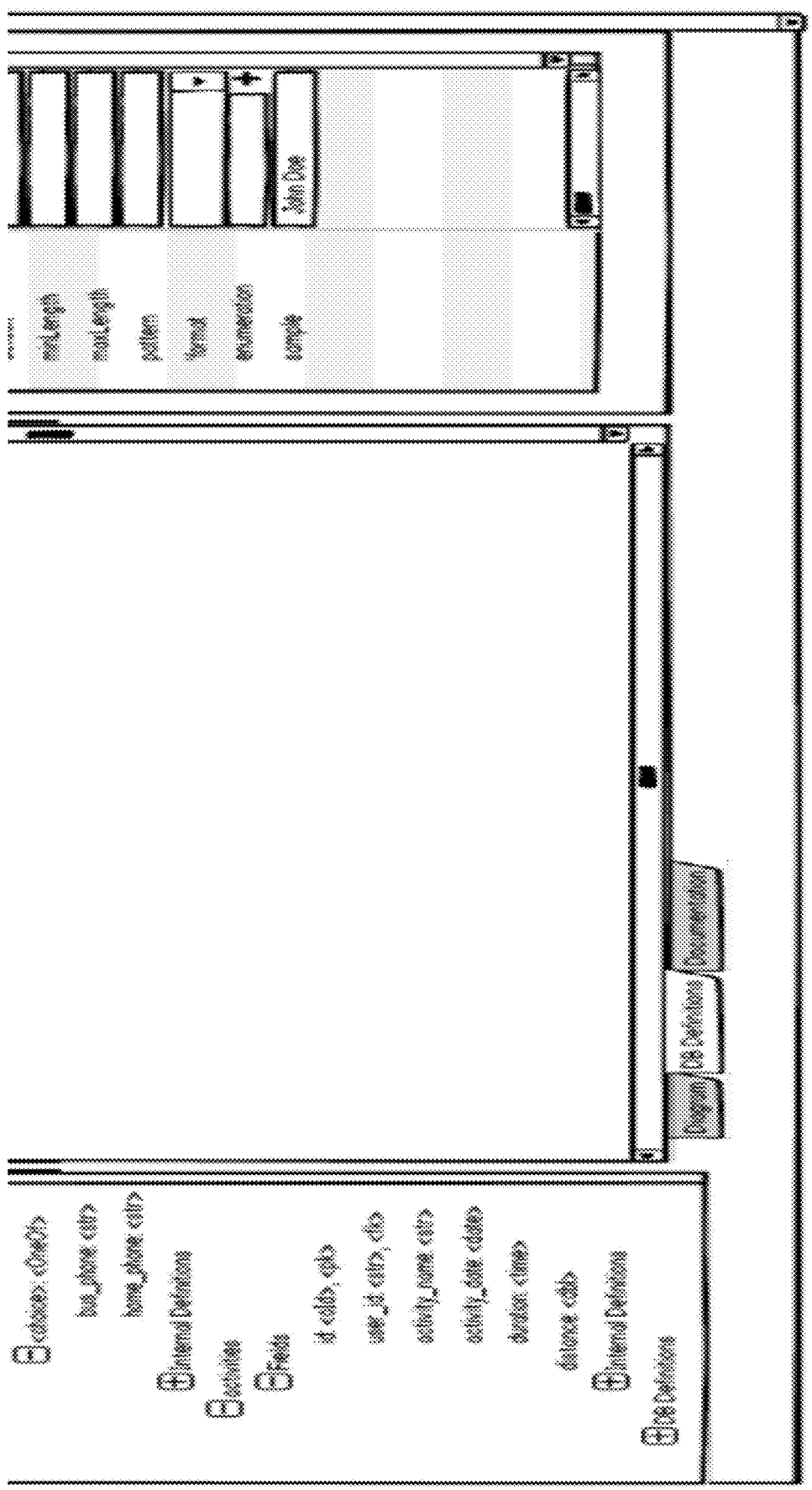
FIG. 48 shows a graphical view of the definitions at database level.

Definitions at database level are maintained in a graphical view similar to that of a complete collection schema, cfr FIG. 48.

2.2.2.8 Field where-Used and Search

In the Object Browser, there will be a dynamic tree view of where a field is referenced: collection and sub-objects, if any), and definitions.

2.2.2.9 Grid View

Figure 49:
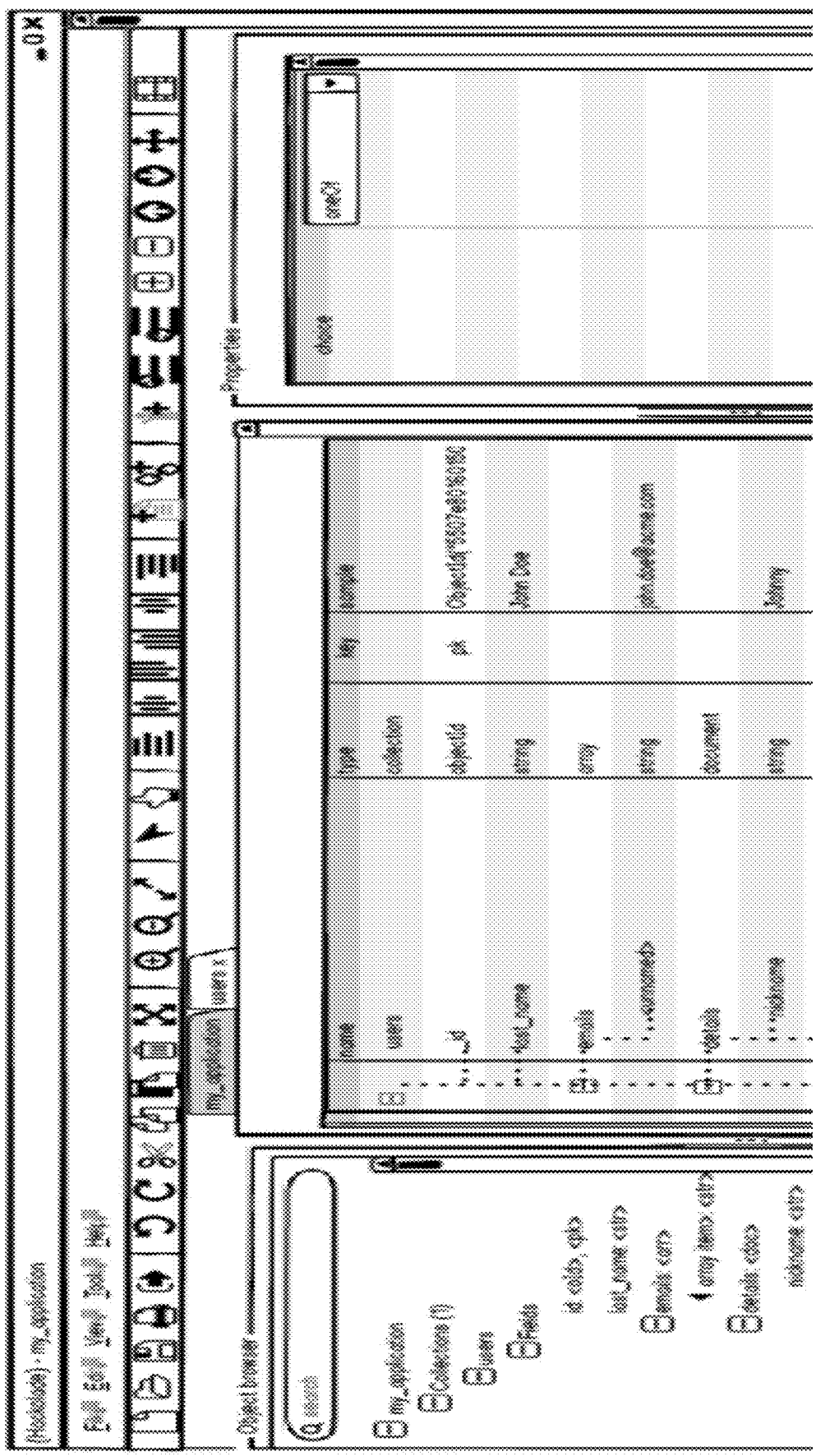
FIG. 49 shows an example grid view.
Figure 49:
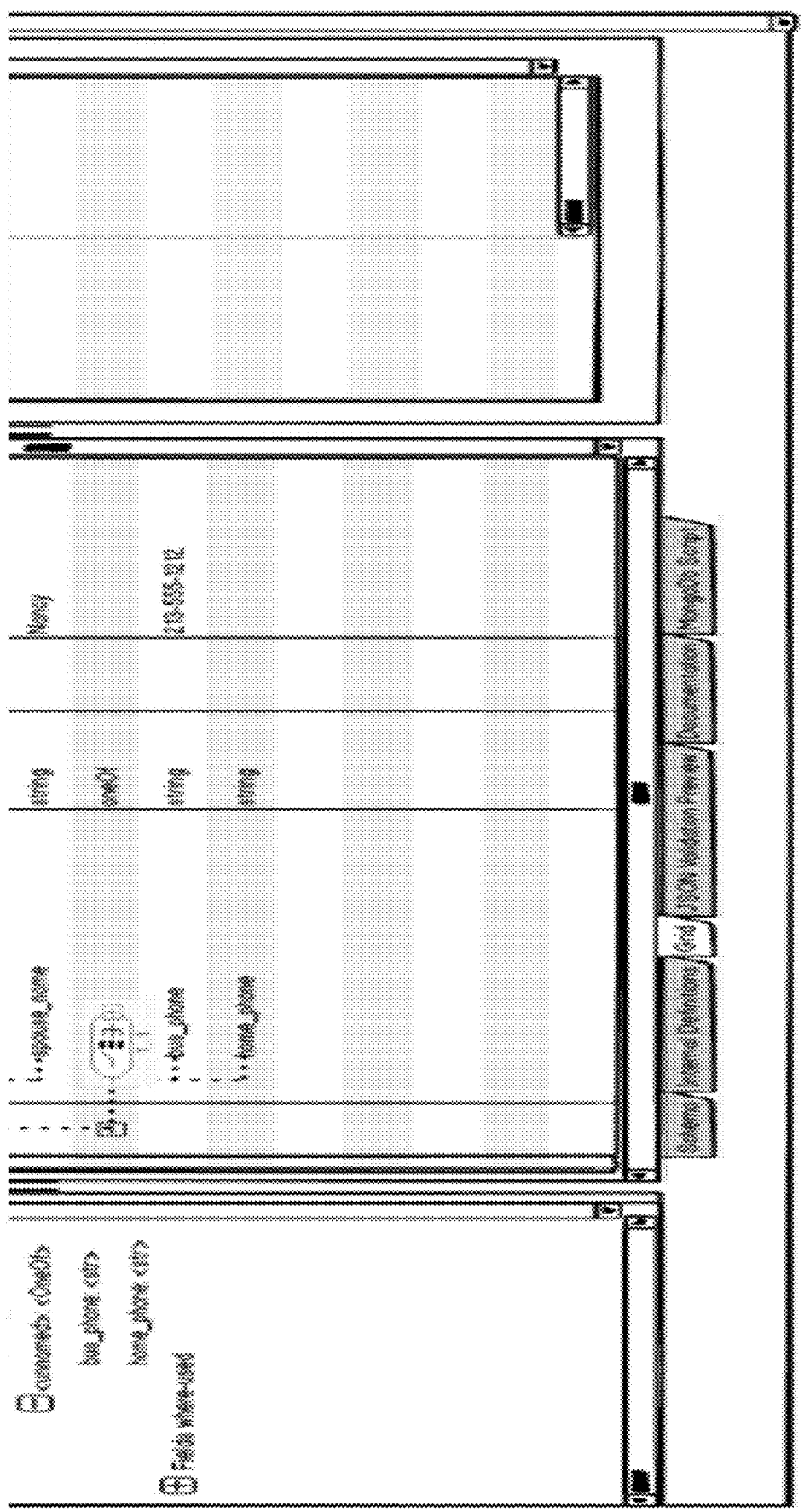

This view provides exactly the same functions as the graphical view, but with a different layout and visualization, cfr FIG. 49.

2.2.2.10 JSON Preview

Figure 50:
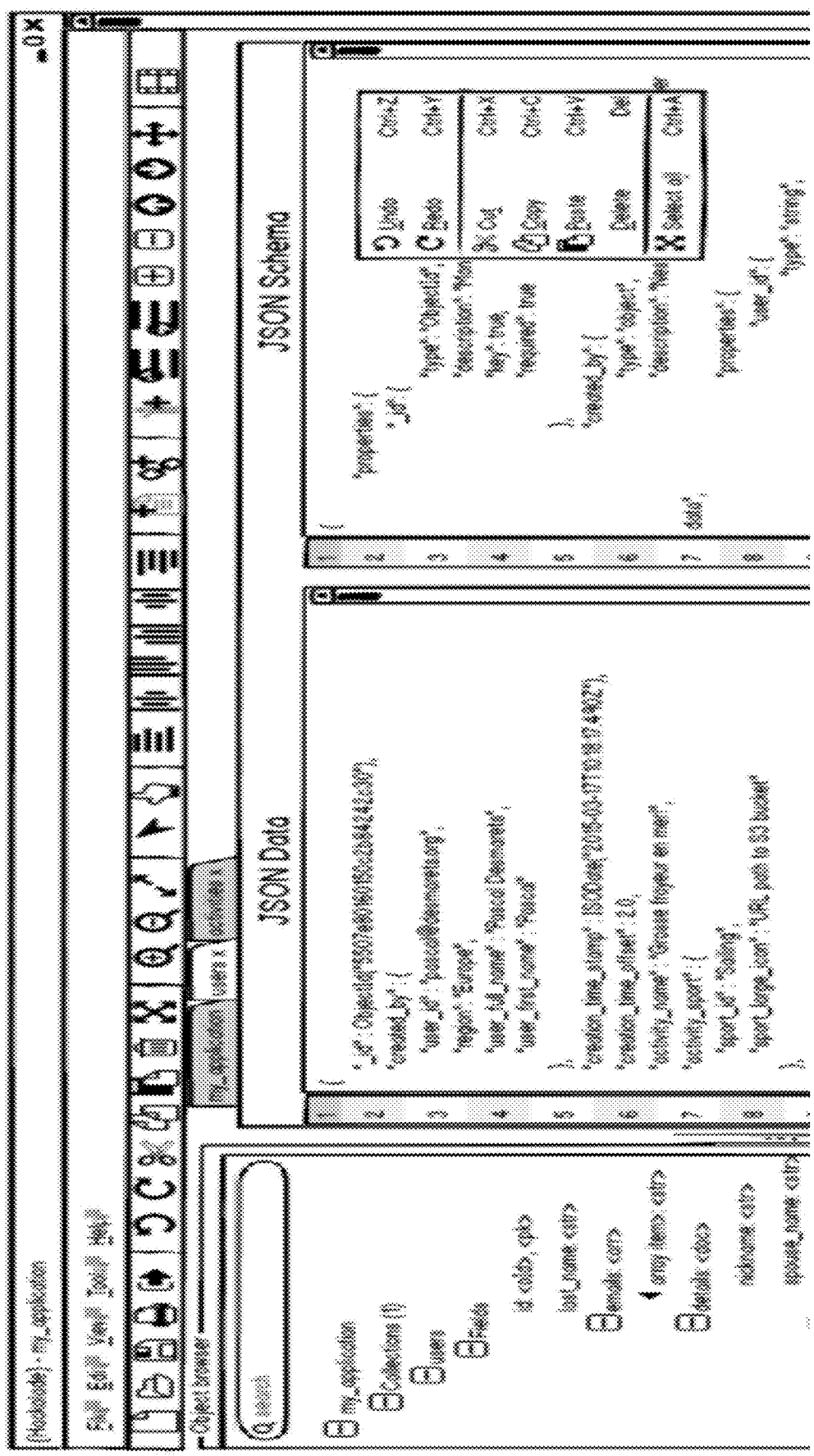
FIG. 50 shows an example JSON preview.
Figure 50:
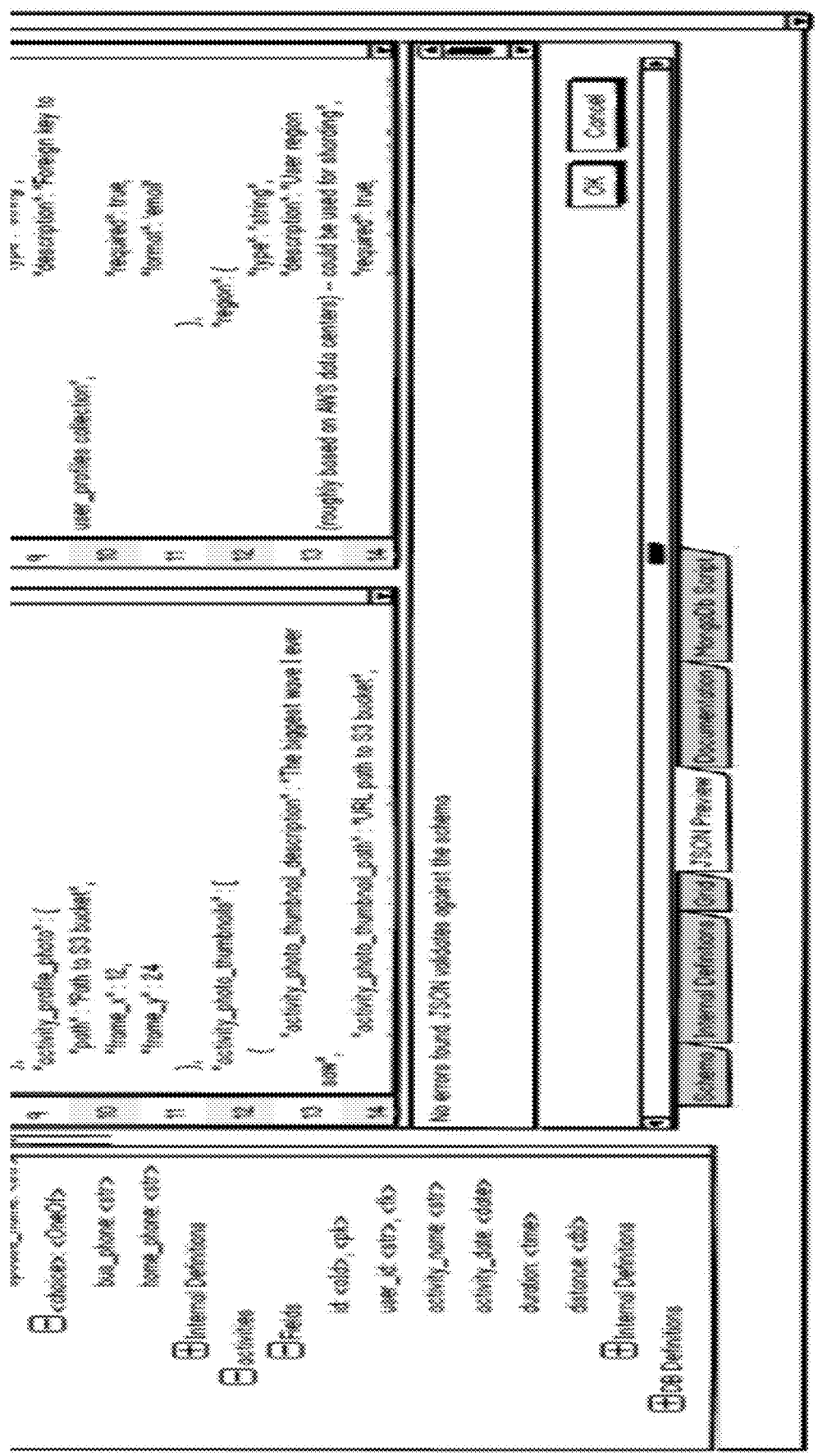

One difficulty with JSON Schema is to easily visualize a JSON document complying with the schema defined. To that effect, the Properties pane provides for each field a Sample entry box so the user can record an example to be used in a JSON document. This view shows, side by side, the JSON data document, and the corresponding JSON Schema as defined in the Diagram or Grid views, cfr FIG. 50.

Modifications are allowed in the JSON Schema pane, and validation of these changes is made on-the-fly so as to give immediate feedback to the user. Changes made in this preview are immediately visible in the Diagram and Grid views, and vice-versa. This should be insured by the way entries are persisted. The JSON data is also editable.

2.2.2.11 Documentation

Figure 51:
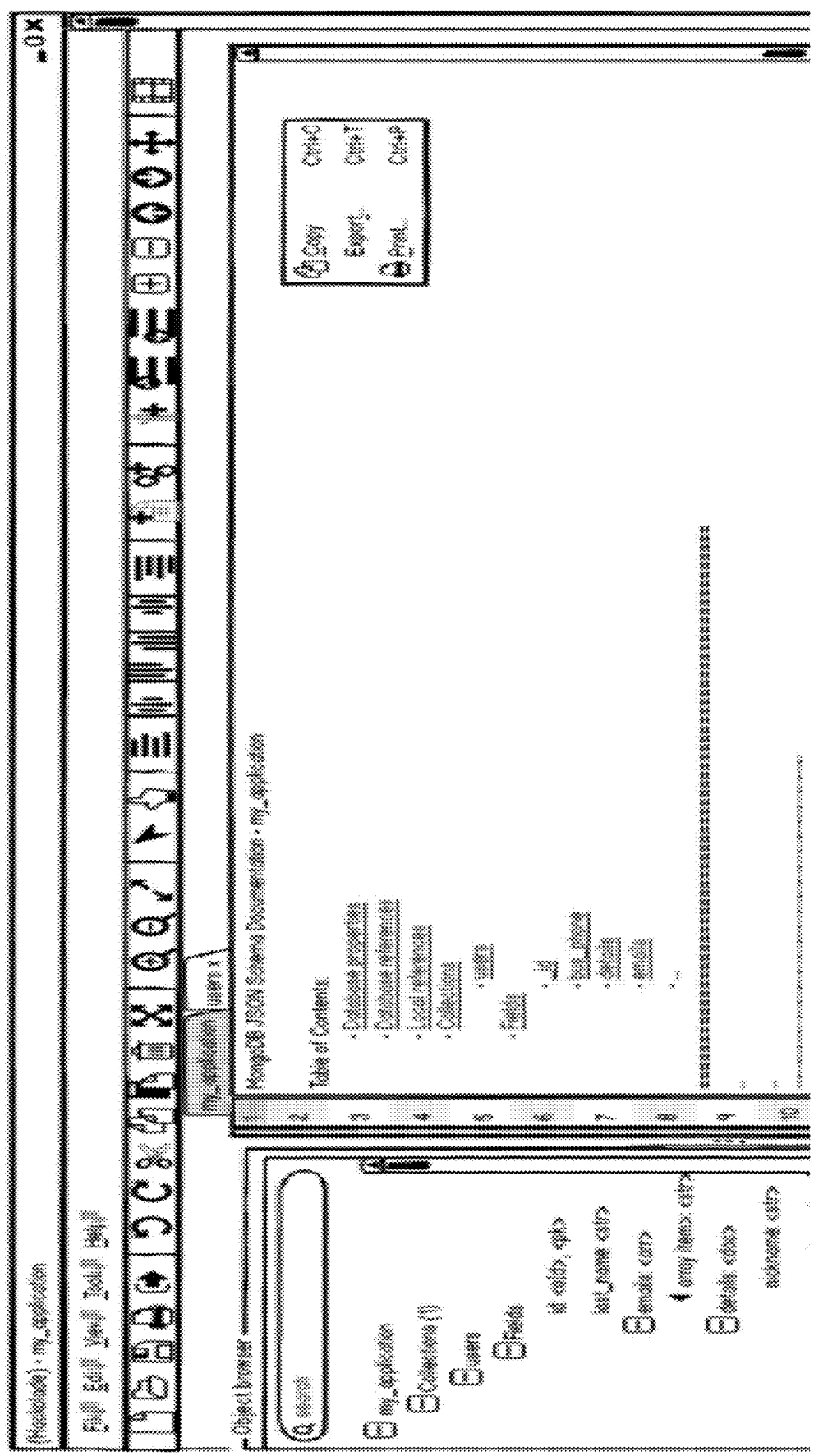
FIG. 51 shows an example documentation.
Figure 51:
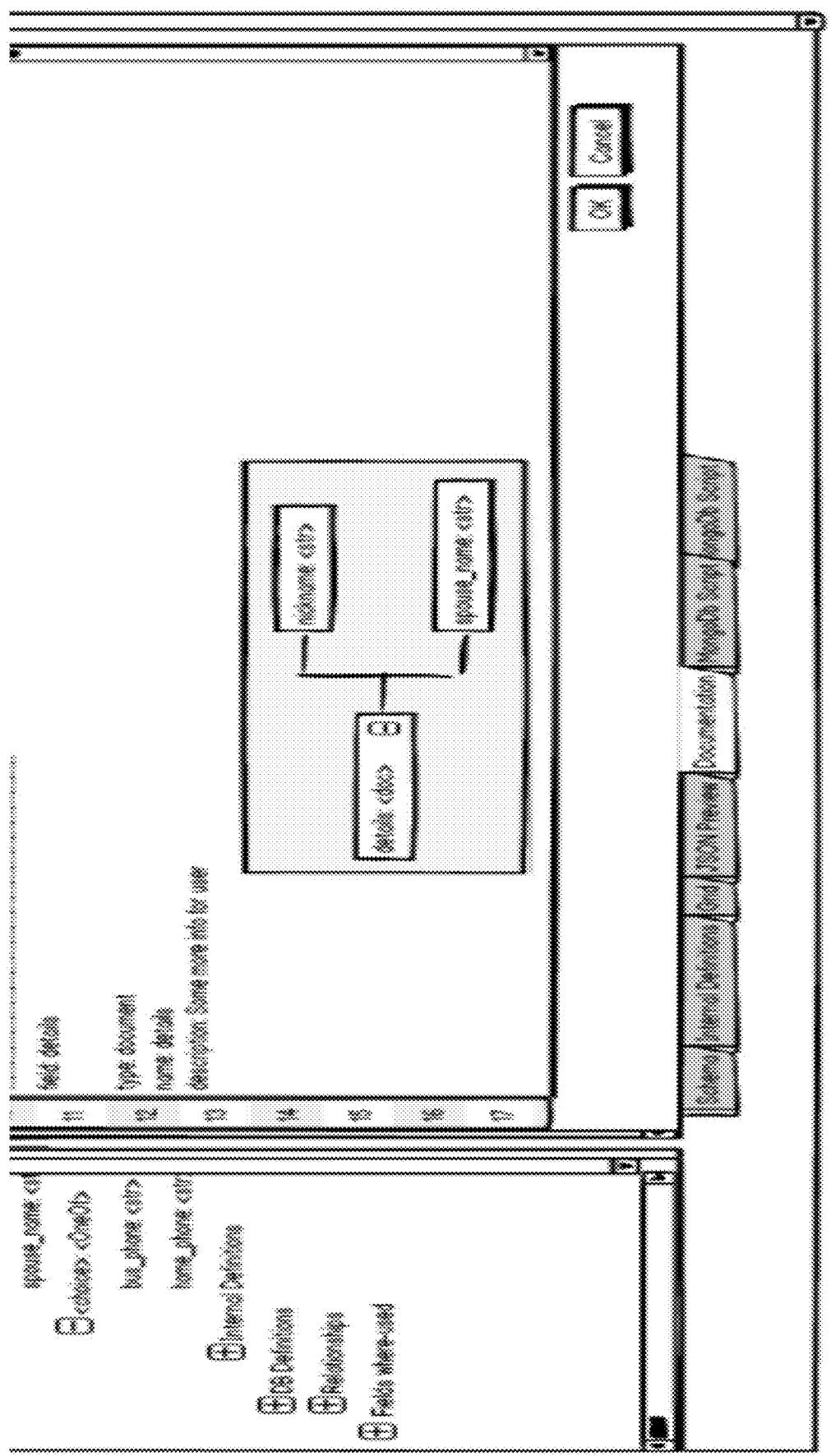

The goal with this tab is to generate a human-readable documentation of the JSON Schema created, as an equivalent implementation for JSON to something that is fairly common for XSD, cfr FIG. 51.

The documentation can be exported to RTF, PDF, Markdown, and (X)HTML formats, as well as RAML and Swagger. It is available for an individual Collection, or for the entire DB.

2.2.2.12 Database Script

Figure 52:
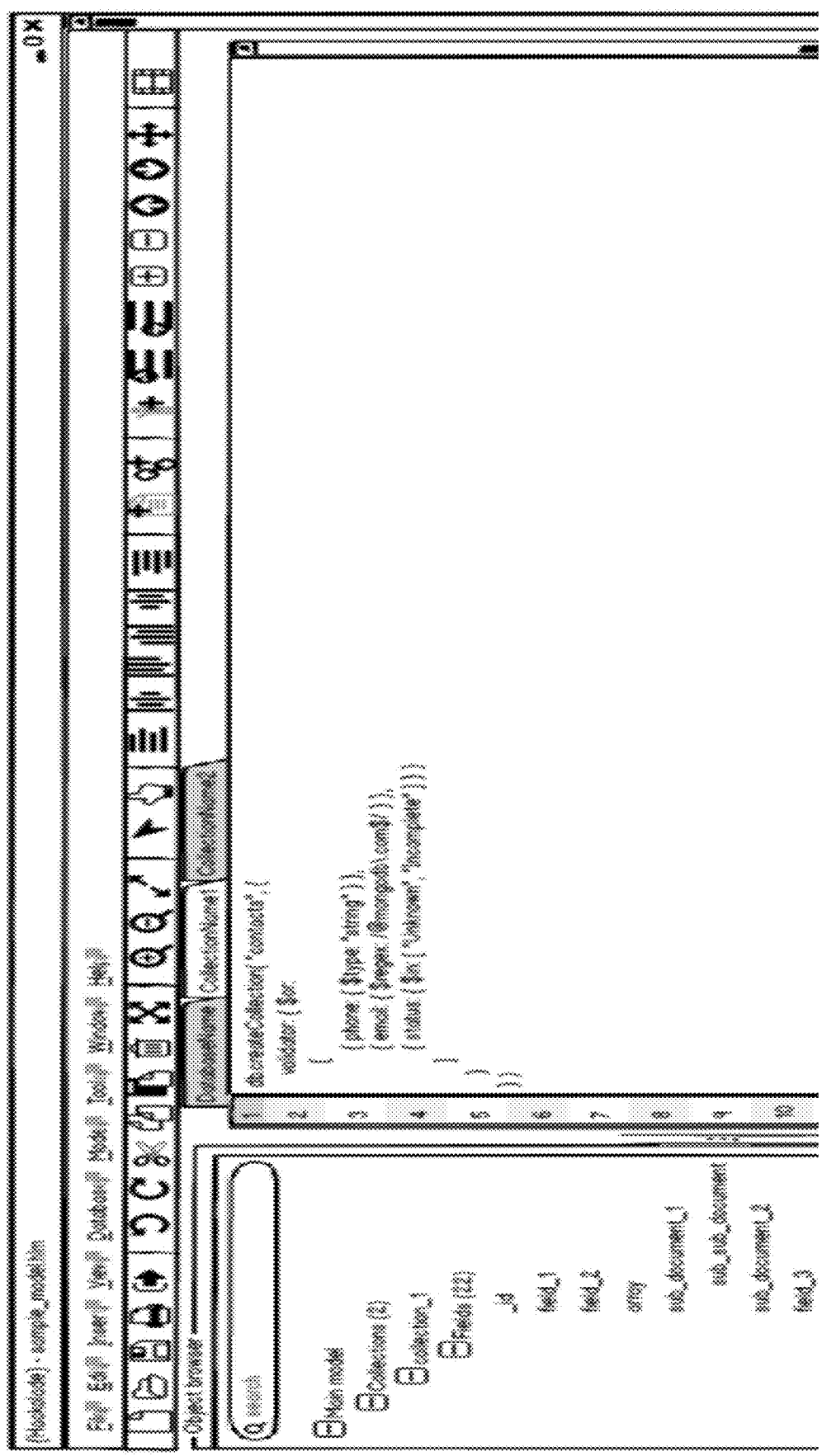
FIG. 52 shows an example database script.
Figure 52:
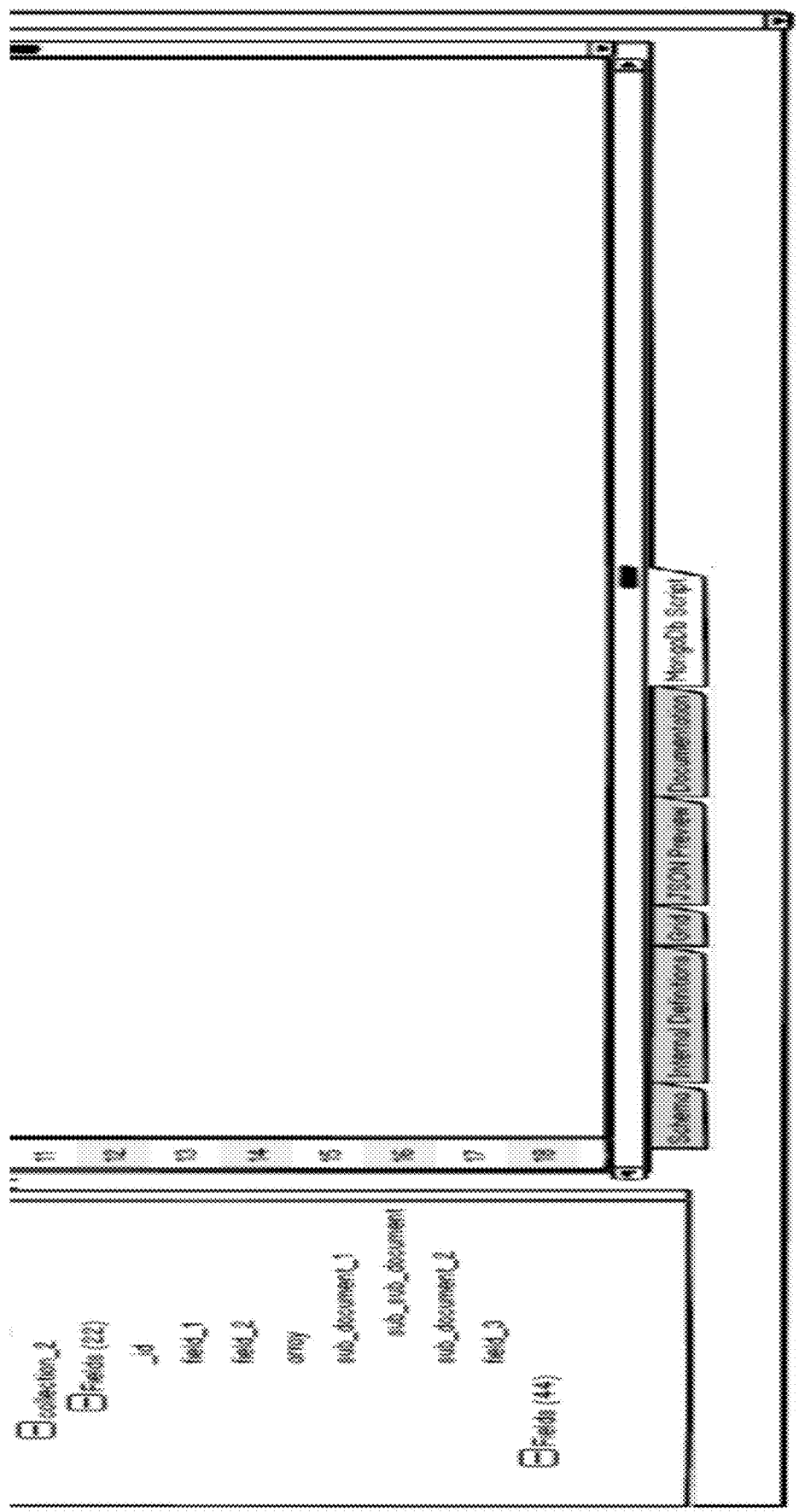

With MongoDB 3.2, a document validator was introduced. The system will provide mapping between JSON Schema syntax and MongoDB validator syntax, cfr FIG. 52. Similar functionality will be made available for other vendors, where applicable.

2.2.3 Additional Functions 2.2.3.1 Open, Save, Save as, Close

These functions will be affected by the type of repository and the way persistence in performed. Other than that, the features should fulfill the functions that one could normally expect.

2.2.3.2 Reverse Engineer

This advanced feature takes as input either:

a simple JSON document, and generates the schema for that document the current model;

a JSON Schema, and fills the properties in the current model;

or connects to a NoSQL database and takes representative documents form the collections present in the database. It generates the schemas for the different collections in a workspace.

Figure 6:
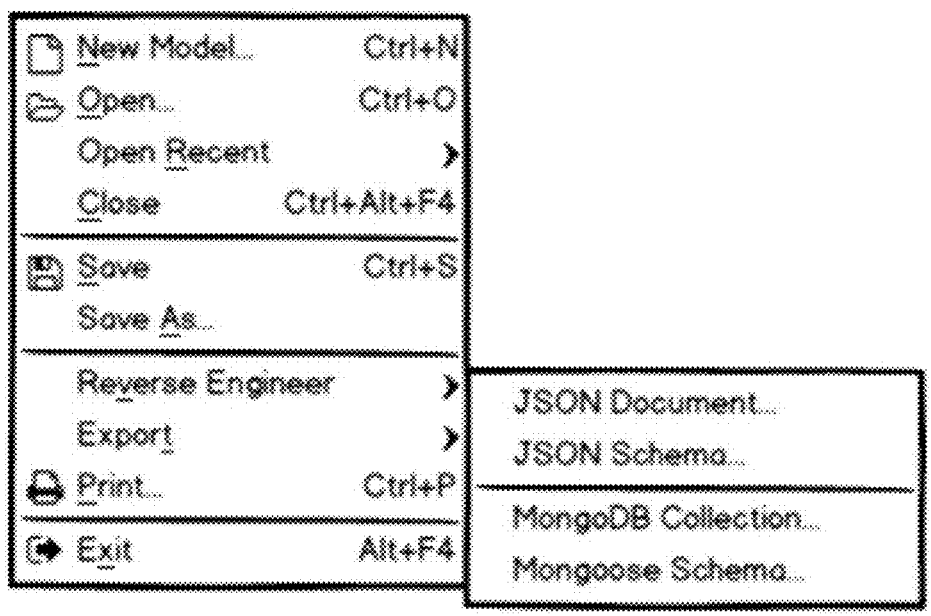
FIG. 6 shows the file menu (item: Reverse Engineer).

The user can then edit the model and save it independently of the source, cfr FIG. 6.

2.2.3.3 Export

Figure 53:
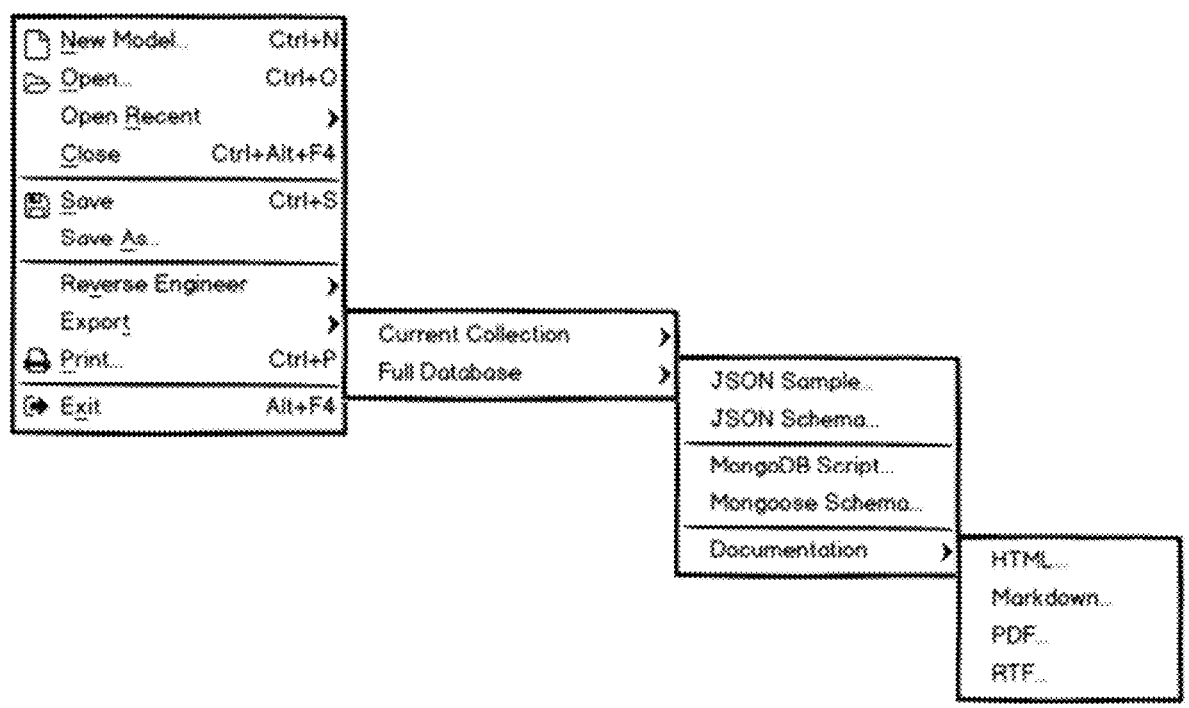
FIG. 53 illustrates the export feature.

This advanced feature lets the user export parts of the model or the model in full, in a variety of formats, cfr FIG. 53.

2.2.3.4 Print

Figure 54:
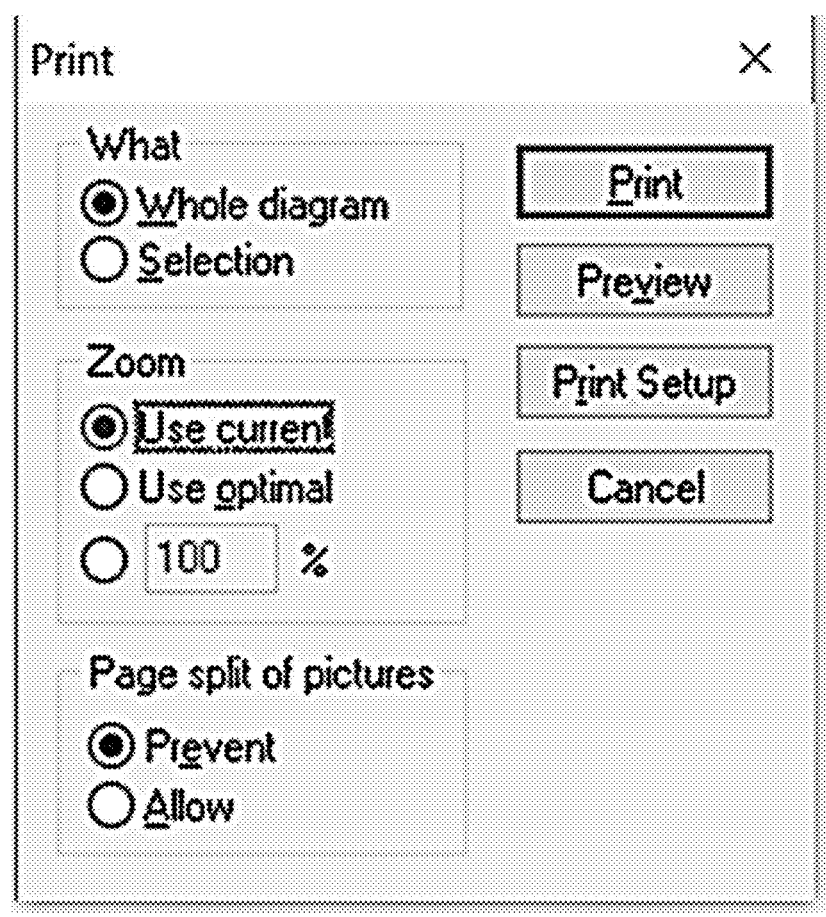
FIG. 54 shows the Print dialog.
Figure 55:
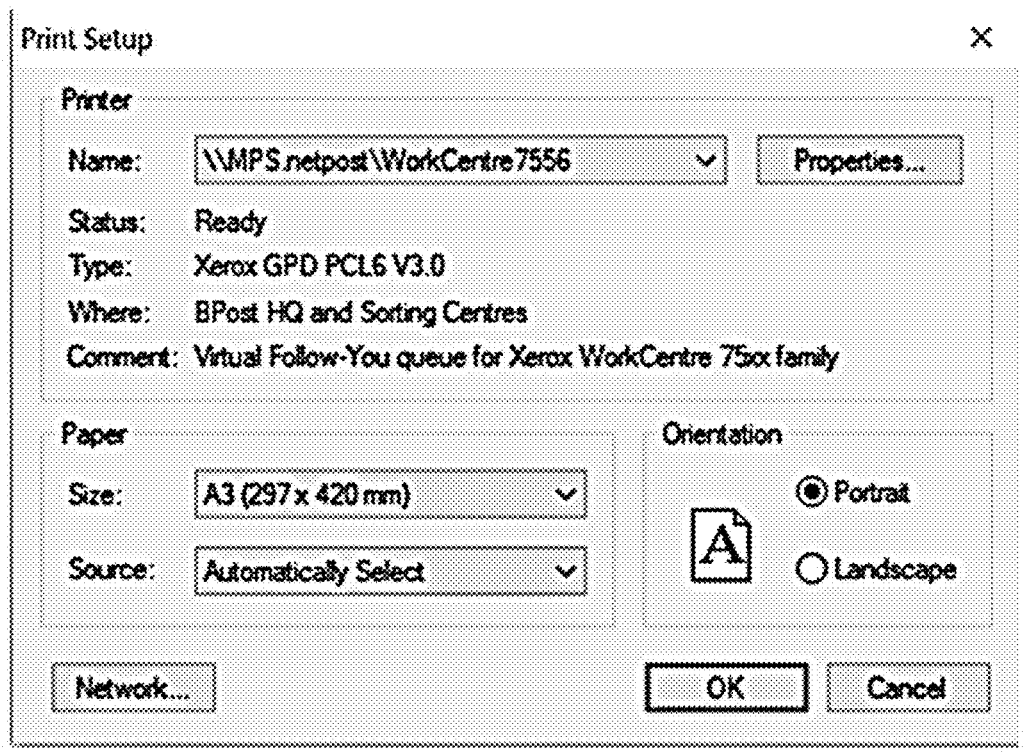
FIG. 55 shows the Print Setup dialog.

Printing is possible for diagrams, as well as for documentation, JSON documents, and schemas. The controls provided to the users should be as follows: print setup (so the printer and its properties, as well as the paper size can be selected), print preview (so the user can visualize the output prior to actual print), print selection, zoom level, and whether objects can print across page splits, cfr FIGS. 54 & 55.

2.2.3.5 Compare Models

The goal with this advanced feature is to provide a side by side view of 2 models (presumably 2 different versions of the same model), highlighting differences between them.

2.2.3.6 Options

Figure 56:
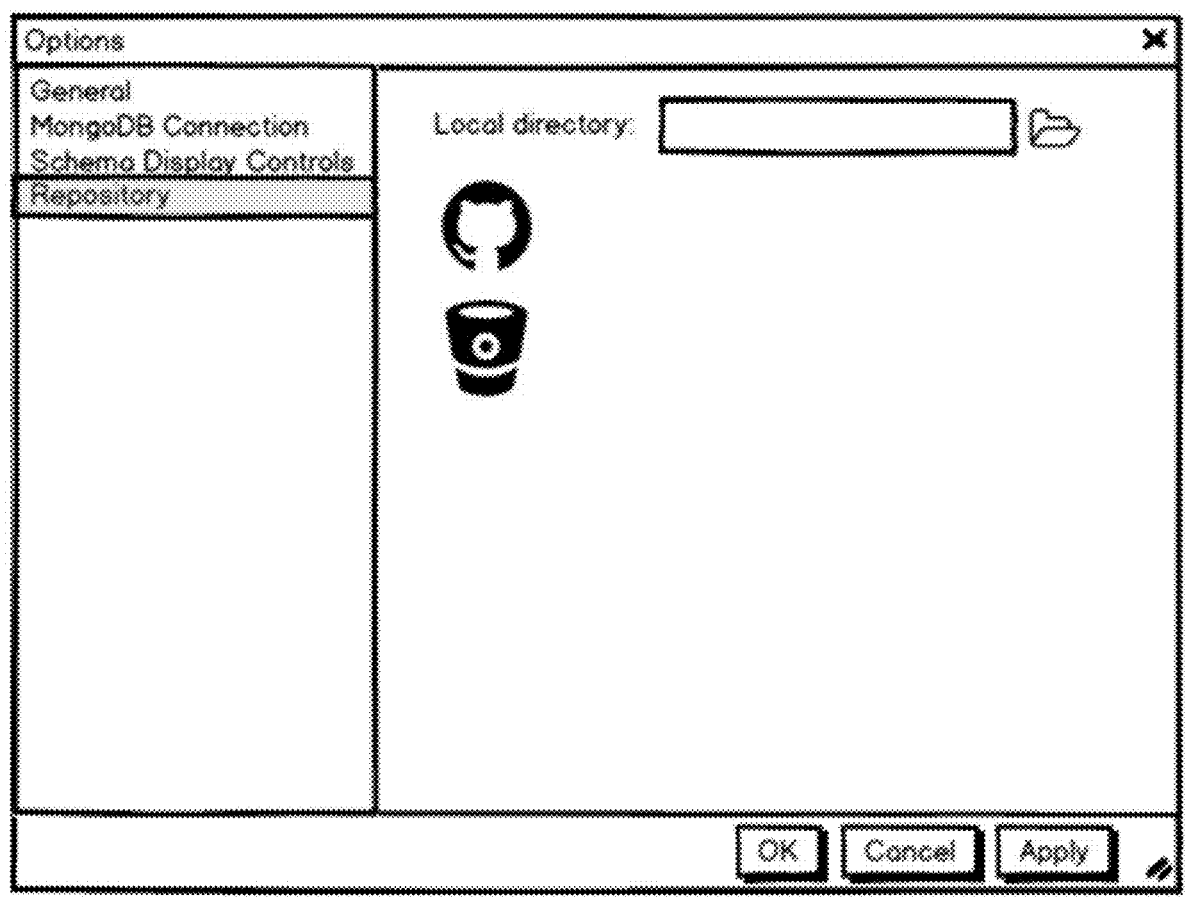
FIG. 56 shows the options interface.

Typically, parameters to be user-maintained appear in the course of design and development of an application, and they grow with the application, cfr FIG. 56.

Figure 57:
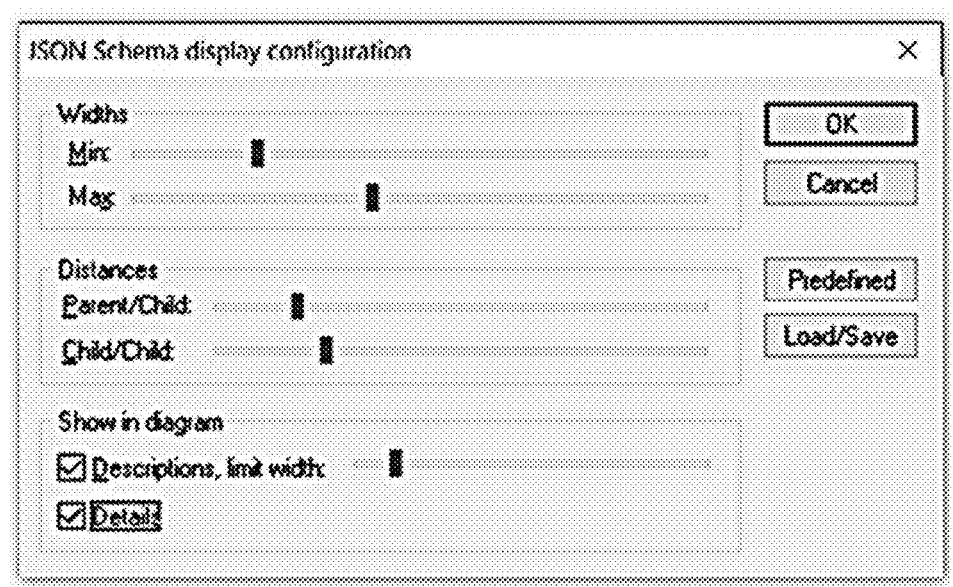
FIG. 57 shows the JSON Schema display configuration.

For the schema display controls of the DTD diagram, several controls could be included in a JSON Schema display configuration, cfr FIG. 57.

3. Application to Relational Databases and Denormalization Suggestion Requirements In this section, the concept "denormalization" mentioned earlier in Sect. 2.2.2.2.2 is elaborated upon. In this document, the term "denormalization" refers to any conversion from a source database model to a destination database model wherein nesting takes place.

Specifically, this section discusses an embodiment of the present invention wherein a source relational database model is converted into a destination database model according to the present invention. Hereby the foreign keys present in the source relational database model are used for nesting. Specifically, the destination database model is obtained by nesting joined foreign tables.

The concept of denormalization illustrates the broad range of applicability of the present invention. While above, the applicability was illustrated mainly in case of NoSQL databases and REST APIs, relational databases and RDMS and all related aspects are equally in the scope of the present invention. In a preferred embodiment, this is done through "reverse-engineering", similar to the functionality explained above. In an alternative embodiment, this is done through "forward-engineering". In yet alternative embodiment, this is done by operating directly on a relational database and RDMS.

While denormalization is presented in this document as an embodiment of the present invention, it may also be considered as a stand-alone concept and related invention. Specifically, the graphical user interface used in this section reflects only one embodiment of the concept of denormalization. In an alternative embodiment, denormalization as described in this document enables generating a destination database model from a source database model without necessitating a graphical user interface in any step of the generation method.

3.1 Introduction

Assuming that the function 'Reverse-Engineer DDL file' is available, an often requested additional function is to suggest a denormalized model based on an original relational model.

This document describes the process of taking a source relational model (created from scratch or through the reverse-engineering of a DDL file or RDBMS) stored with a method according to the present invention, and generating a new model while nesting joined foreign tables. After that process, the user can further edit and refine the denormalized model.

3.2 Concepts

Figure 58:
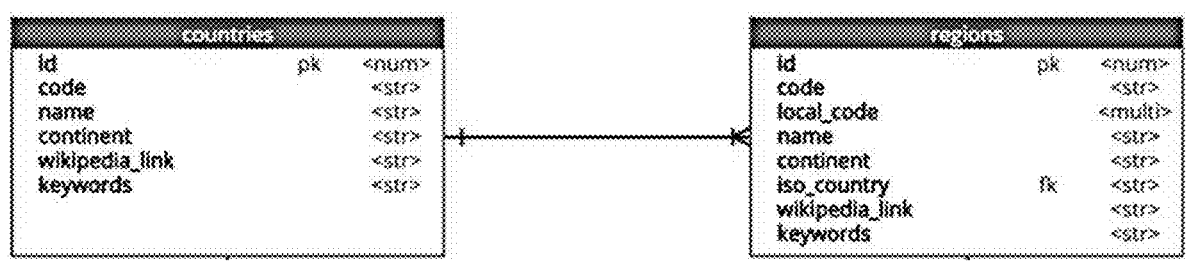
FIG. 58 shows two flat tables in a source model.
Figures 59, 60:
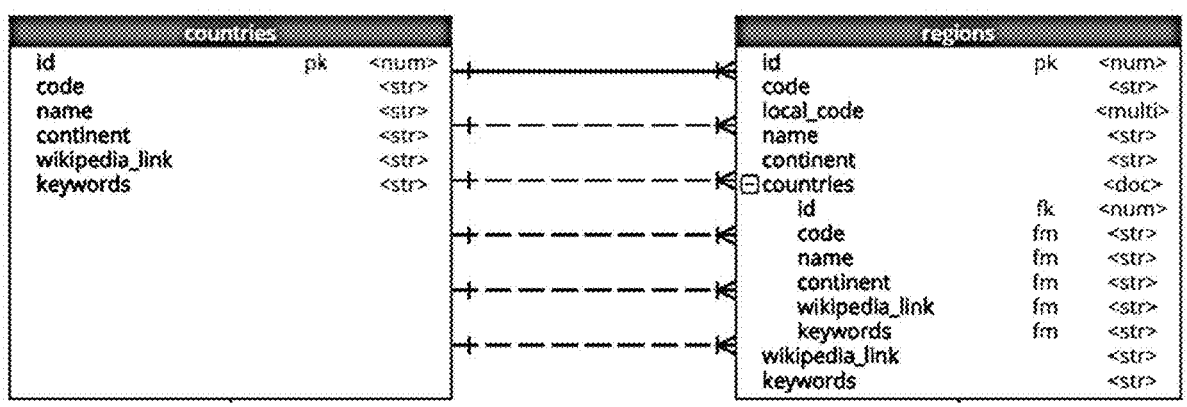
FIG. 59 illustrates a foreign key relationship.
FIG. 60 shows a denormalization result.

Starting with 2 flat tables in the source model, see FIG. 58, with a foreign key relationship illustrated by FIG. 59, there are at least 2 ways and even 3 ways that denormalization could be seen, given in Sect. 3.2.1-3, respectively.

3.2.1 Sub-Document of Child Table Containing Foreign Parent Table Structure

As a flat table in a normalized source model is being copied to a collection in a denormalized destination model, if a foreign key relationship is encountered, the structure of the parent table is included as a nested sub-document of the collection.

The expected result of the new function is illustrated by FIG. 60.

Here, the parent table structure has been embedded as a sub-document structure in the child table. Foreign keys and foreign master relationships are automatically created in the embedding process.

3.2.2 Array in Parent Table Containing Child Table Structure

Figure 61:
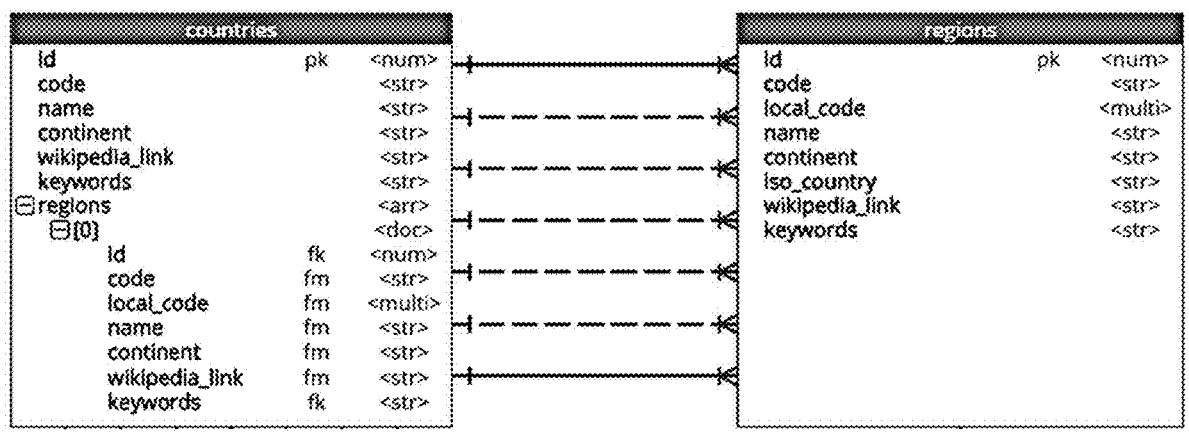
FIG. 61 shows a denormalization result.

Another way to perform denormalization is to create, in the parent table, an array with the structure of the child table, with the expected result illustrated by FIG. 61.

Remarks:
1) The child field with the original relationship is not repeated in the parent table array, so as to not create circular references
2) The parent-child relationship is inverted. Now the parent of the fields in the newly created array are the fields in the former child table.
3) As a result, the 1 . . . n cardinality is in the parent, see FIG. 62. Note how the field name would benefit from dot.notation to represent nesting.

3.2.3 Combination

If the 2 logics are combined, the following result is generated, illustrated by FIG. 63. Depending on how data is read, all 3 above ways to denormalize are possible.

3.2.4 Cascading

Figure 64:
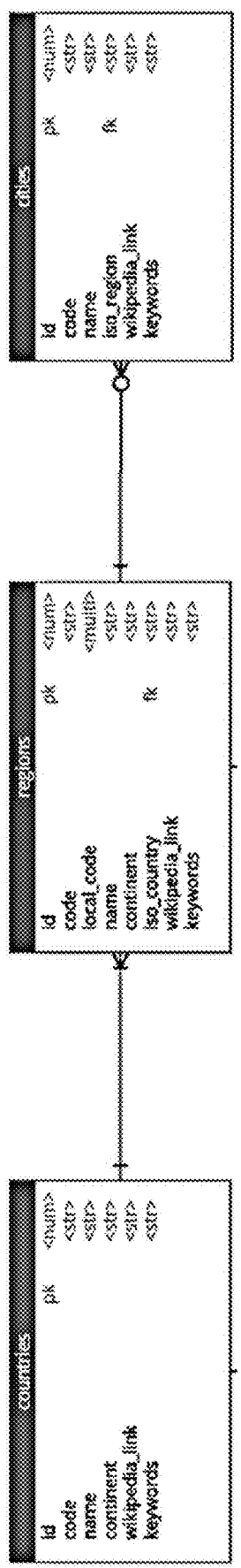
FIG. 64 shows three flat tables in a source model.
Figure 65:
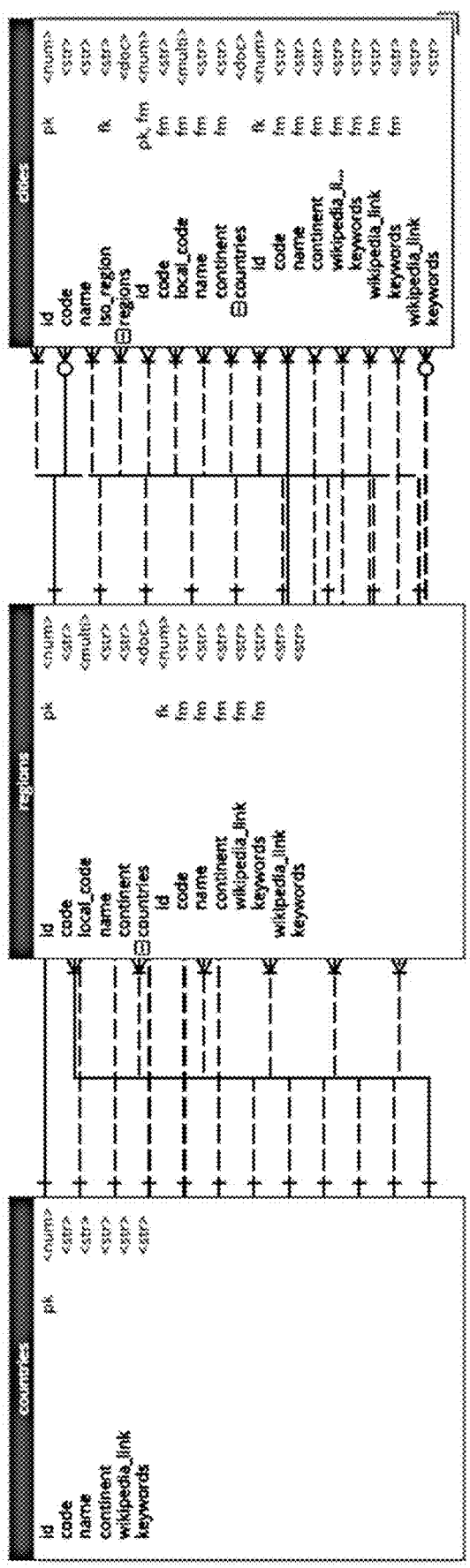
FIG. 65 shows a normalization result.

When a parent table is itself the child of another (grand-) parent, the result illustrated in FIG. 64 is obtained. It may be desirable to cascade the relationships into multiple levels of nesting, to achieve the result illustrated in FIG. 65. (It will be nice to be able to rearrange relationships to reduce elbowed lines . . . )

Figure 66:
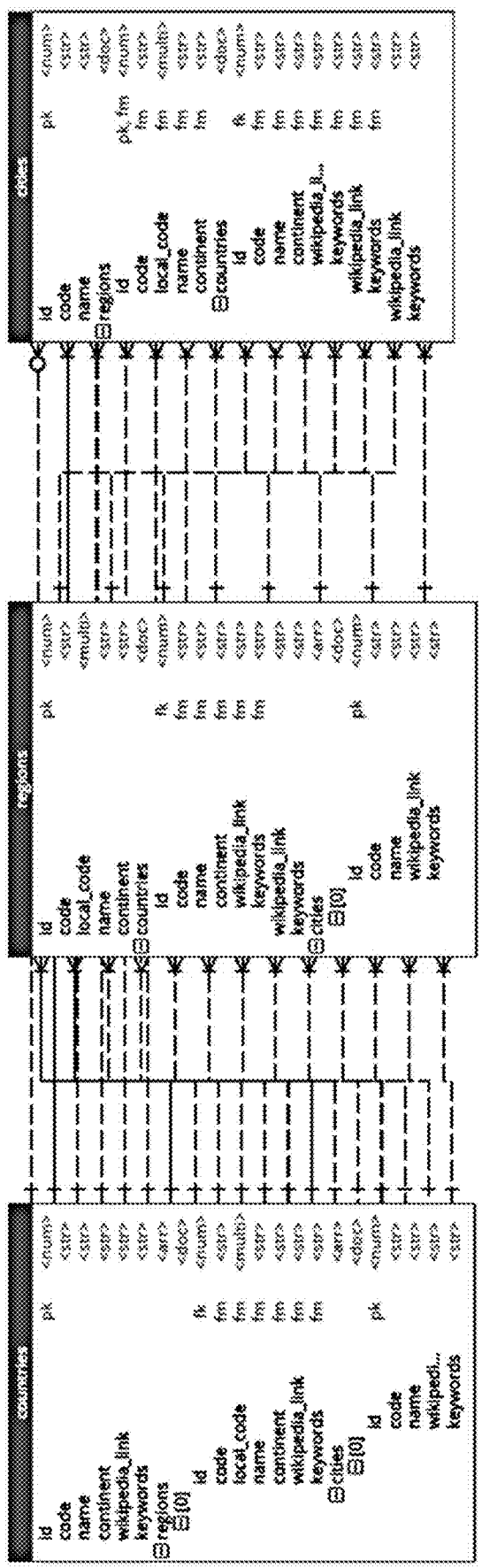
FIG. 66 shows a denormalization result.

And of course, the mirroring cascading array is possible, with the result illustrated in FIG. 66.

As this could go on and on forever in complex models, it is probably a good idea to limit the number of cascades, and let the user decide the number of cascades between 0 and a maximum of 3 for example. It is of course easier to delete an extraneous cascade than to manually create one.

3.2.5 Recursion

When a relationship exists between fields of the same table, again one can embed a child array into the parent, or embed a parent sub-document into the child. Here however, it is not suggested to do both.

Finally, there is no indication of how many times it would be necessary to cascade, without looking at the actual data.

Figure 67:
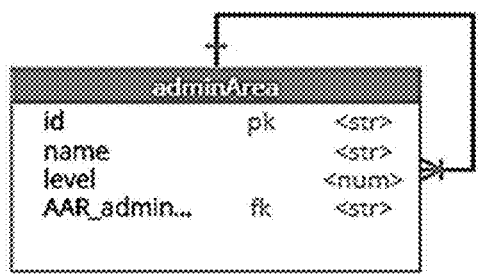
FIG. 67 shows a flat table in a source model.
Figure 68:
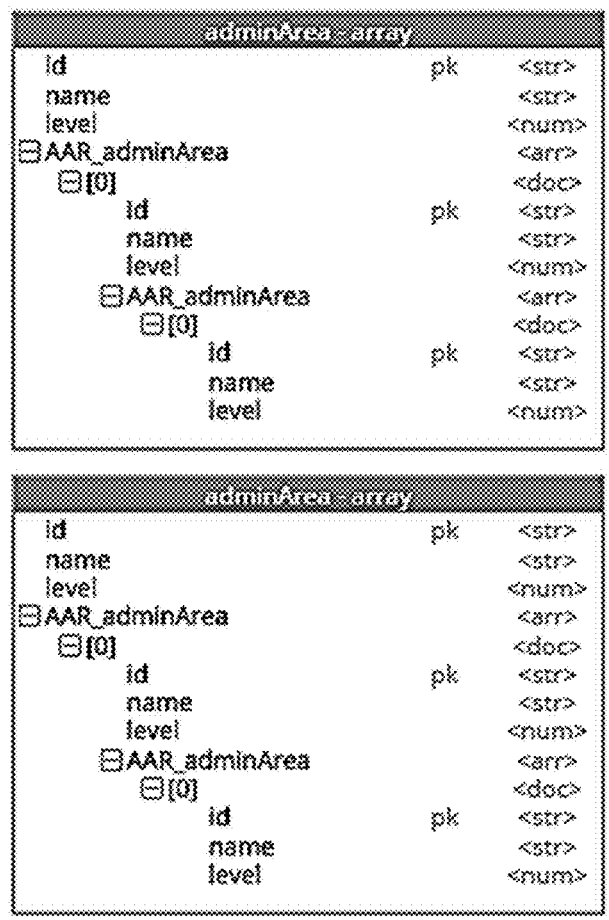
FIG. 68 shows two denormalization results.

The relational table shown in FIG. 67 can be modelled in either of the 2 ways illustrated in FIG. 68.

3.2.6 Multiple Paths

Figure 69:
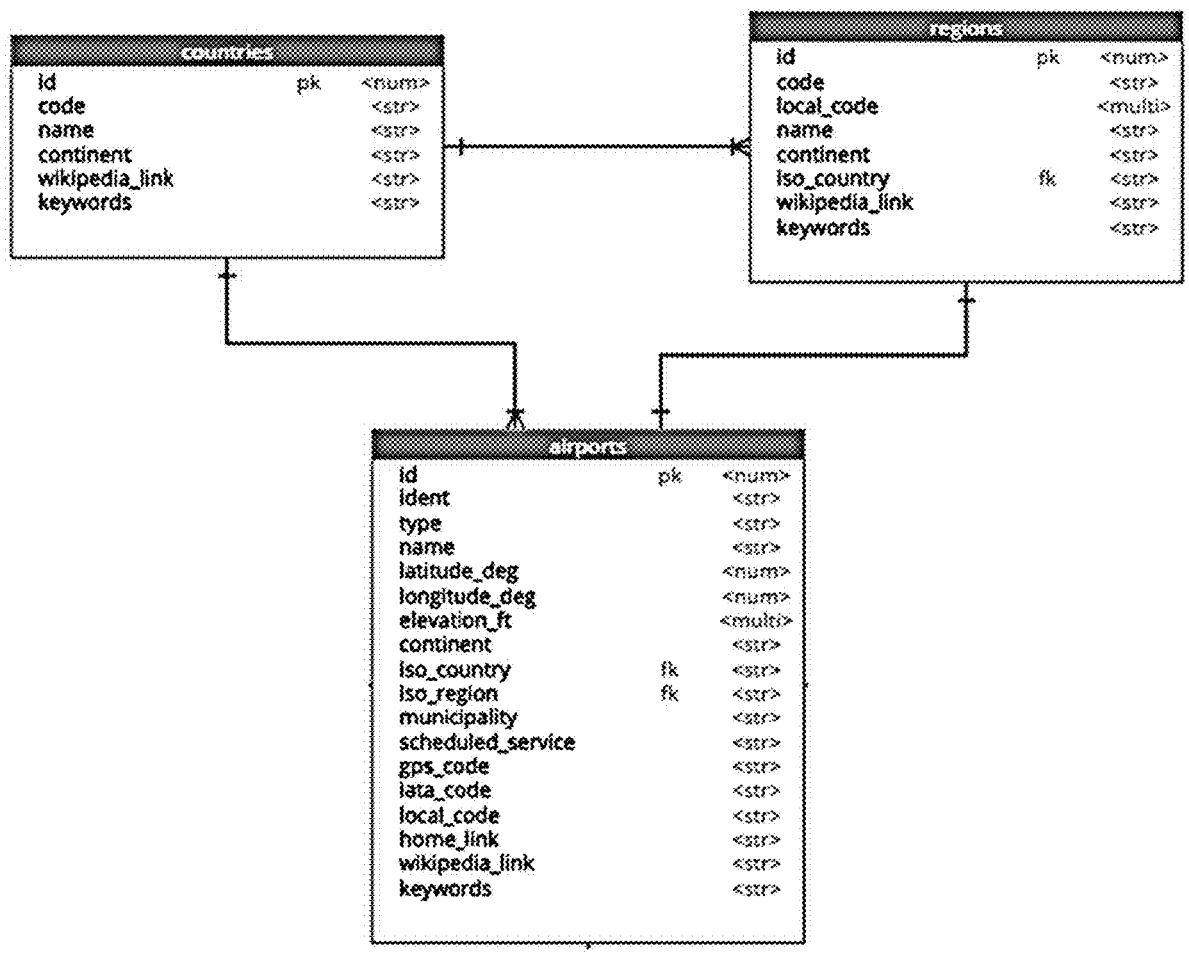
FIG. 69 shows three flat tables in a source model.

In the case shown in FIG. 69, the order in which tables are denormalized and converted can be of importance, as taking the route airports>regions>countries will provide richer, but more hierarchical, information.

3.2.7 Circular References

Circular references should be detected and avoided.

3.3. Process 3.3.1 Menu Access

Figure 70:
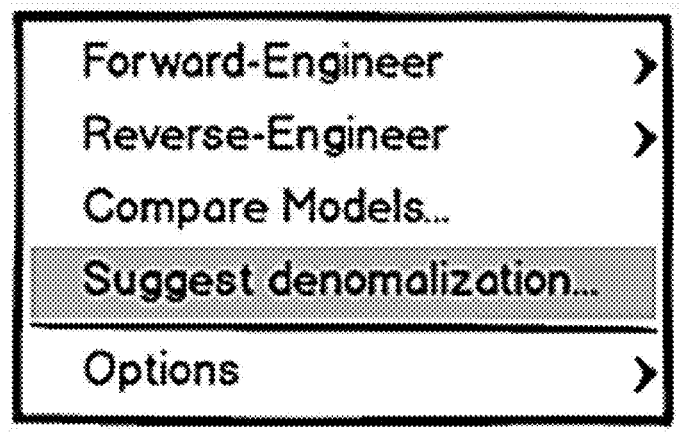
FIG. 70 illustrates the menu access.

Menu access is illustrated in FIG. 70.

3.3.2 Save Current Model

Figure 71:
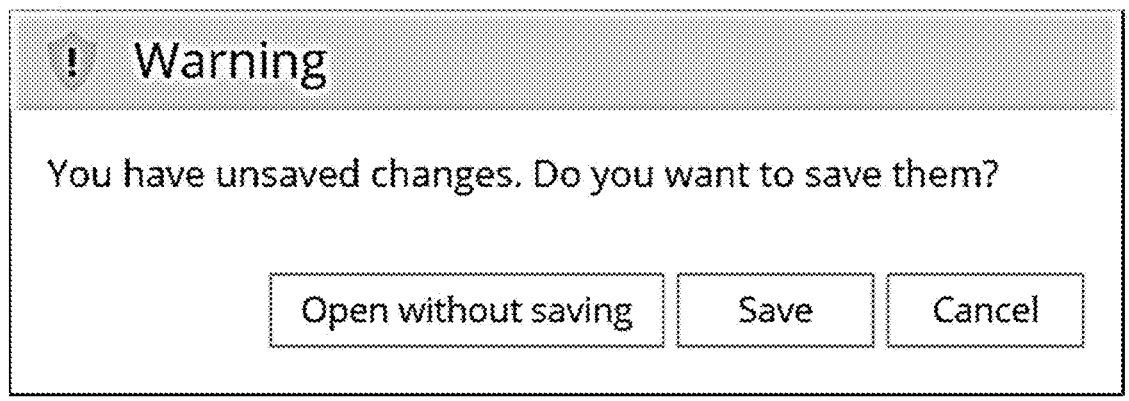
FIG. 71 shows a warning relating to saving of the current model.
Figure 77:
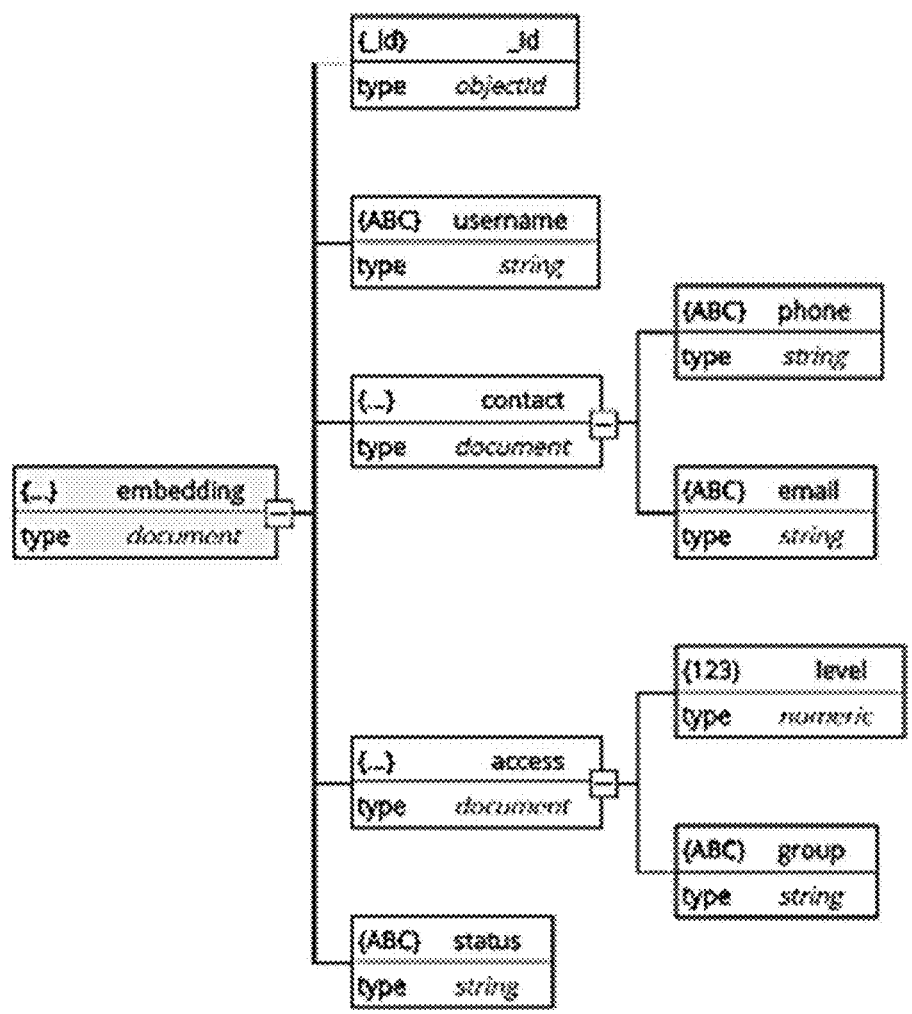
FIG. 77 shows the "Modeling according to present invention" (part 2 of 2) of the example problem.

The display shown in FIG. 71 occurs if changes have been made, so the denormalization suggestion can be stored in an empty model.

3.3.3 Selection and Parameters

The user can select all tables or specific tables to be denormalized, as well as set some parameters to be used during the model denormalization process. This is illustrated by FIG. 72.

3.3.4 Execution

The process will include at least the following steps:
Copy tables from source (normalized) to destination collection (denormalized)
Select first relationship in source
  Embed in destination model according to chosen parameters
    If array in parent collection:
      Append array item with type=document
      Copy child structure into document array item, except relationship field
    If sub-document in child collection:
      Replace relationship field with
      Collection made of copied parent structure
  Create Foreign Key and Foreign Master relationships
  Iterate according to Cascade and Recursion parameters
  Go to next relationship and loop Example 2

Example 2 is illustrated by FIGS. 73 to 77. FIG. 73 shows an example problem with result according the present invention. Hereby, FIGS. 74 to 77 show magnified portions of FIG. 73. First of all, FIG. 74 shows the "JSON document to model". Furthermore, FIG. 75 shows the "Modeling with traditional ER software", whereas FIGS. 76 and 77 together show the "Modeling according to present invention" of the example problem. The problem investigated in this example is how to construct and/or edit the portion of JSON document code provided in FIG. 74, thereby supported by a GUI. As clear to the skilled person, said portion of code defines a simple JSON document relating to an individual, comprising both top-level information relating to, i.e. the fields with field names "_id", "username", "contact", "access" and "status", as well as nested information, i.e. two nested objects, relating to the field names "contact" and "access", respectively. A result according to the state of the art is given in FIG. 75, with an Entity Relationship Diagram (ERD) comprising three collections. This is opposed to the ERD as obtained with an embodiment of the present invention and shown in FIG. 76, complemented with a tree diagram shown in FIG. 77.

Overall, the present invention allows to reflect the original JSON document structure through structure (less collections, only "true" relationships) (particularly in the ERD), sequence preservation (both in the ERD and the tree diagram), interaction (both in the ERD and the tree diagram), and indentation (reflecting nesting) (particularly in the ERD), while state of the art methods fail to do so. Hence, the result of the present method is not only more true to the original JSON document definition, but also more compact in terms of ERD, allowing for a clearer and overall better overview. Additionally, also the interactive editing of the database schema model is more flexible, with richer interaction thanks to the choice between the ERD and the tree diagram. This is discussed in more detail below.

First, remark how the database schema model constructed with a state of the art method comprises a first collection for said top-level information, as well as a second and third collection for each of said two objects. This is a first problem with a state of the art method, since the separation of information across three separate objects obfuscates the unity of the underlying information. Indeed, there is no point in removing said two objects from their original context. This may mislead a user of the method into thinking that the information relating to "contact" and "access" is somehow "less closely relating" to said individual, as opposed to, e.g., "username", which seems "more closely relating" to the said individual. This difference is a misconception altogether, since "contact", "access" and, e.g., "username" actually belong to the same top-level in the original JSON document. This misconception may lead to severe errors in the construction and editing of databases. Opposed to this, the present invention preserves the original context, with "contact", "access" and "username" all on the same level, both in the ERD illustrated by FIG. 76 and the tree diagram illustrated by FIG. 77.

A second related point concerns the preservation of hierarchy and the related interaction that is enabled by a result according to the present invention. While the fields belonging to the two objects "contact" and "access" are inevitably visible in FIG. 75 (result according to the state of the art), more flexibility is enabled in FIG. 76 (according to present invention), with collapsible items, indicated with a collapse-related icon, i.e. a square containing a "−" sign when the object content is visible (as shown), and a square containing a "+" sign when the object is collapsed (not shown). This has the advantage of allowing a very compact view, displaying all top-level objects but not the details, which enhances usability. Moreover, it creates an additional way for the user to interact with the database schema model, enabling him/her to gain familiarity with a database schema model and/or explain it to others by clicking/touching the collapse-related icon. Additionally, even in non-interactive views (such as printed documentation) the insight of the end user is enhanced, since the ERD of FIG. 76 is complemented by the tree diagram of FIG. 77. This allows a complementary approach, e.g. by showing a collapsed view for the ERD (i.e., without showing the content of objects), complemented with the tree diagram which indeed shows all detail.

Another advantage of the present invention lies in the preservation of sequence. Both the ERD and the tree diagram show the original sequence among field names on every level, as defined in the JSON document. For the result according to the state of the art this sequence is not preserved: as clear from FIG. 75, it can no longer be determined whether, e.g., "contact" was in first, second, third, fourth or fifth position in the list at top level. This obfuscation of sequence leads to incomplete interaction with the database schema model, another problem that is solved by the present invention.

A further advantage of the present invention is the purposeful use of indentation in the ERD. As visible on FIG. 76, fields belonging to an object are indented with respect to the object name, which serves at least two purposes. On the one hand, it serves to easily confine the object's content in a visual manner. On the other hand, it mimics the typical layout of JSON document code as illustrated in FIG. 74. Therefore, a user with prior experience with JSON is likely to have little difficulty in understanding the ERD according to the present invention, and is hence less inclined to make mistakes in his/her interaction with the database schema model.

Furthermore, remark the presence of two "relationships" in the database schema model constructed with a state of the art method, both of which seem relationships in the sense of RDBMSes, but in fact concern "nesting relationships", which further obfuscate the unity of the underlying information. Indeed, by adhering to a "flat-table-only" representation, the user constructing database schema models with a state of the art method is faced with a whale of an entity relationship diagram, lacking any sense of overview. This is particularly true if it concerns a database schema model comprising "true" relationships such as foreign key relationships, such as the foreign key relationship linking two collections in FIG. 58. In a method according to the prior art, the denormalization of a relational database schema model as described in this document would lead to a dramatically complicated ERD, with a confusing mix of nesting relationships and "true" relationships. Opposed to this, the method according to the present invention only creates relationships when necessary, i.e. none in the case of the present example, and only a limited number in the case of FIG. 58, illustrated e.g. in FIGS. 60 and 61. As a result, the user interacting with a database schema model according to the present invention keeps a better overview of the relevant relationships, making less errors on average as a consequence.

Example 3

Figure 78:
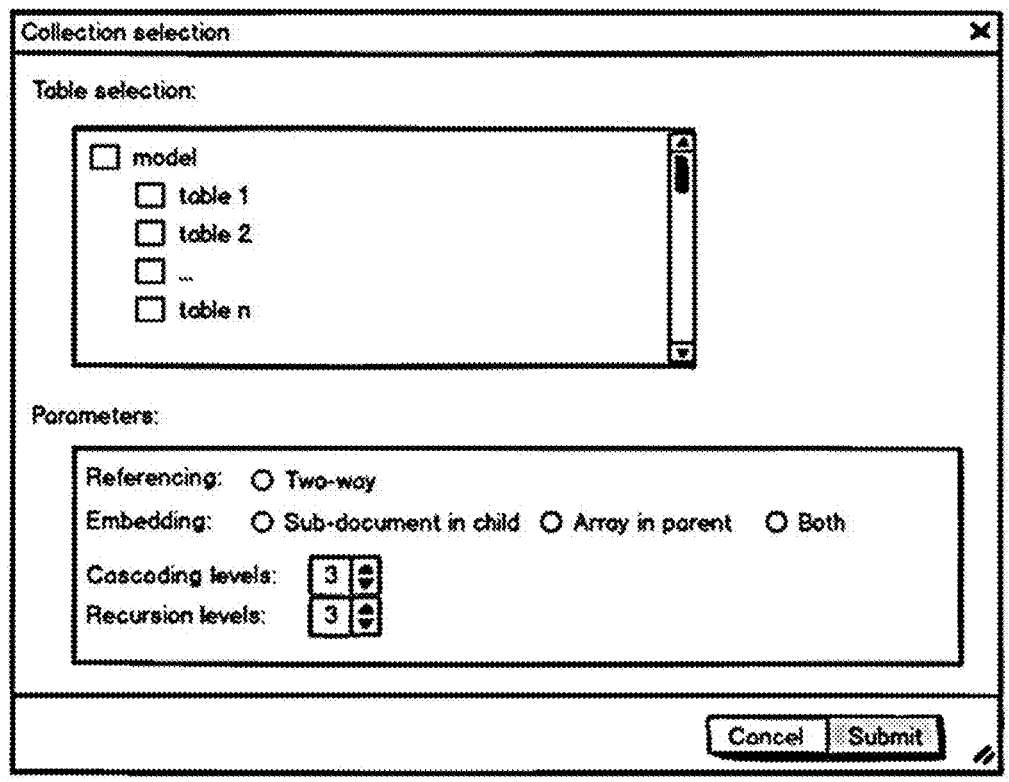
FIG. 78 shows an example interface relating to referencing and denormalization.
Figure 79:
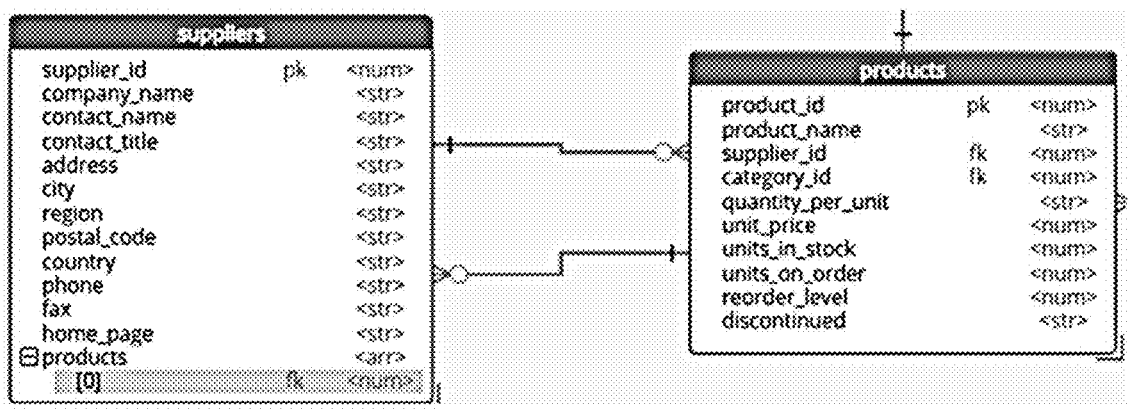
FIG. 79 shows an example relating to referencing and denormalization.

FIGS. 78 and 79 show an example relating to referencing and denormalization. Particularly, FIG. 78 shows an example interface that complements the interface of FIG. 72 introduced in Sect. 3.3.3 of Example 1, allowing the user to select all collections (tables) or specific collections (tables) to be denormalized, now with the additional option to choose two-way referencing. The difference between referencing and embedding is as follows. With embedding, when an array is denormalized in parent (and also for that side when "both" is selected), an array is created made of a sub-document with all the fields of the child. Referencing, on the other hand, answers the need to bring only the keys to the parent, and not all the associated fields. That means that on the parent side, there would only be a simple array of foreign keys referencing the primary key of the child. In the corresponding ERD according to the present invention, only an array of simple fields is shown. This is illustrated in FIG. 79.

Example 4

Figure 81:
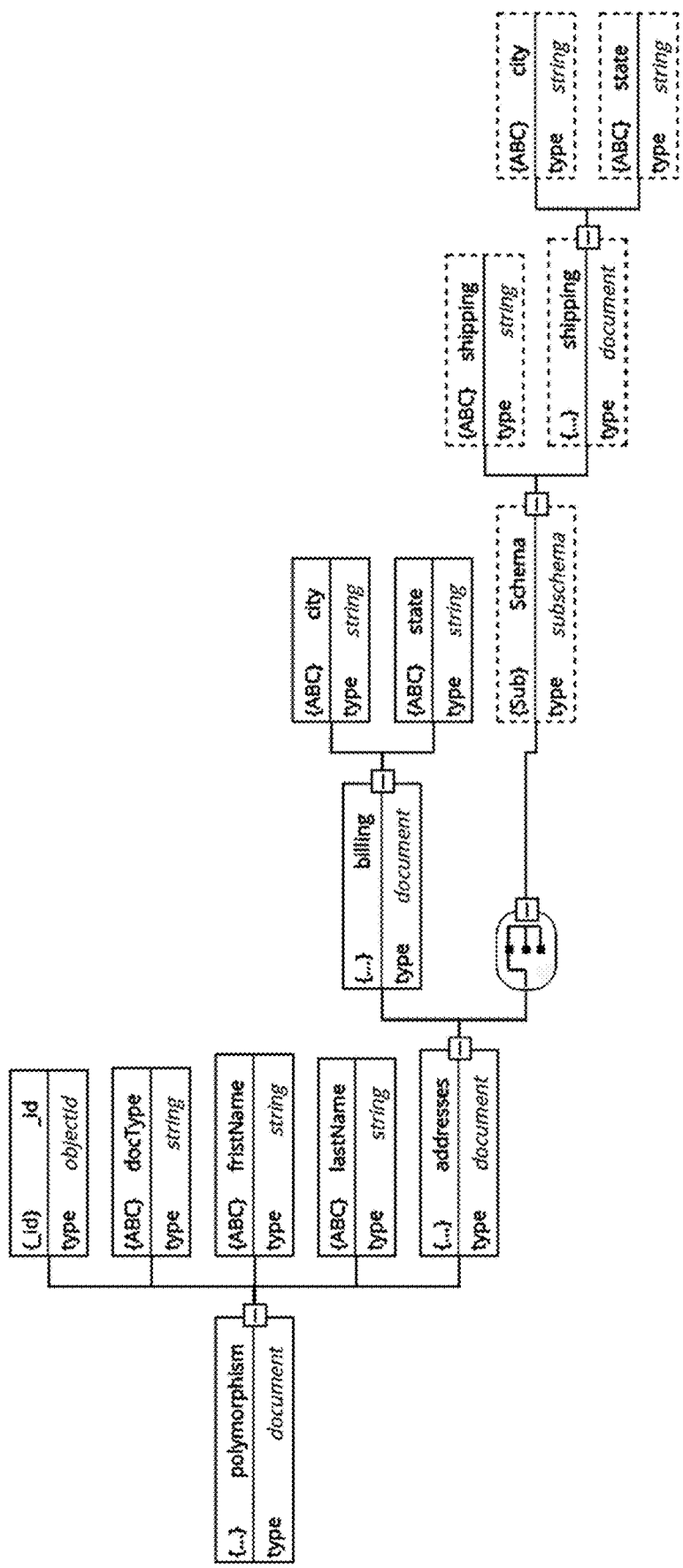
FIG. 81 shows an example tree diagram.

FIGS. 80 and 81 show an example ERD and associated tree diagram according to an embodiment of the present invention, respectively. Together these figures illustrate the capability of the present invention to deal with an important and useful feature of JSON as applicable to NoSQL and Big Data, namely polymorphism. Polymorphism relates to the ability to deal with evolving and flexible schemas, both at the level of the general document structure, and at the level of the type of a single field. This is known as 'schema combination', and can be represented in JSON Schema with the use of subschemas and keywords: anyOf, allOf, oneOf, not. FIGS. 80 and 81 illustrate an ERD and associated tree diagram comprising a field that evolved from being just a string type, to a sub-document, or with the co-existence of both field types. Prior art methods would have a hard time dealing graphically with such subschemas, whereas the representation in FIGS. 80 and 81 is clear and self-evident.

The invention claimed is:

1. A method for constructing a database schema model by a user by means of a computer, comprising steps of:
    (a) providing a set of collections and optionally one or more relationships linking at least two collections of said set of collections, each collection of said set of collections being associated with a schema definition displayed by a respective single entity box on an entity relationship diagram on a graphical interface on said computer, and each collection comprising at least one object and/or one field;

(b) editing one or more collections of said set of collections by means of said graphical user interface, each collection of the one or more collections associated with the schema definition displayed by the single entity box on the entity relationship diagram on the graphical interface on said computer and comprising the at least one object and/or one field;

(c) automatically generating by means of said computer said schema model for a database or Application Programming Interface;

wherein at least one collection of said set of collections comprises a nested object comprising lower level nodes, each lower level node of said lower level nodes being displayed on said graphical user interface in the single entity box of the collection that comprises said nested object, wherein lower level nodes fields belonging to the nested object are displayed indented, said indentation being defined within the respective single entity box in the entity-relationship diagram on the graphical interface on said computer, wherein the at least one collection being displayed by the single entity box that comprises the nested object is associated with a single JavaScript Object Notation (JSON) document or Binary JSON (BSON) document;

wherein said database schema model is formatted according to any format or combination of formats selected from: JavaScript Object Notation (JSON) Schema, Binary JSON (BSON), YAML Ain't Markup Language (YAML), Mongoose, RESTful API Modeling Language (RAML), Swagger, Apache AVRO, Parquet; and wherein said displaying of said lower level nodes does not involve creating a primary key for defining a relation between different lower level nodes since said lower level nodes are displayed in the single entity box.

2. The method according to claim 1, wherein a tree diagram that corresponds to said set of collections is displayed on said graphical user interface on said computer, said tree diagram having two levels or more in view of said set of collections comprising a nested object, and wherein said schema definition is editable via said tree diagram on said graphical user interface.

3. The method according to the claim 1, wherein said set of collections comprises at least two collections; in step (b) comprises generating and/or editing one or more relationships linking at least two collections belonging to said set of collections via said entity relationship diagram on said graphical user interface on said computer; and in step (b) at least one of said one or more relationships links a first field belonging to a first collection belonging to said set of collections to a second field belonging to a second collection belonging to said set of collections.

4. The method according to claim 1, wherein said schema definition is a "JavaScript Object Notation" (JSON) schema definition.

5. The method according to claim 1, wherein said one or more objects comprise an array and/or a sub-document.

6. The method according to claim 3, wherein said at least one of said one or more relationships is a foreign key relationship; and/or said first collection and said second collection are linked by more than one relationship generated and/or edited in step (b); and/or said first field belonging to said first collection is linked to both said second field and a third field belonging to said second collection by a first and second relationship, respectively.

7. The method according to claim 1, wherein said automatic generation in step (c) automatically generates a human-readable manual for said database schema model based at least partly on a logical link defined by said one or more relationships.

8. The method according to claim 1, wherein said providing in step (a) comprises generating one or more of said set of collections on said graphical user interface on said computer.

9. The method according to claim 1, wherein said providing in step (a) comprises denormalizing a relational database schema model provided by the user, said denormalizing comprising extracting said set of collections from a set of tables belonging to said relational database schema model, as well as any foreign key relationships belonging to said relational database schema model, for inclusion in said database schema model.

10. The method according to claim 9, wherein said denormalizing in step (a) further comprises processing a foreign key relationship between a parent collection comprising a primary key and a child collection comprising a foreign key, said processing comprising any or any combination of following: including a nested sub-document in said child collection, said nested sub-document comprising one or more relationships to said parent collection; including a nested array in said parent collection, said nested array comprising one or more relationships to said child collection.

11. The method according to claim 10, wherein said processing of a foreign key relationship comprises selecting one or more denormalization preferences on said graphical user interface on said computer, said denormalization preferences comprising any or any combination of following: a table selection; an embedding preference with respect to said including of said nested sub-document in said child collection and/or of said nested array in said parent collection; a maximum number of cascading levels, a maximum number of recursion levels.

12. A computer system for constructing a database schema model upon input of a user, said computer system comprising a processor, non-volatile memory, program code present on said memory for execution on said processor, a graphical interface, wherein said computer is configured to carry out steps of:

(a) providing a set of collections and optionally one or more relationships linking at least two collections of said set of collection, each collection of said set of collections being associated with a schema definition displayed by a respective single entity box on an entity relationship diagram on a graphical interface on said computer, and each collection comprising at least one object and/or one field;

(b) editing one or more collections of said set of collections by means of said graphical user interface, each collection of the one or more collections associated with the schema definition displayed by the single entity box on the entity relationship diagram on the graphical interface on said computer and comprising the at least one object and/or one field;

(c) automatically generating by means of said computer said schema model for a database or Application Programming Interface;

wherein at least one collection of said set of collections comprises a nested object comprising lower level nodes, each lower level node of said lower level nodes being displayed on said graphical user interface in the single entity box of the collection that comprises said nested object, wherein lower level nodes fields belonging to the nested object are displayed indented, said indentation being defined within the respective single entity box in the entity-relationship diagram on the graphical interface on said computer wherein the at least one collection being displayed by the single entity box that comprises the nested object is associated with a single JavaScript Object Notation (JSON) document or Binary JSON (BSON) document;

wherein said database schema model is formatted according to any format or combination of formats selected from: JavaScript Object Notation (JSON) Schema, Binary JSON (BSON), YAML Ain't Markup Language (YAML), Mongoose, RESTful API Modeling Language (RAML), Swagger, Apache AVRO, Parquet; and wherein said displaying of said lower level nodes does not involve creating a primary key for defining a relation between different lower level nodes since said lower level nodes are displayed in the single entity box.

13. A method for constructing a database schema model by a user by means of a computer, comprising steps of:
(a) providing a set of collections and optionally one or more relationships linking at least two collections of said set of collections, each collection of said set of collections being associated with a schema definition displayed by a respective single entity box on an entity relationship diagram on a graphical interface on said computer and each collection comprising at least one object and/or one field;
(b) editing one or more collections of said set of collections by means of said graphical user interface, each collection of the one or more collections associated with the schema definition displayed by the single entity box on the entity relationship diagram on the graphical interface on said computer and comprising the at least one object and/or one field;
(c) automatically generating by means of said computer said schema model for an Application Programming Interface;
wherein at least one collection of said set of collections comprises a nested object comprising lower level nodes, each lower level node of said lower level nodes being displayed on said graphical user interface in the single entity box of the collection that comprises said nested object, wherein lower level nodes fields belonging to the nested object are displayed indented, said indentation being defined within the respective single entity box in the entity-relationship diagram on the graphical interface on said computer,
wherein the at least one collection being displayed by the single entity box that comprises the nested object is associated with a single JavaScript Object Notation (JSON) document or Binary JSON (BSON) document; and
wherein said database schema model is formatted according to any two or more of following formats: JavaScript Object Notation (JSON) Schema, Binary JSON (BSON), YAML Ain't Markup Language (YAML), Mongoose, RESTful API Modeling Language (RAML), Swagger, Apache AVRO, Parquet.

14. A computer system for constructing a database schema model upon input of a user, said computer system comprising a processor, non-volatile memory, program code present on said memory for execution on said processor, a graphical interface, wherein said computer is configured to carry out steps of:
(a) providing a set of collections and optionally one or more relationships linking at least two collections of said set of collection, each collection of said set of collections being associated with a schema definition displayed by a respective single entity box on an entity relationship diagram on a graphical interface on said computer and each collection comprising at least one object and/or one field;
(b) editing one or more collections of said set of collections by means of said graphical user interface, each collection of the one or more collections associated with the schema definition displayed by the single entity box on the entity relationship diagram on the graphical interface on said computer and comprising the at least one object and/or one field;
(c) automatically generating by means of said computer said schema model for an Application Programming Interface;
wherein at least one collection of said set of collections comprises a nested object comprising lower level nodes, each lower level node of said lower level nodes being displayed on said graphical user interface in the single entity box of the collection that comprises said nested object, wherein lower level nodes fields belonging to the nested object are displayed indented, said indentation being defined within the respective single entity box in the entity-relationship diagram on the graphical interface on said computer,
wherein the at least one collection being displayed by the single entity box that comprises the nested object is associated with a single JavaScript Object Notation (JSON) document or Binary JSON (BSON) document;
wherein said database schema model is formatted according to any two or more of following formats: JavaScript Object Notation (JSON) Schema, Binary JSON (BSON), YAML Ain't Markup Language (YAML), Mongoose, RESTful API Modeling Language (RAML), Swagger, Apache AVRO, Parquet.

* * * * *